(12) United States Patent
Heiml et al.

(10) Patent No.: US 8,497,447 B2
(45) Date of Patent: Jul. 30, 2013

(54) PRODUCTION INSTALLATION AND METHOD FOR JOINING PARTS

(75) Inventors: Roland Heiml, Vöcklamarkt (AT); Thomas Rebhan, Haag am Hausruck (AT); Michael Pauditz, Schwanenstadt (AT); Markus Bittendorfer, Altmünster (AT)

(73) Assignee: STIWA-Fertigungstechnik Sticht Gesellschaft m.b.H., Attnang-Puchheim (AT)

( * ) Notice: Subject to any disclaimer, the term of this patent is extended or adjusted under 35 U.S.C. 154(b) by 1052 days.

(21) Appl. No.: 11/794,528

(22) PCT Filed: Dec. 14, 2005

(86) PCT No.: PCT/AT2005/000501
§ 371 (c)(1),
(2), (4) Date: Oct. 9, 2009

(87) PCT Pub. No.: WO2006/069410
PCT Pub. Date: Jul. 6, 2006

(65) Prior Publication Data
US 2010/0044350 A1 Feb. 25, 2010

(30) Foreign Application Priority Data
Dec. 29, 2004 (AT) .............................. A 2192/2004

(51) Int. Cl.
*B23K 9/00* (2006.01)
(52) U.S. Cl.
USPC .................................... 219/121.41
(58) Field of Classification Search
USPC ..................................... 219/121.41
See application file for complete search history.

(56) References Cited

U.S. PATENT DOCUMENTS

| 4,010,533 A | 3/1977 | Pitner |
| 4,600,095 A | 7/1986 | Brems et al. |

(Continued)

FOREIGN PATENT DOCUMENTS

| AT | 1278/2004 | 2/2006 |
| DE | 35 39 852 | 5/1986 |

(Continued)

OTHER PUBLICATIONS

International Search Report, Feb. 2, 2007.

(Continued)

*Primary Examiner* — Steven Loke
*Assistant Examiner* — Cuong B Nguyen
(74) *Attorney, Agent, or Firm* — Collard & Roe, P.C.

(57) ABSTRACT

The invention discloses a method and a production installation for producing a sub-assembly consisting of a plurality of parts joined together, in which the first part (1) and second part (2) are removed from a parts delivery site in the vicinity of a transport device and deposited oriented in position on one of a plurality of parts transport carriers of the transport device, and subsequently together with the parts transport carrier transported to an assembly station. The parts transport carrier is stopped in the assembly station in a holding position, whereupon the parts (1, 2), oriented towards one another, are moved by means of a vertical positioning device (200a, 200b) together from a transport position on the parts transport carrier into a preparation position, then positioned relative to one another, clamped and then joined to form a sub-assembly, whereupon the joined subassembly is again deposited on one of a plurality of parts transport carriers and transported away thereby. The parts transport carriers comprise a receiver with just one positioning means for holding one of the parts (1) during the transport and projecting lateral guide surfaces arranged spaced apart from one another in the advancing direction thereof, as well as two support surfaces for a part (1) supported thereon.

78 Claims, 35 Drawing Sheets

U.S. PATENT DOCUMENTS

| | | | |
|---|---|---|---|
| 4,738,154 | A | 4/1988 | Hancock |
| 4,738,387 | A | 4/1988 | Jaufmann et al. |
| 5,143,506 | A | 9/1992 | Sticht |
| 5,498,849 | A | 3/1996 | Isshiki et al. |
| 5,943,768 | A | 8/1999 | Ray |
| 6,036,075 | A | 3/2000 | Aebersold |
| 6,170,732 | B1 | 1/2001 | Vogt et al. |
| 6,766,117 | B2 | 7/2004 | Notheis |
| 7,014,033 | B2 | 3/2006 | Sticht et al. |

FOREIGN PATENT DOCUMENTS

| | | |
|---|---|---|
| DE | 40 25 391 | 4/1991 |
| DE | 41 26 689 | 3/1992 |
| DE | 100 18 422 | 10/2001 |
| DE | 102 06 887 | 9/2003 |
| EP | 0 438 988 | 7/1991 |
| EP | 0 438 989 | 7/1991 |
| EP | 0 743 135 | 11/1996 |
| EP | 0 908 266 | 4/1999 |
| EP | 1 281 471 | 2/2003 |
| EP | 1 336 447 | 8/2003 |
| EP | 1 384 550 | 1/2004 |
| GB | 2 293 339 | 3/1996 |
| GB | 2 320 698 | 7/1998 |
| JP | 10-166183 | 6/1998 |
| WO | WO 02/072453 | 9/2002 |
| WO | WO 03/012833 | 2/2003 |

OTHER PUBLICATIONS

English translation of the International Preliminary Report on Patentability and Written Opinion of the International Searching Authority, Jul. 24, 2007.

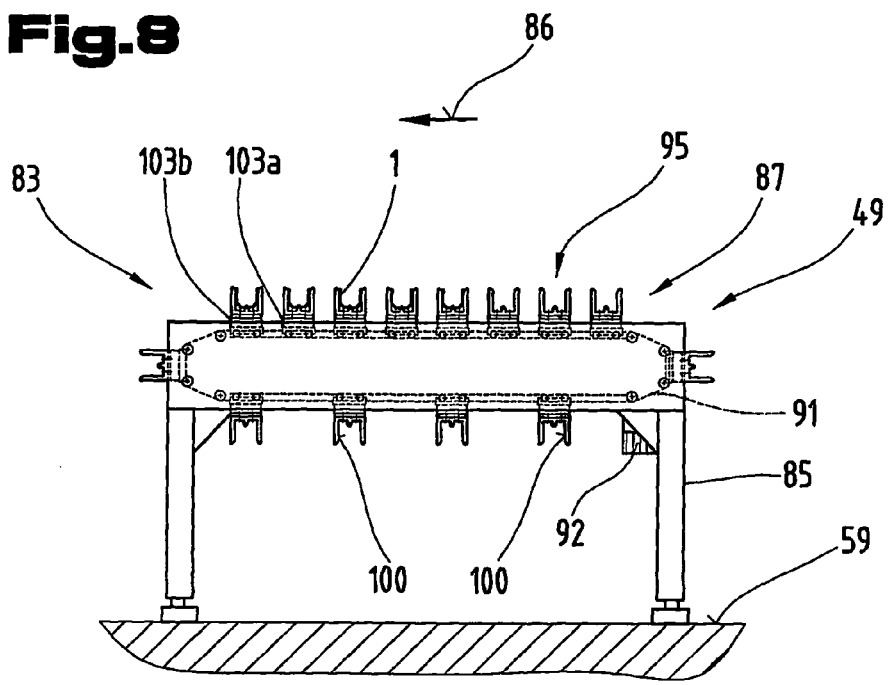
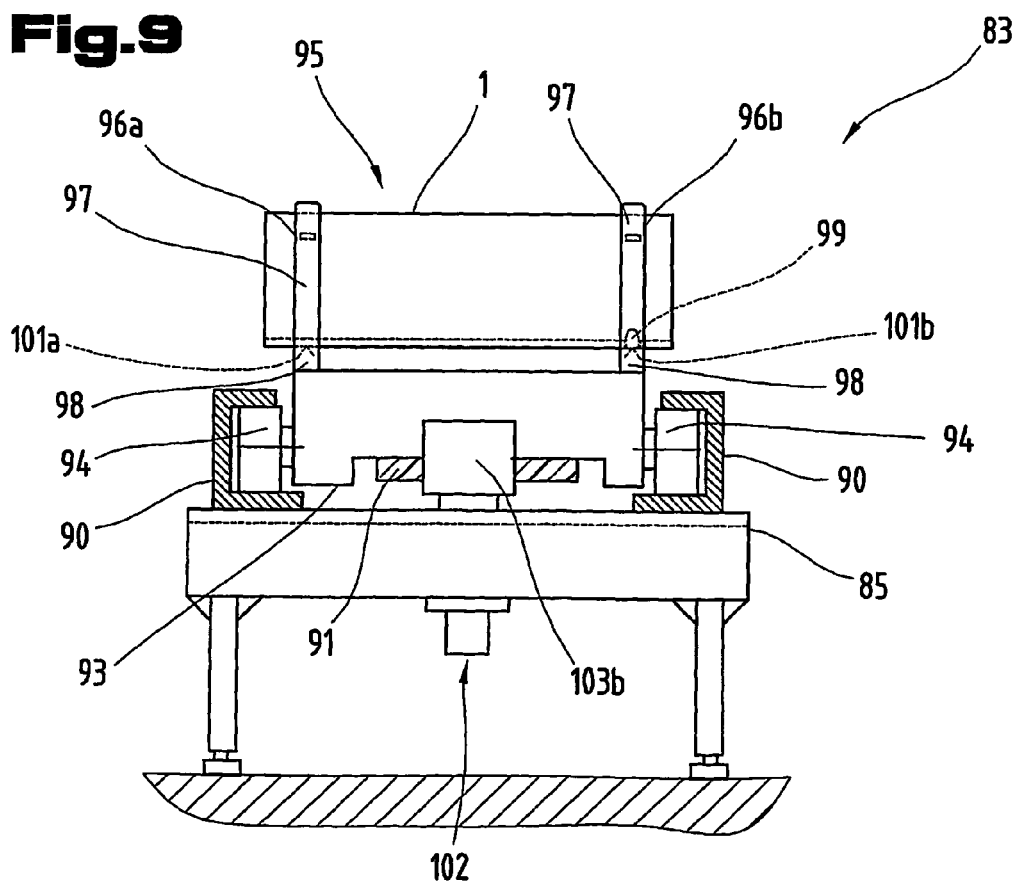

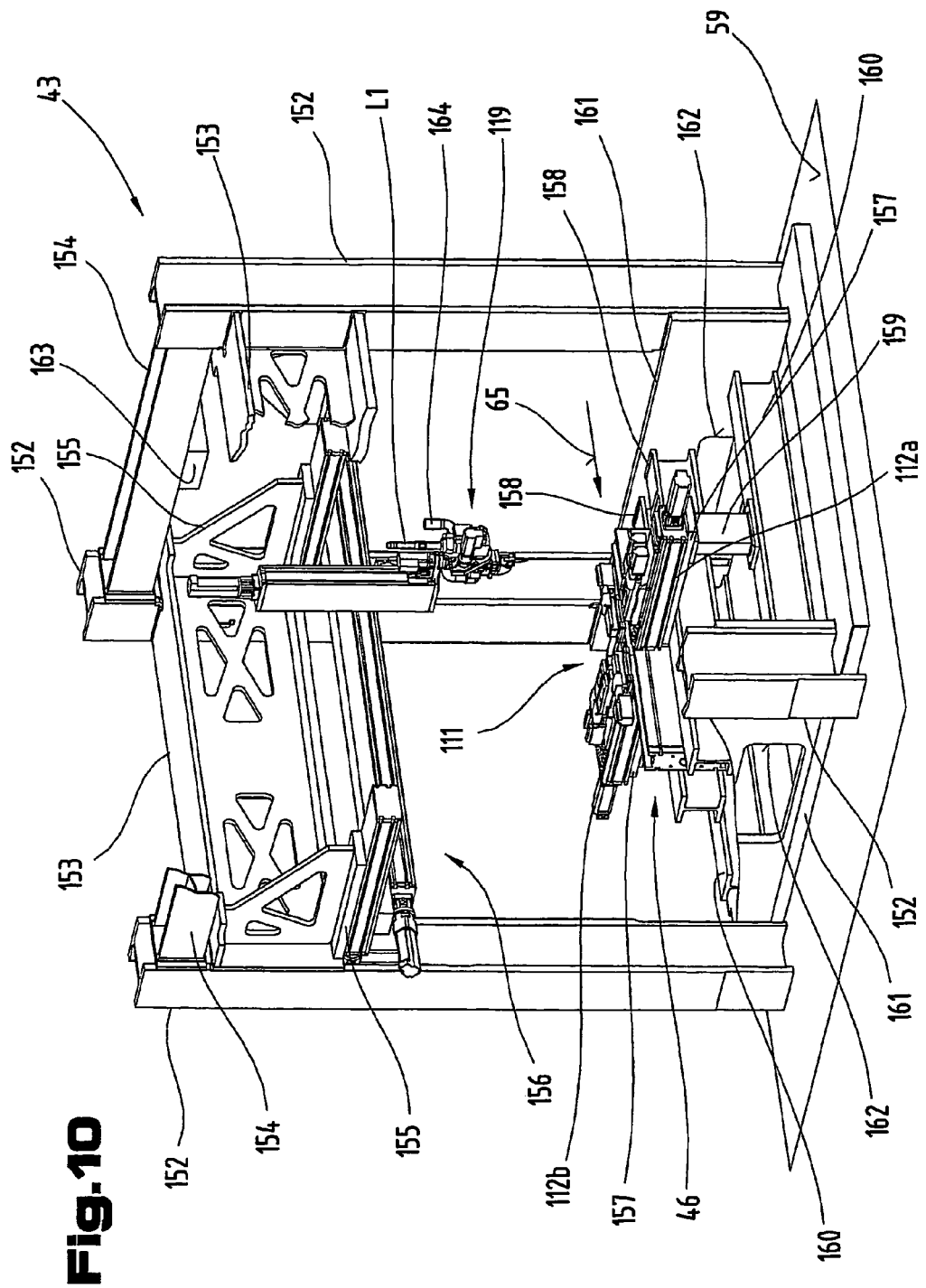

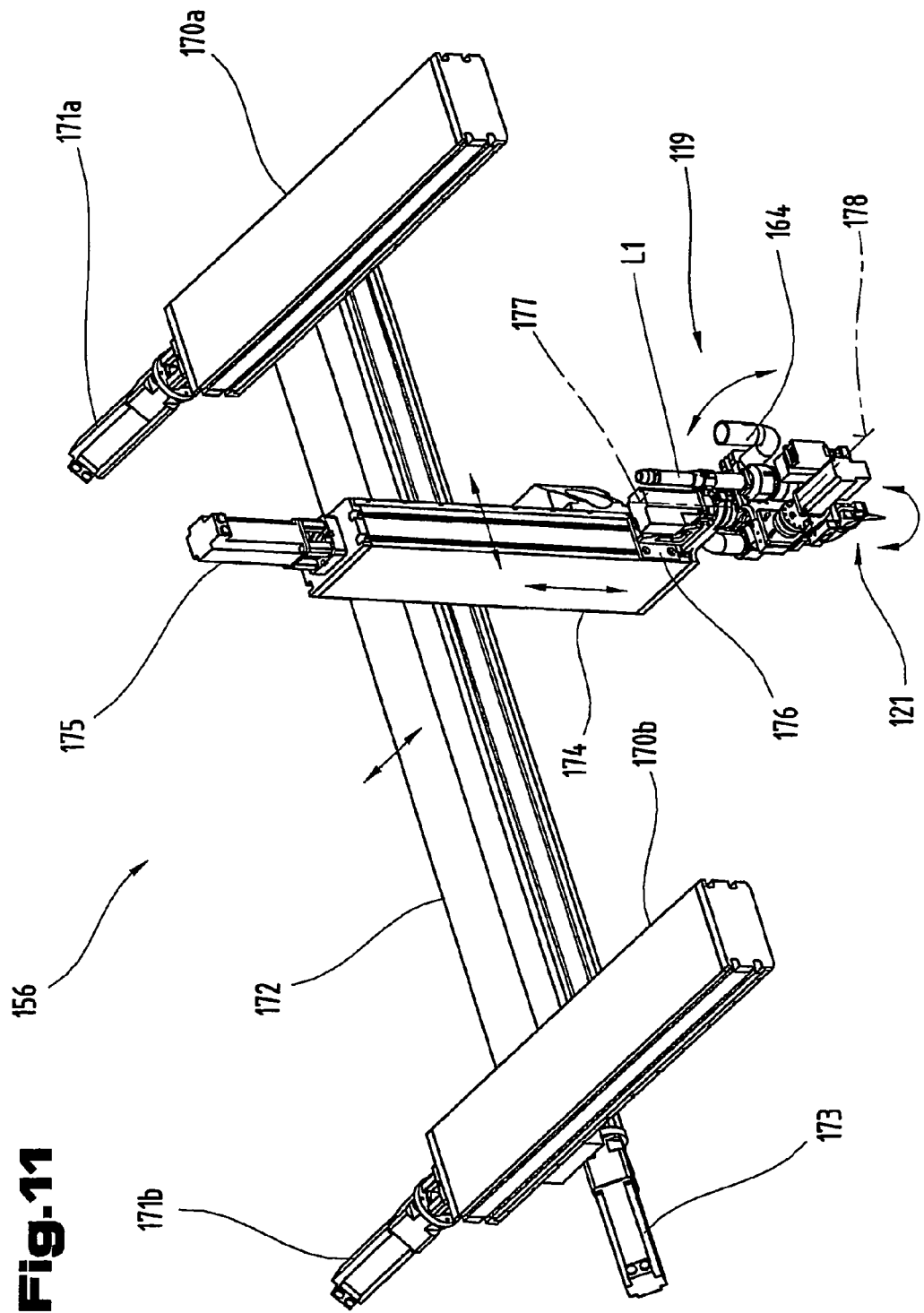

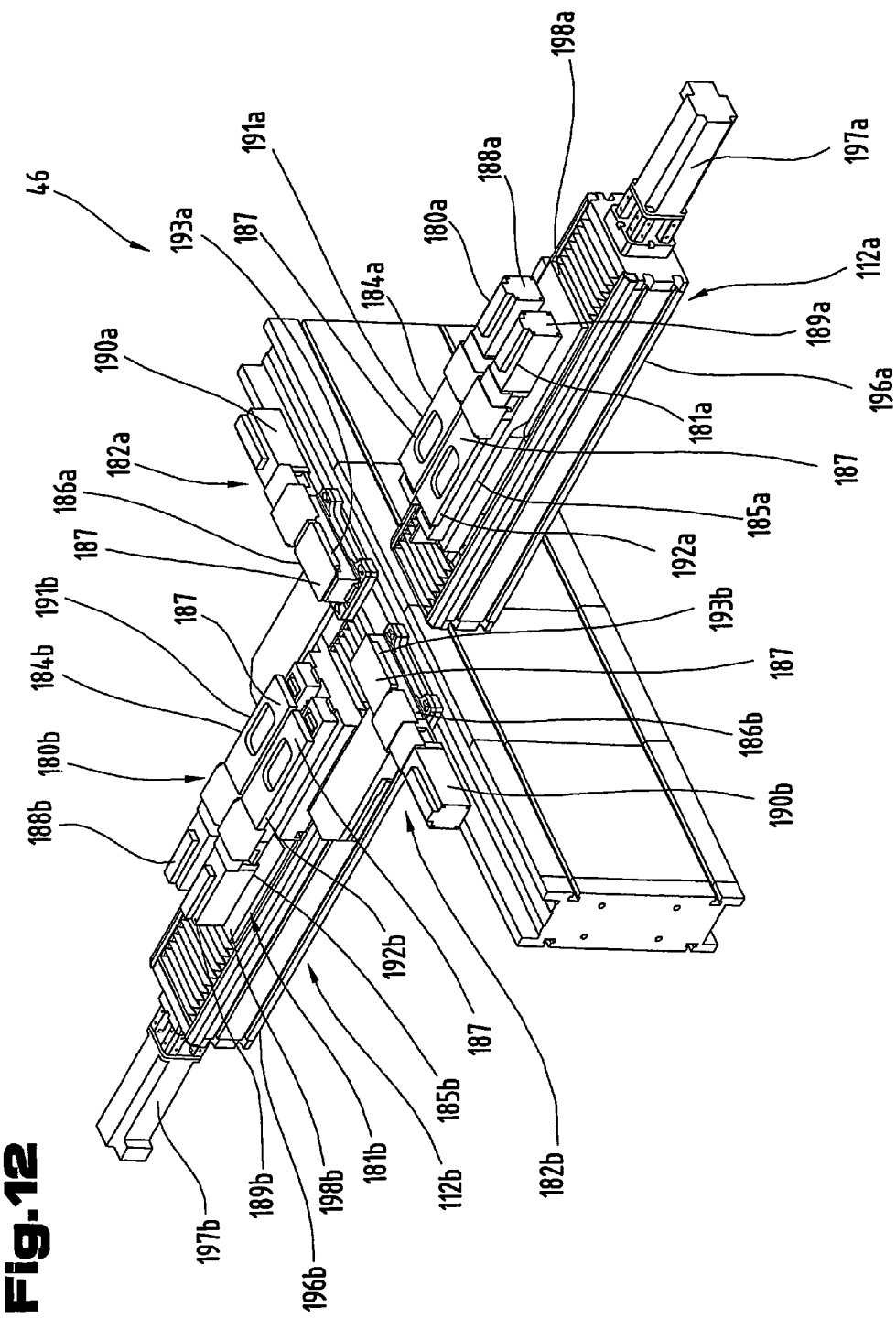

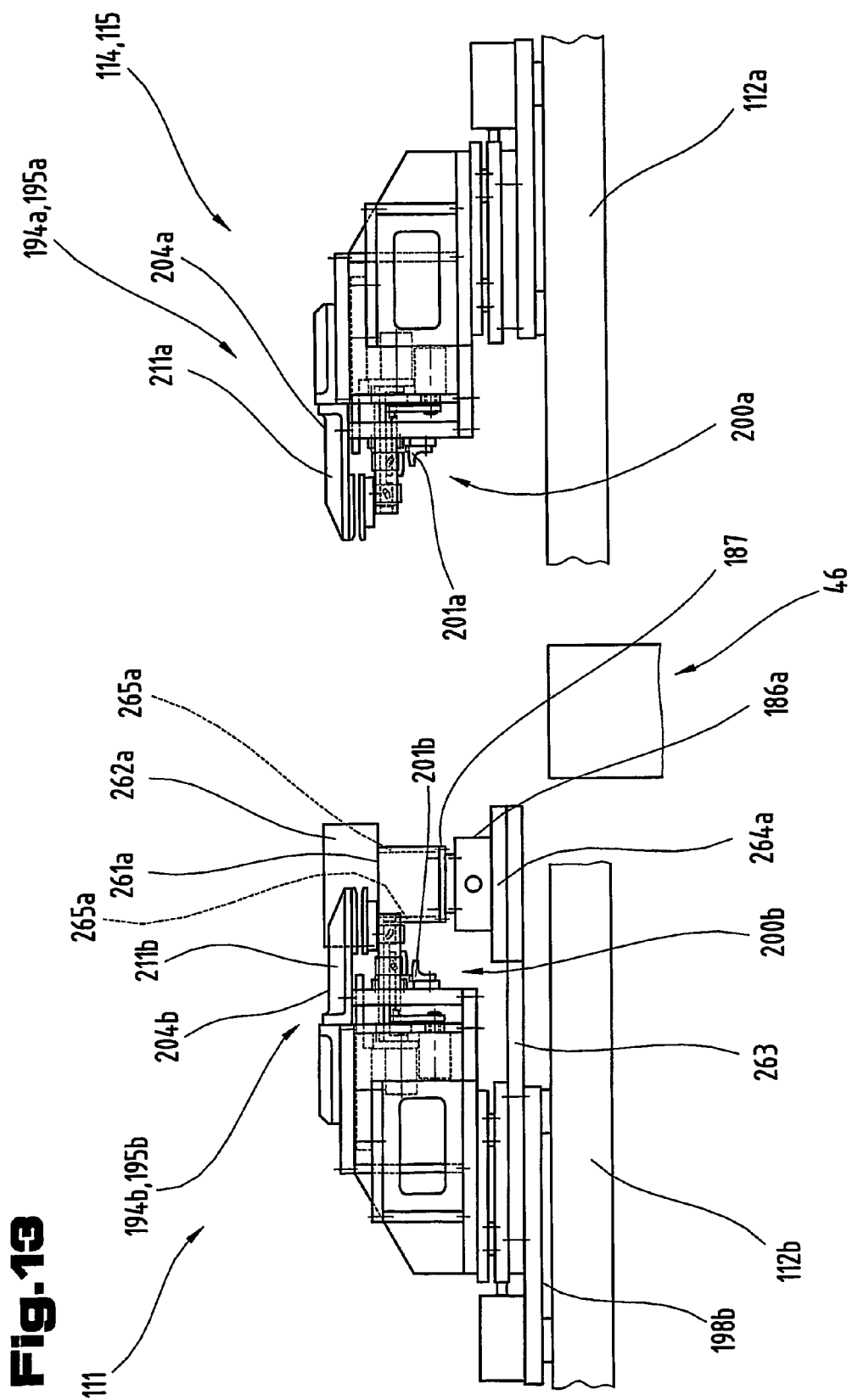

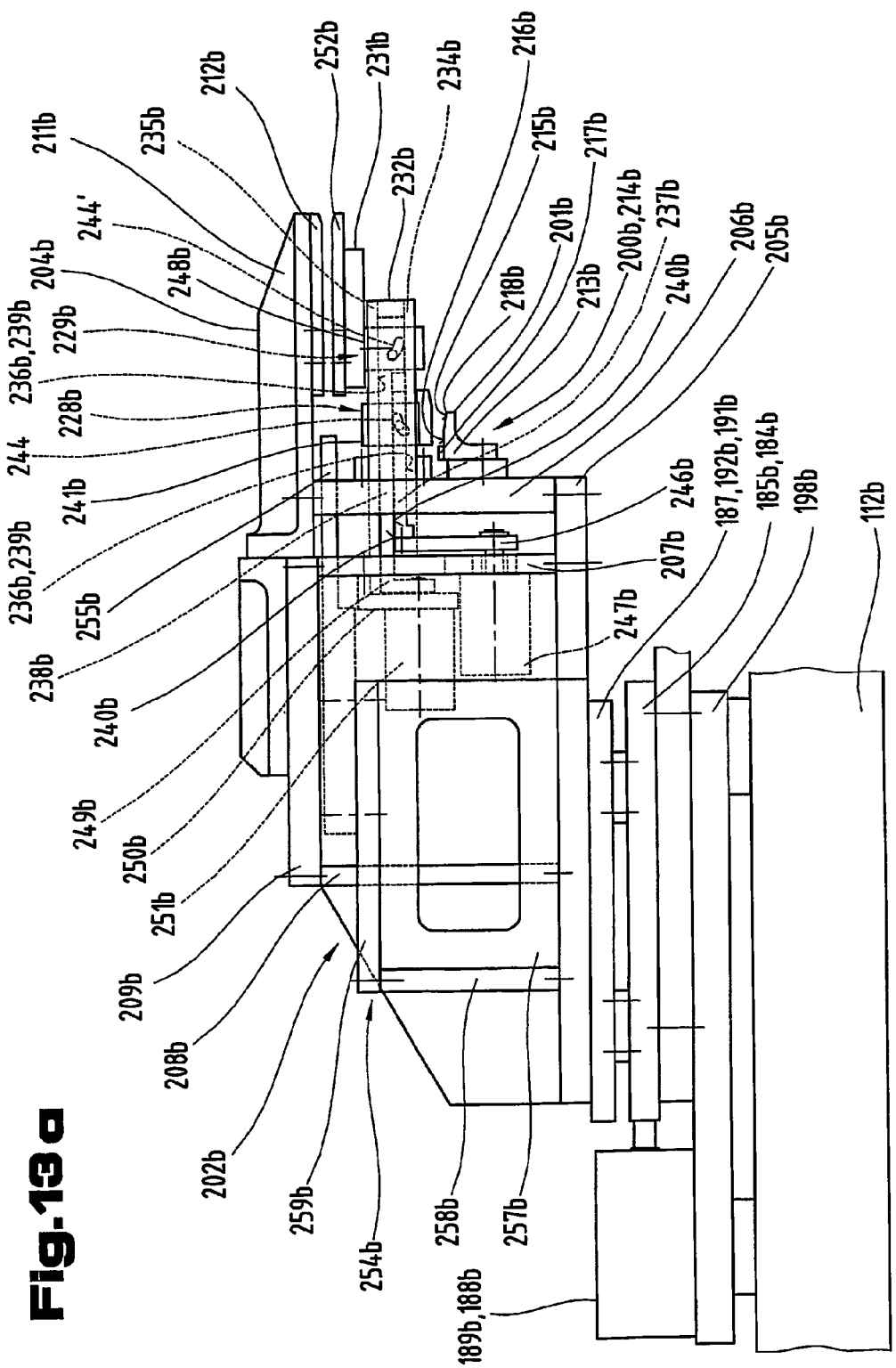

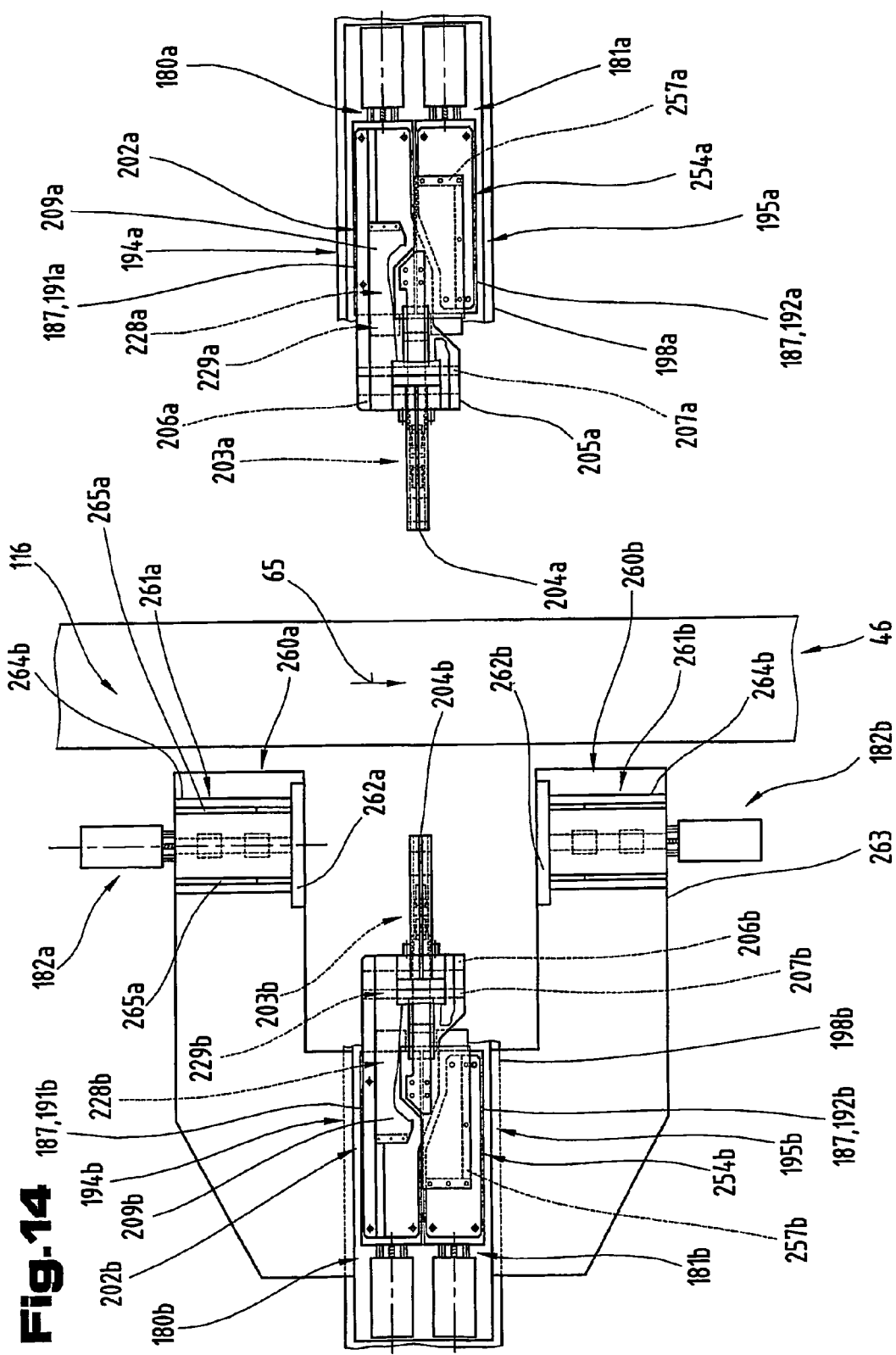

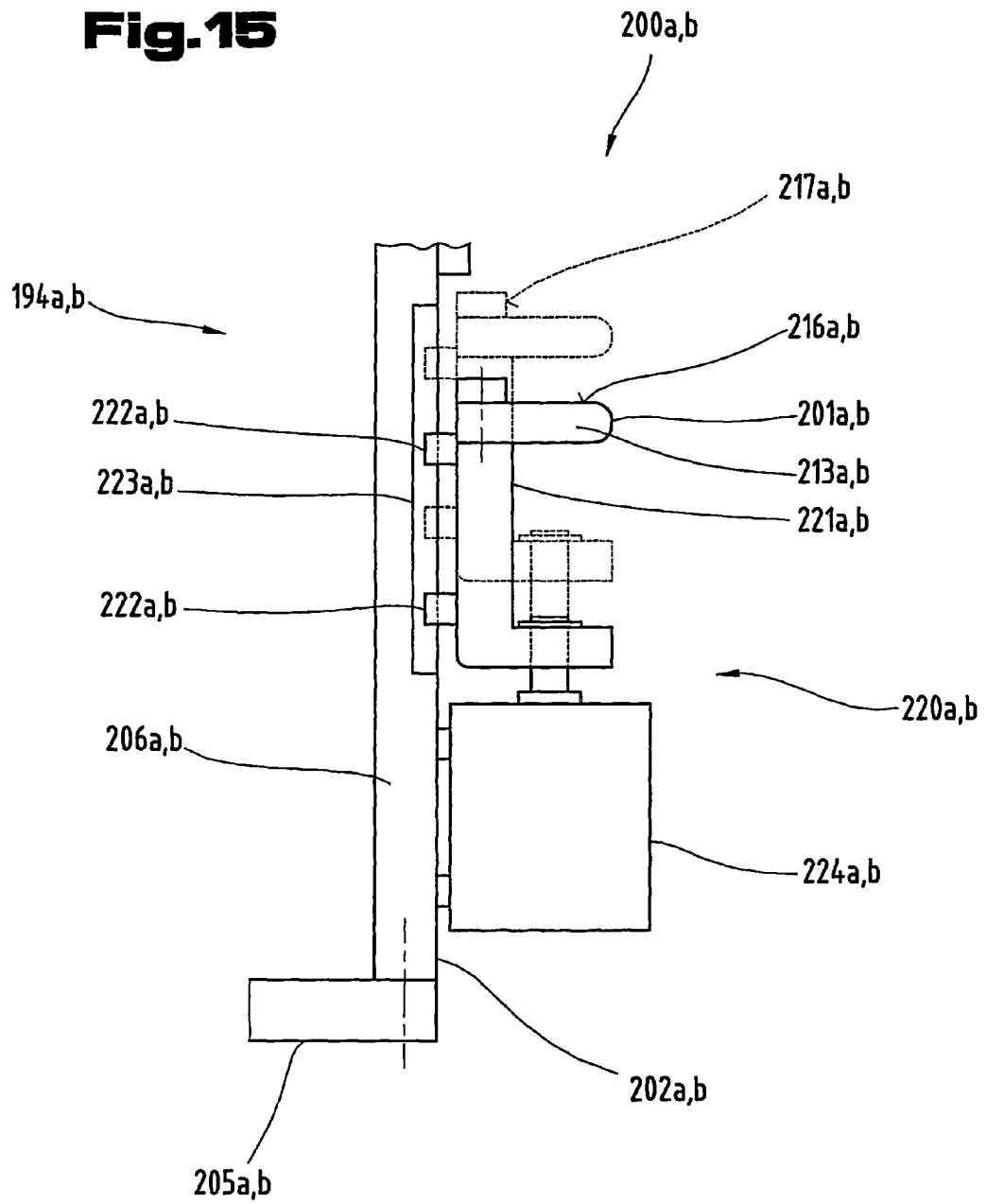

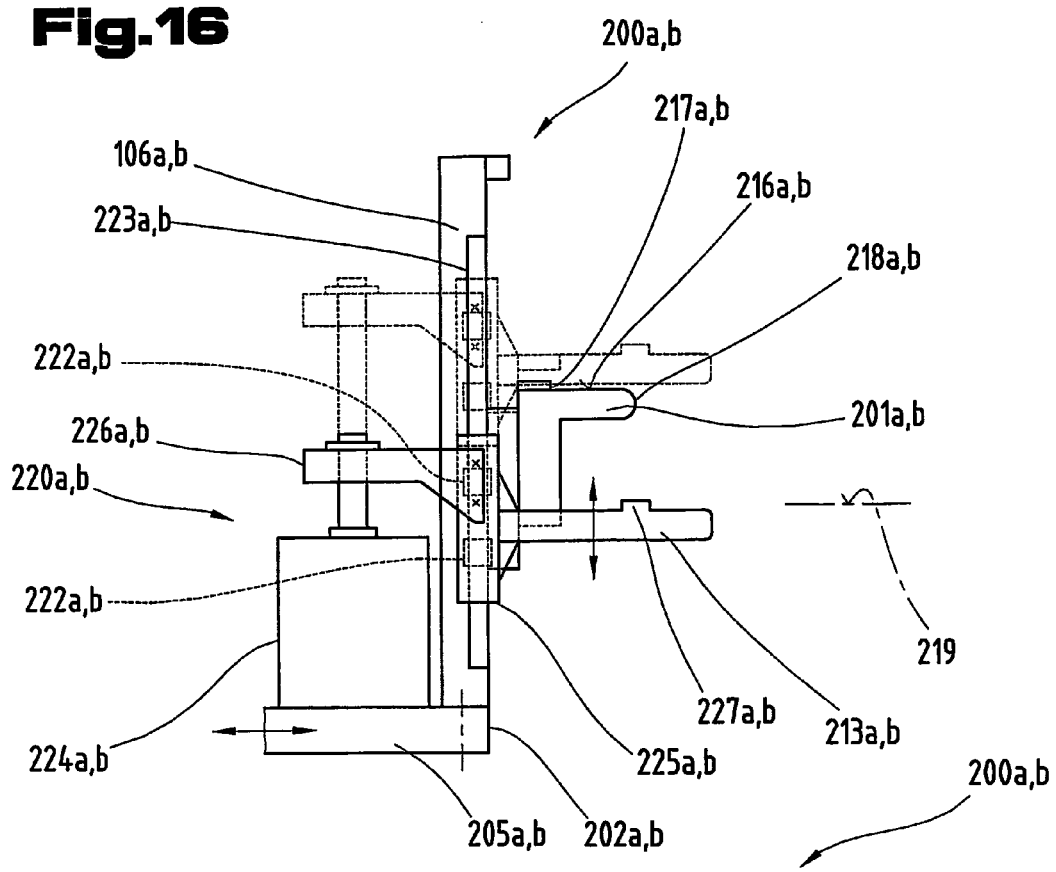
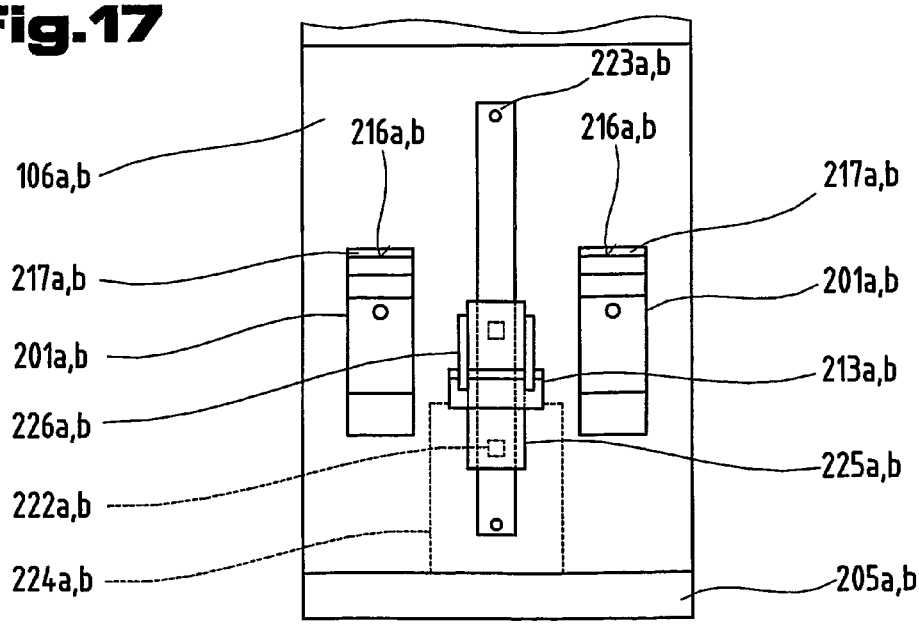

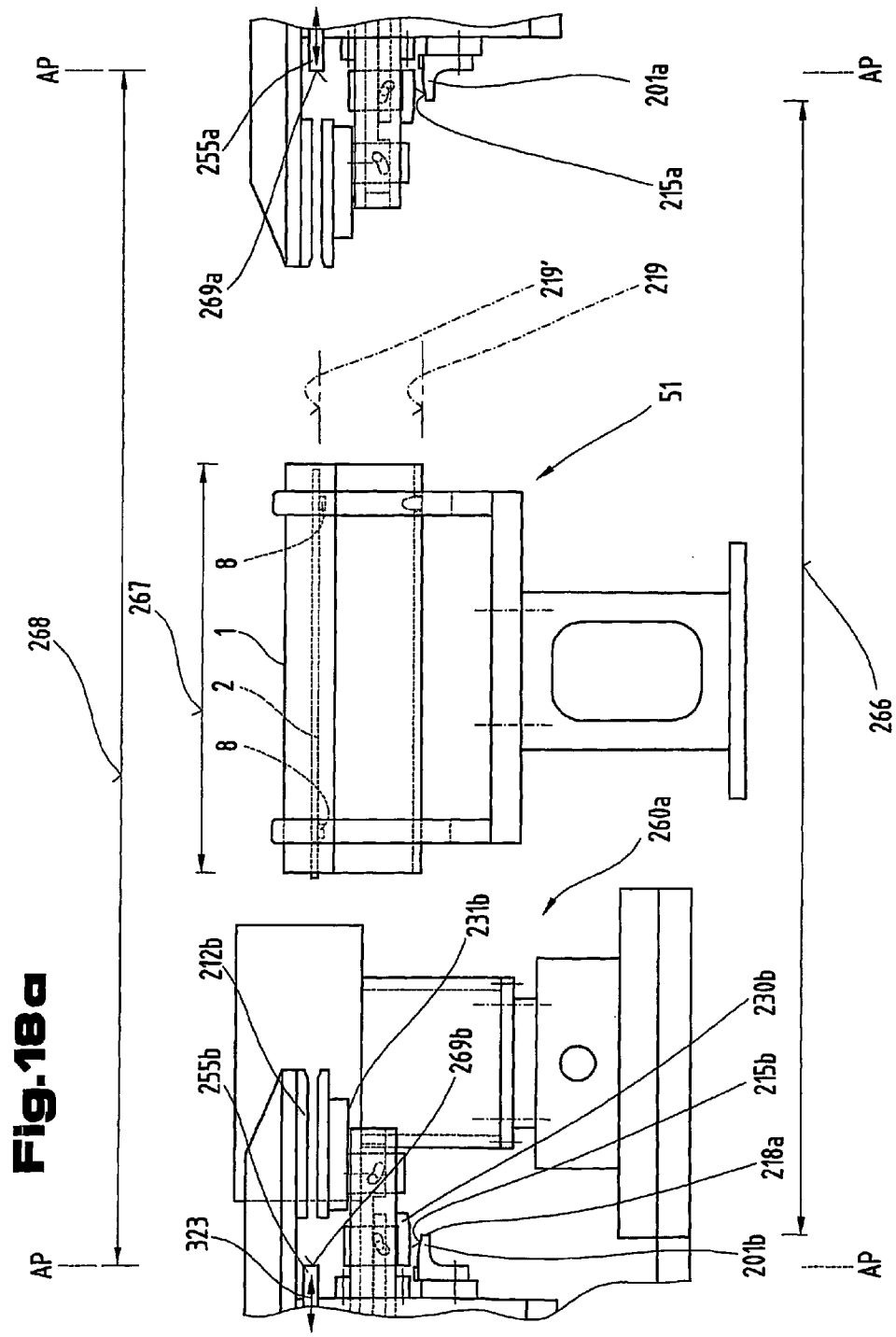

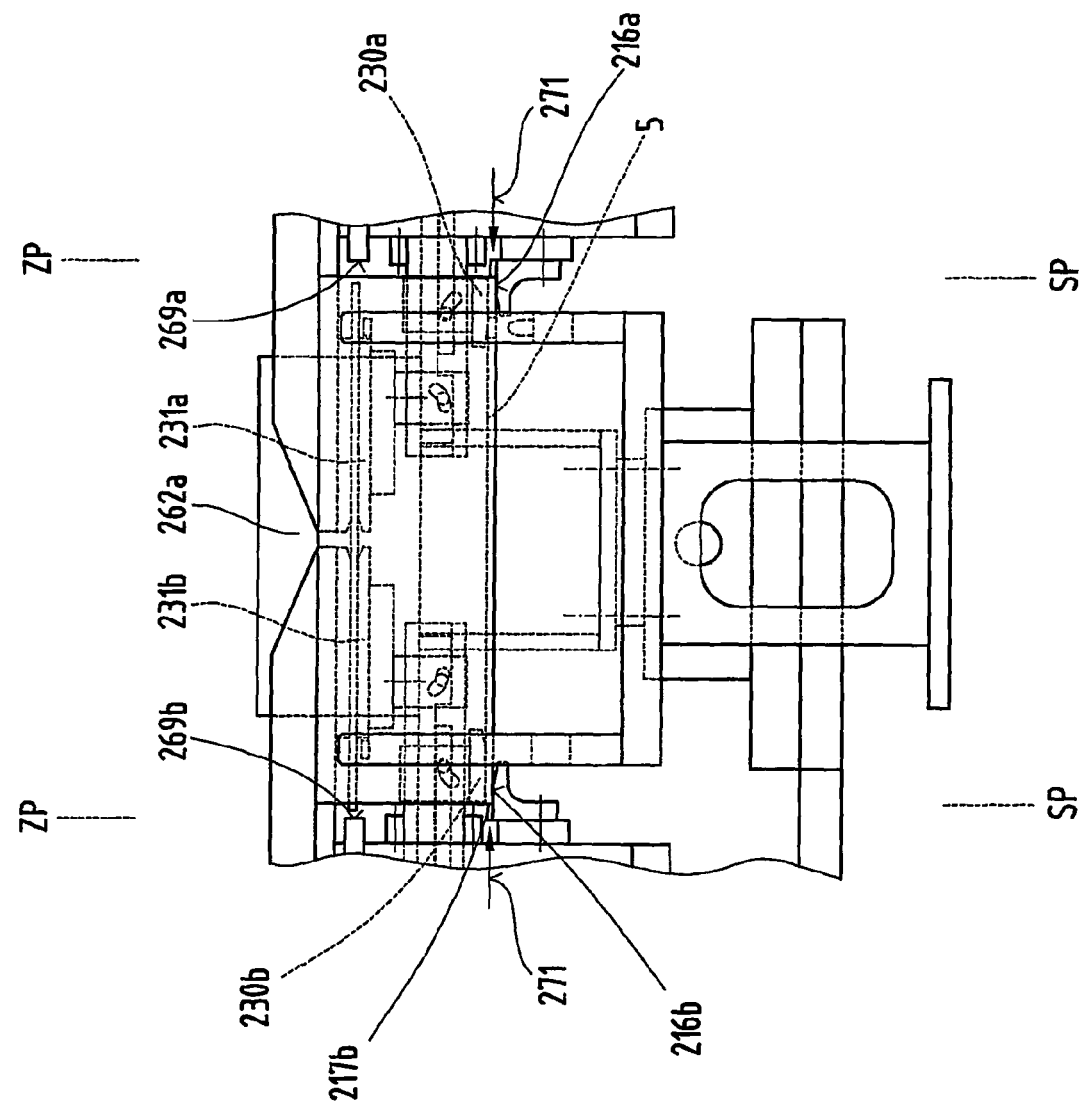

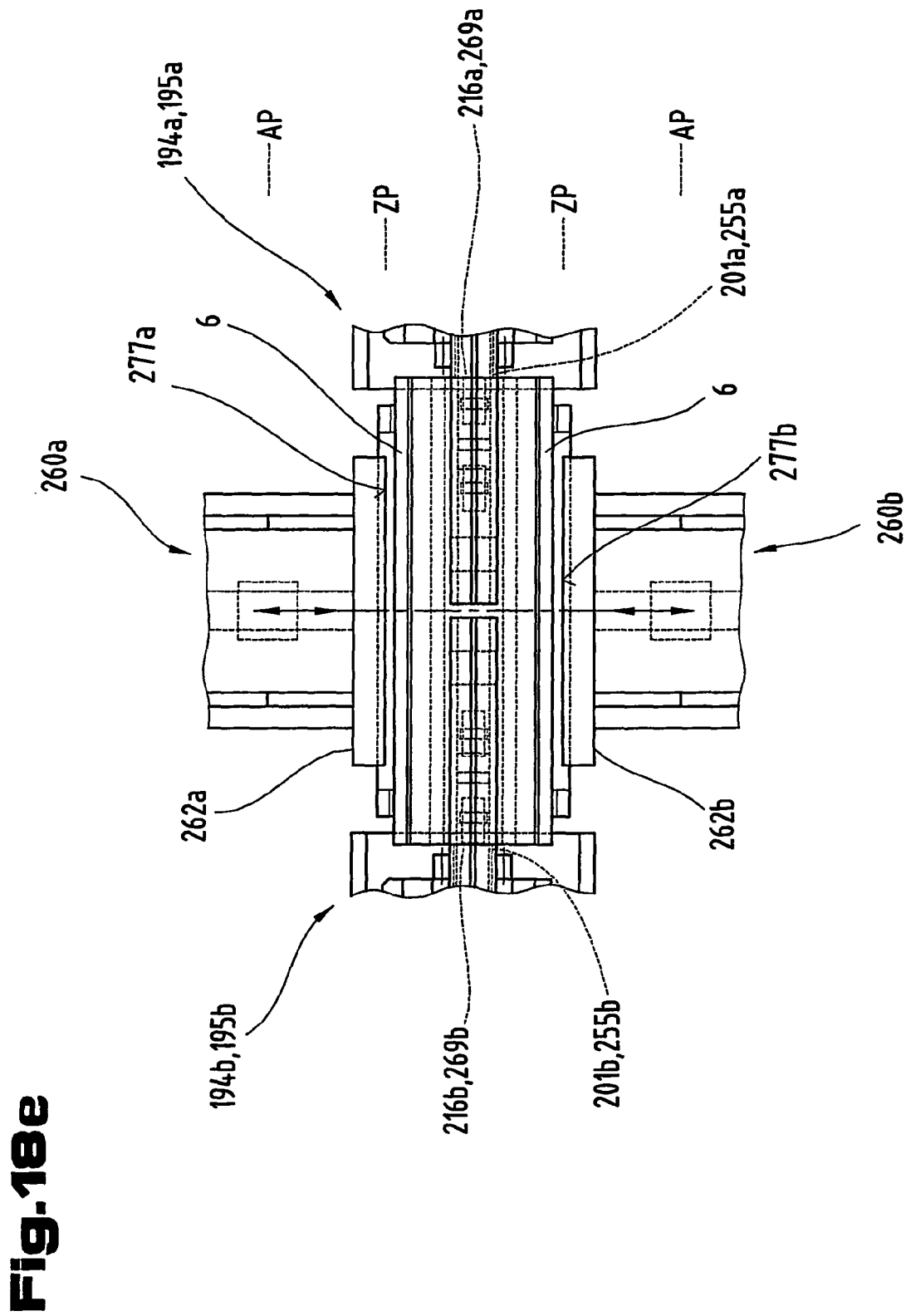

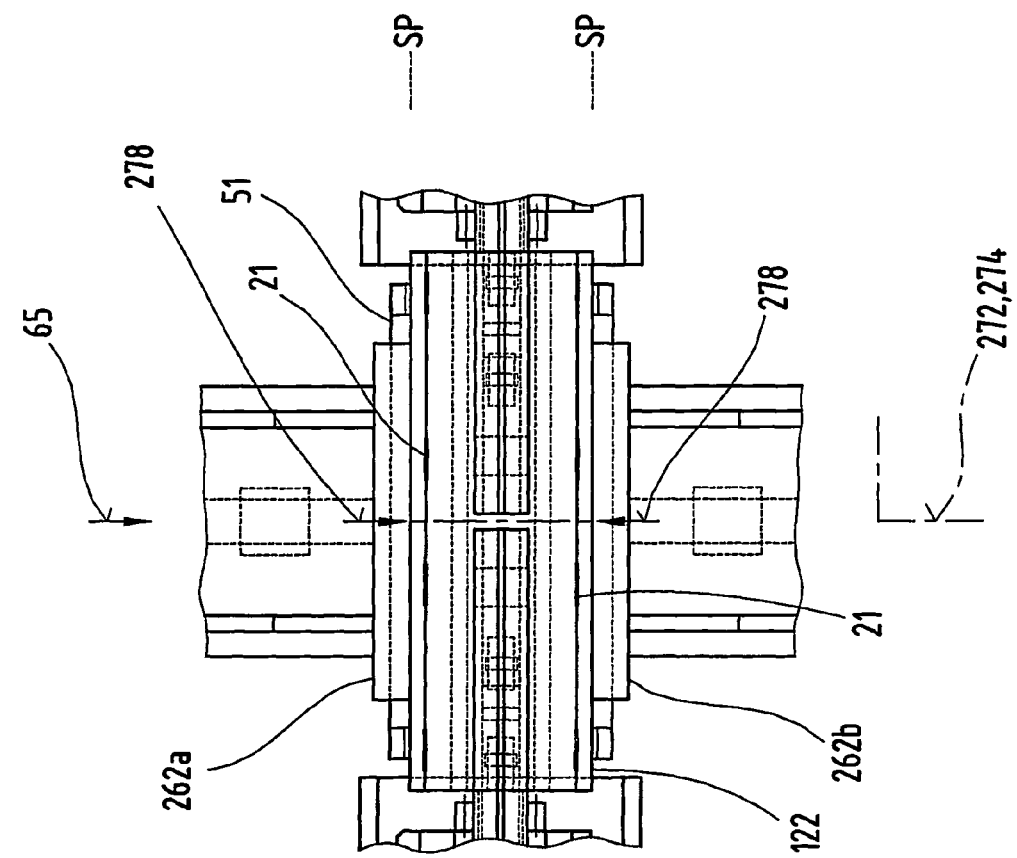

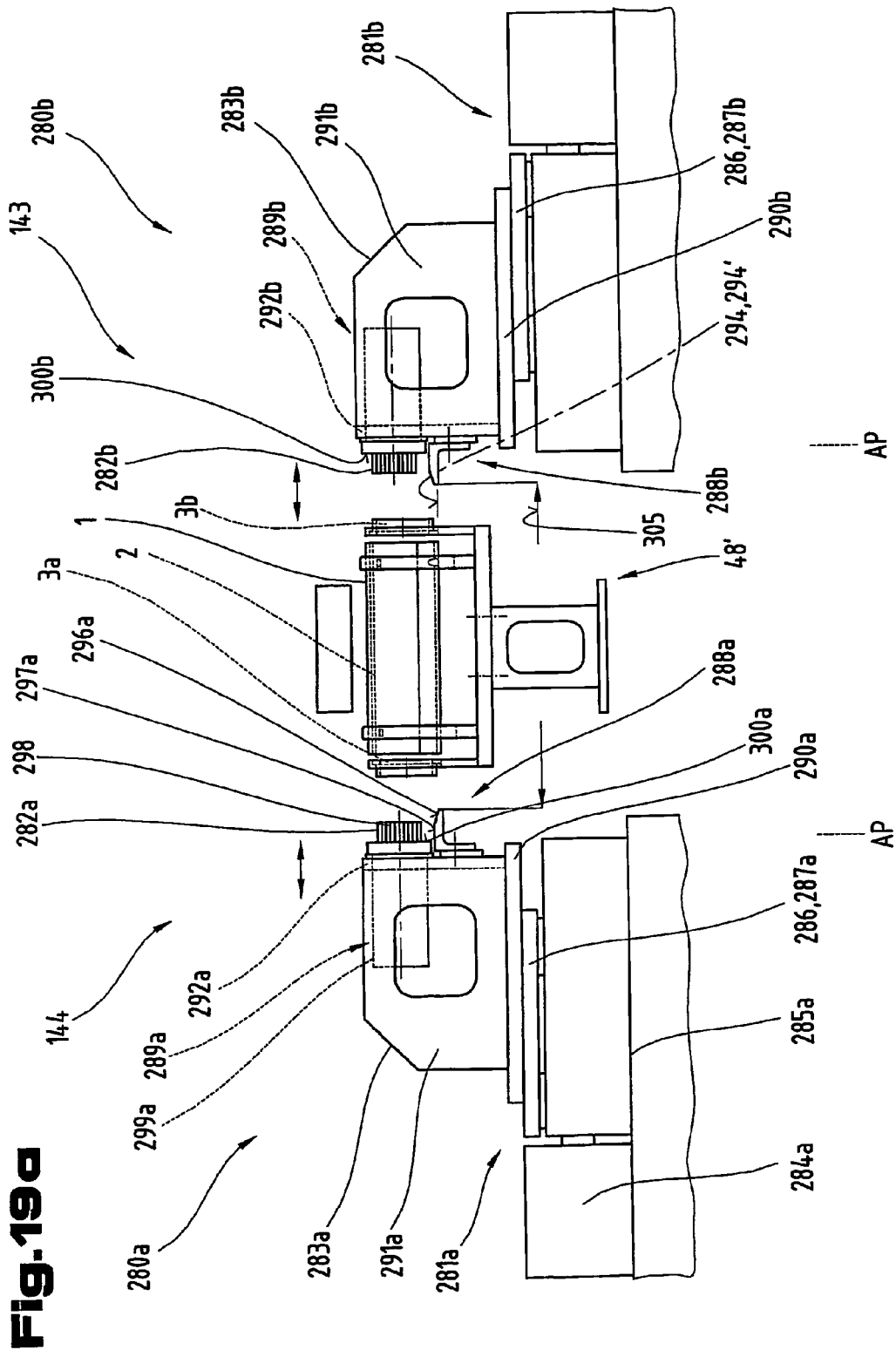

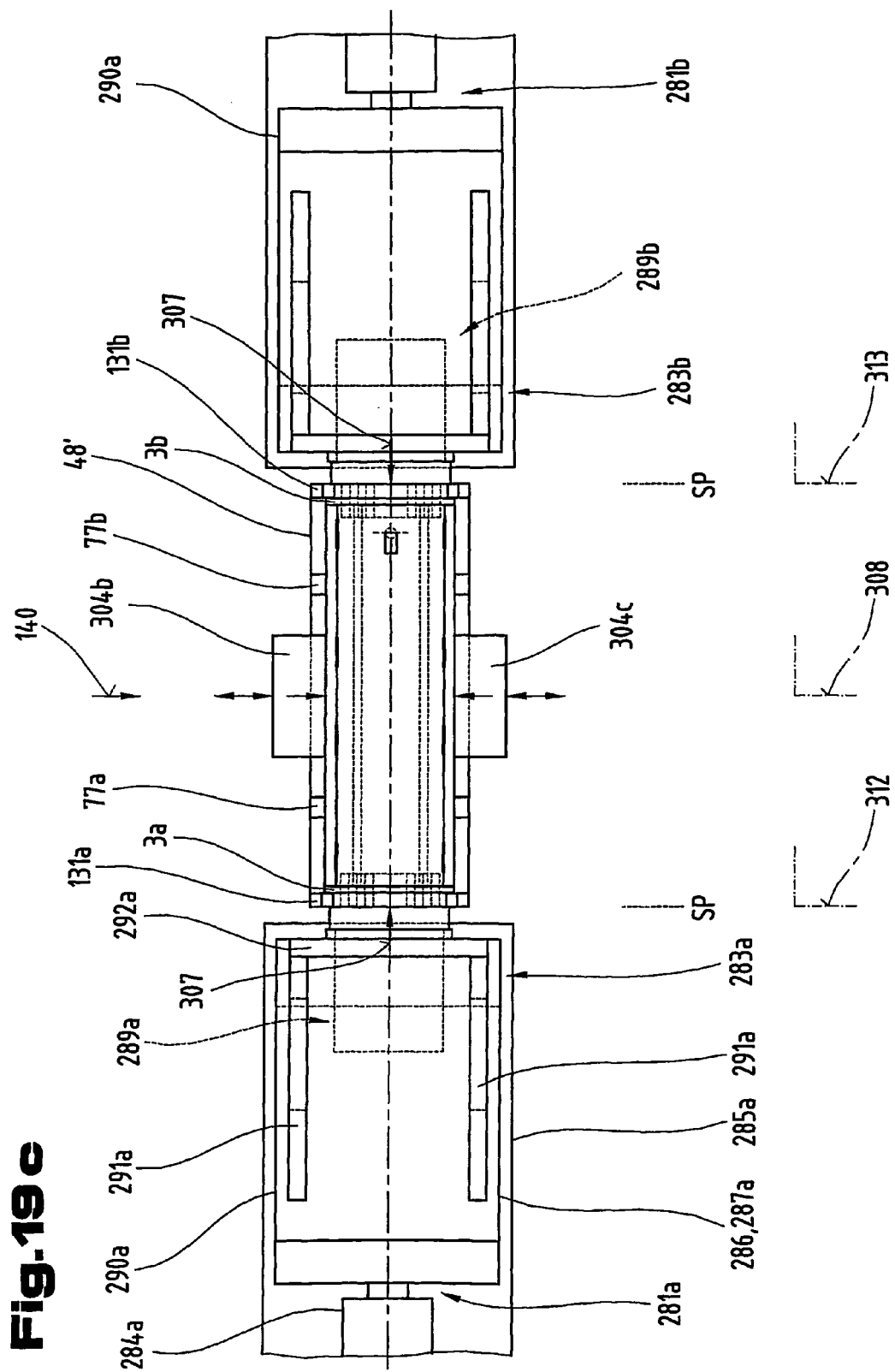

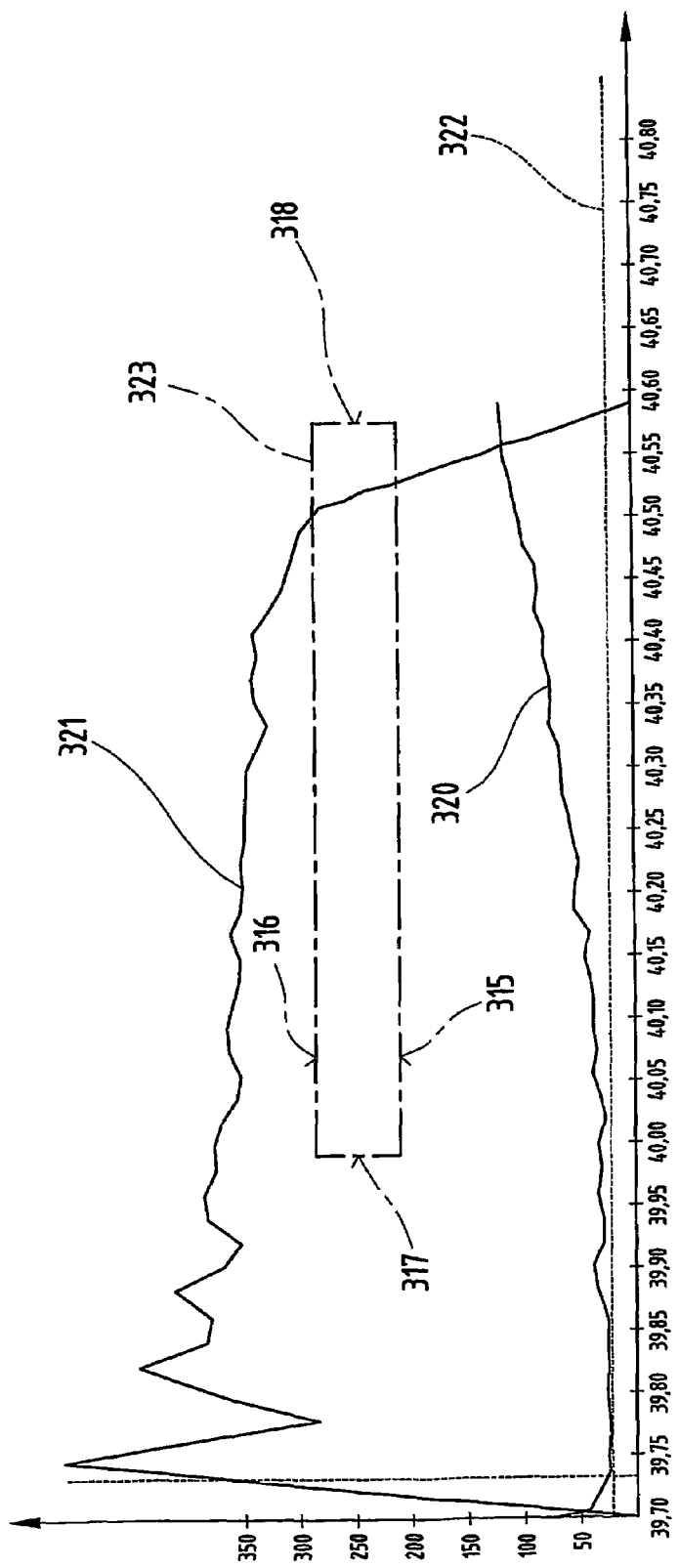

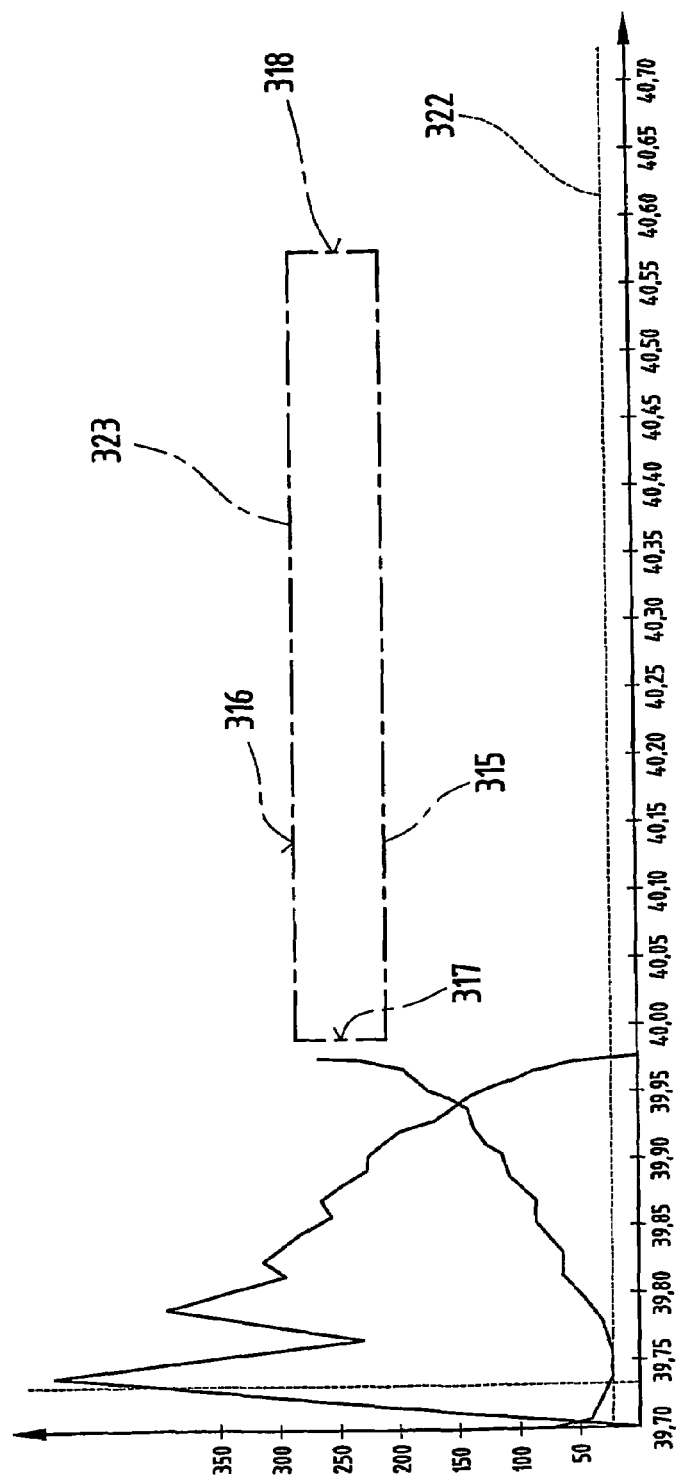

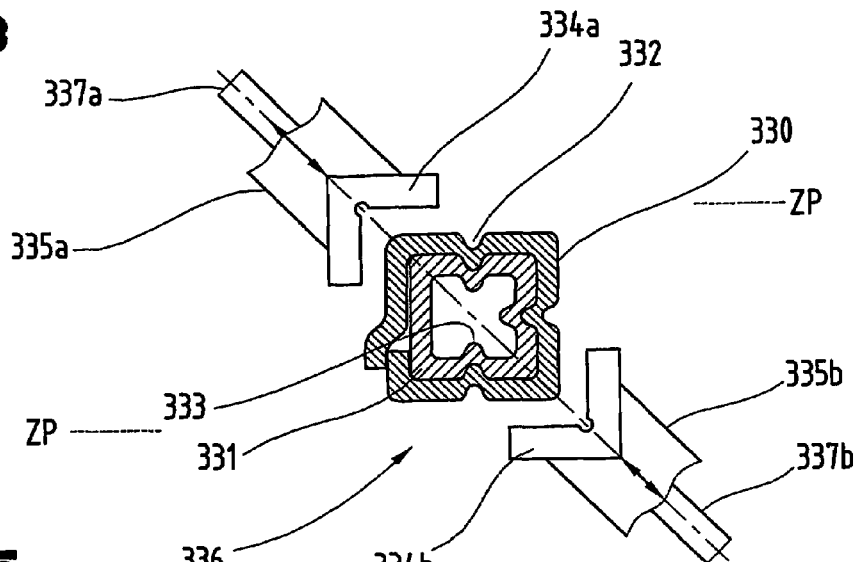
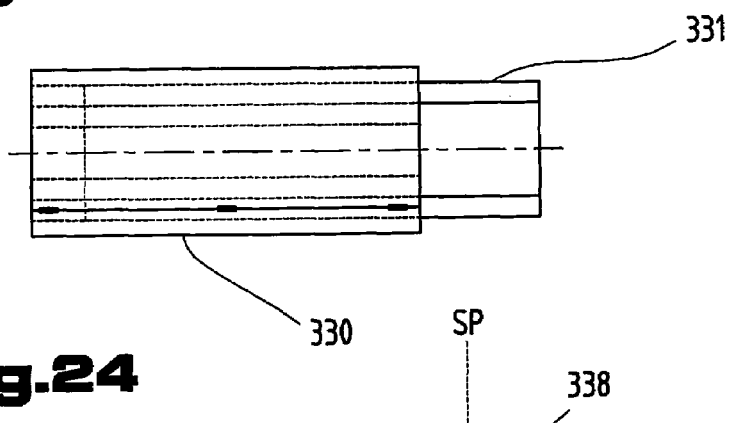
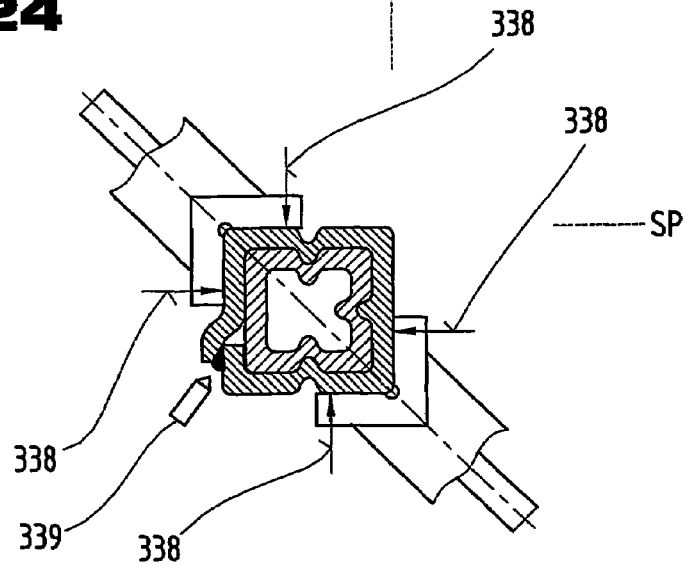

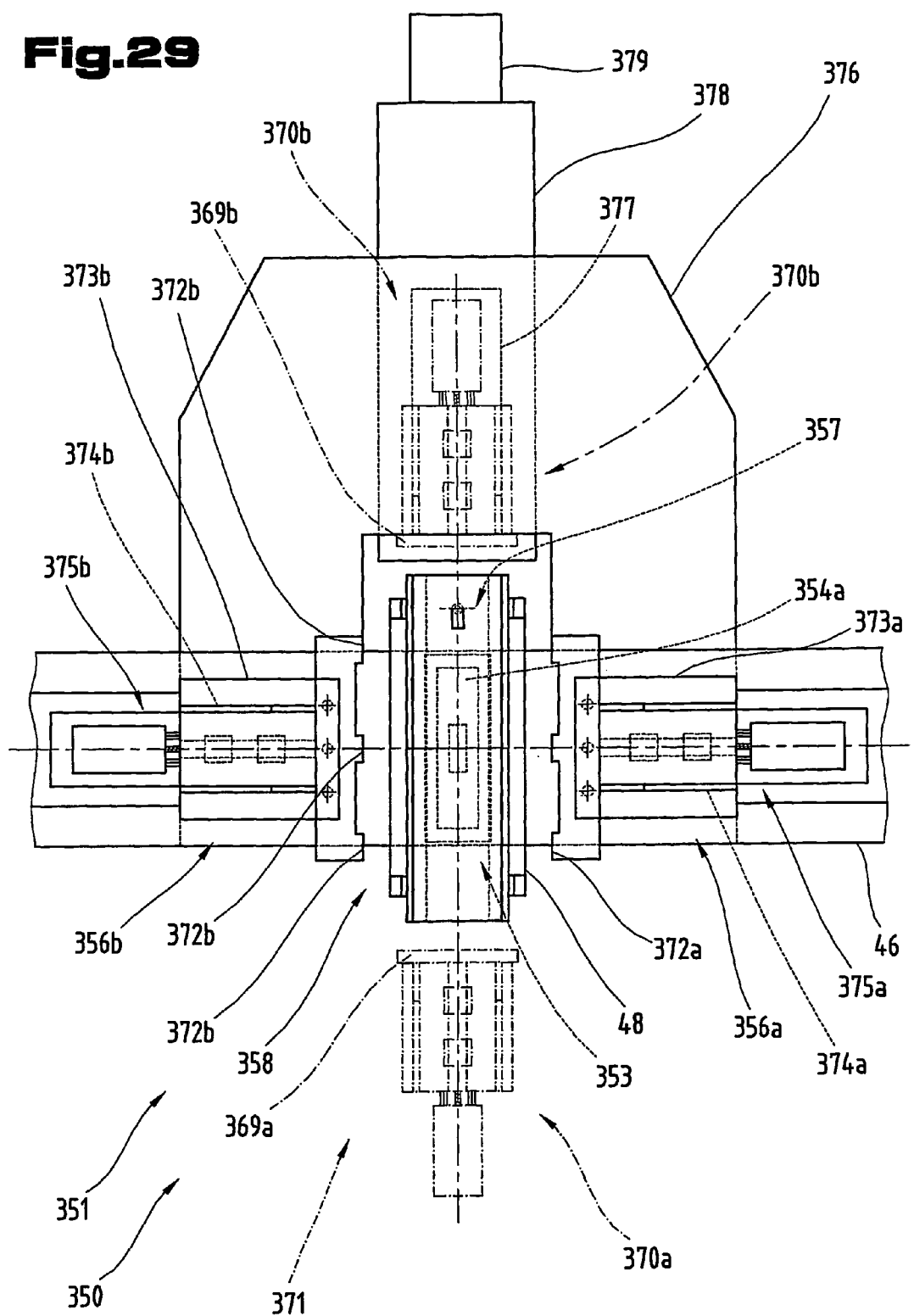

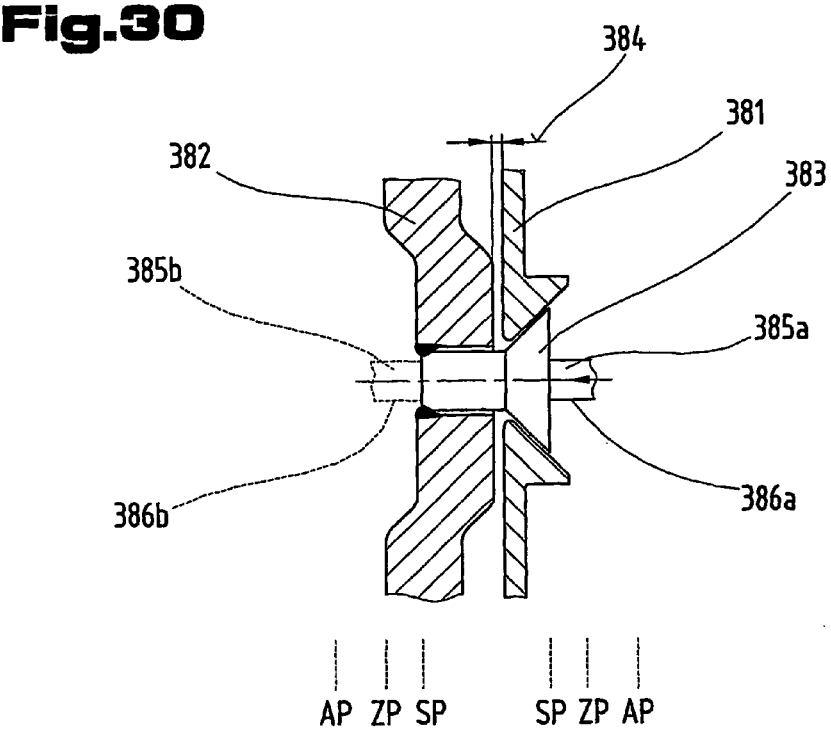
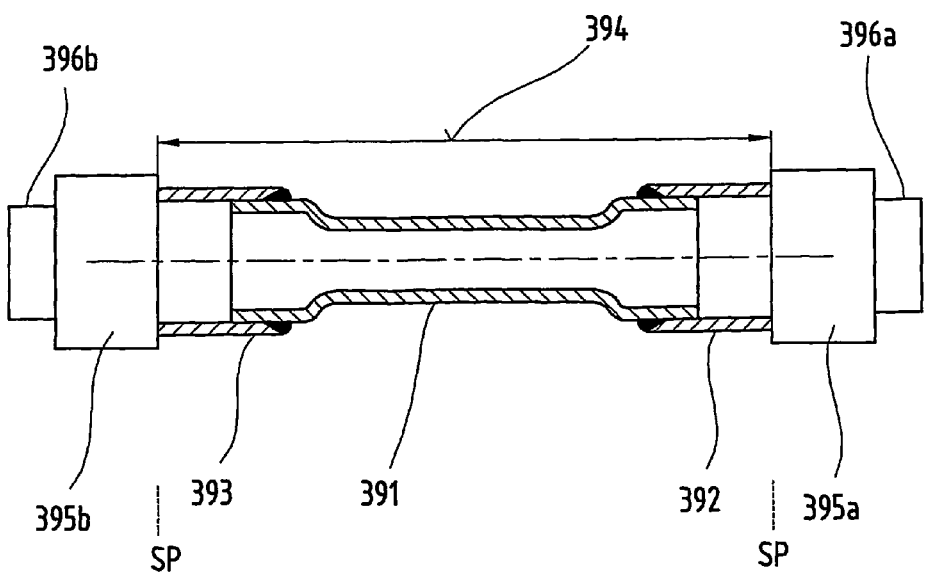

PRODUCTION INSTALLATION AND METHOD FOR JOINING PARTS

CROSS REFERENCE TO RELATED APPLICATIONS

This application is the National Stage of PCT/AT2005/000501 filed on Dec. 14, 2005 which claims priority under 35 U.S.C. §119 of Austrian Application No. A 2192/2004 filed on Dec. 29, 2004. The international application under PCT article 21(2) was not published in English.

The invention relates to a production method and a production system for producing a sub-assembly consisting of a plurality of parts by joining.

A production system is known from EP 0 438 988 B1 for producing a sub-assembly of parts by joining, which comprises two parts delivery sites for different parts, a production installation and a conveying device for the sub-assembly welded together from the individual parts. The parts delivery sites comprise a plurality of palletisable containers, in each container of which parts of one type are stored. Similarly, the conveying device has a plurality of palletisable containers for receiving the welded sub-assemblies. The production installation is formed by clamping units and welding and handling robots arranged in the vicinity of the parts delivery sites. Each of the clamping units has a table which is rotatable about a vertical axis, which is provided with two cooperating clamping devices. The rotatable table may be stopped in two different positions, in each of which a portion of the rotatable table opposes the corresponding parts delivery site, so that said table may be loaded with different parts taken from the parts delivery sites. The parts are then provisionally assembled and fixed by means of the clamping devices and connected to one another via the welding robots. Subsequently, the welded sub-assemblies are deposited into the containers of the conveying device. This known production system is only designed for a small number of parts and permits the processing of only a small range of parts.

A further embodiment of a production system is known from DE 100 18 422 A1, which comprises three production installations, to each of which is assigned a robot, a beam welding head fastened to the robot arm, a laser beam source (laser generator) as well as a connection interface. An optical waveguide connects the beam welding head to the connection interface, which in turn is connected via an external optical waveguide to the laser beam source. Additionally, the production system is provided with a fourth laser beam source, which is connected via optical waveguides to the connection interfaces of the three production installations. If a production installation is increased by a further robot and beam welding head, the latter is connected via optical waveguides to the connection interface. The laser radiation is coupled via a beam separating filter of the fourth laser beam source into the relevant optical waveguide and into the newly added beam welding head. In the known production system, the production installations are operated in parallel and for each of the production installations a single laser beam source and the possibility of coupling to a further laser beam source is provided. The known production system is only able to be implemented by a high level of cost as the laser beam sources are very expensive to provide.

From EP 0 743 135 B1 a manufacturing unit is known for producing a component consisting of several parts by welding, which on both sides of a portal comprises a feed device for providing the parts and two manufacturing units inside the portal, each of which consists of a welding station with a beam welding head that is adjustable along the portal and a clamping unit. The feed device comprises a collet, which is arranged to be mobile in the longitudinal direction of the portal. The collet has a horizontal slot for attaching the placing rollers on both sides. The clamping unit comprises two clamping devices, which each consist of a clamping table and a pressure plate that is adjustable relative thereto. Between the two manufacturing units there is a removal device for the welded components. According to the method the parts are placed on the placing rollers and moved opposite one another in the horizontal slot and held in the latter in a clamped manner. Then the collet moves into the welding station of the manufacturing unit and places the parts onto the clamping table, where the latter are secured by the pressure plate. Then the pressure on the parts in the horizontal slot is lifted and the collet is moved out of the welding station. Then a butt joint between the parts is released along which a laser beam is guided, so that a weld is formed between the two parts. The disadvantage of this known device is that the collet has to be provided with clamping elements that are adjustable relative to one another, whereby the total weight of the collet is high and the collet can be moved from the parts readiness position into the welding station only at a low speed. These high drive times do not allow economical manufacturing, which makes the use of the known manufacturing unit impossible for mass production.

A method for joining together parts in a welding installation is known from EP 1 281 471 A1, in which at least two parts are transported on a parts carrier into a welding station, and are clamped and positioned by means of a clamping and positioning device arranged thereon and are welded on the way into the welding station to form a parts group. This known method is an advantage when the transport times of the parts, that are mounted, positioned and clamped onto the parts carrier, to a welding station have to be longer, as during this transport time the welding operation is carried out and a prefabricated parts group is supplied to the welding station. However, if short transport times are required, the parts carrier has to be driven at higher drive speeds, which are restricted due to the high mass of the clamping, positioning and possibly welding device formed additionally on the parts carrier. If in this known system the driving speed of the parts transporter is increased, the latter are set into oscillation, which is why the welding of the parts on the parts carrier is not sufficiently precise.

It is the object of the invention to provide a production method and a production system for producing a sub-assembly of a plurality of parts by joining, by which a high utilisation of the energy source which is very costly to provide, in particular a laser beam source, is achieved and the cycle times for the joining process in the assembly station and for the transport of the parts and sub-assemblies along the transport system may be kept short.

The object is achieved by the measures and features according to the invention. It is advantageous that the clamping and welding processes in the first production installation and the transport process in the second production installation or vice versa, are carried out simultaneously, whereby on the one hand a single energy source, in particular a laser beam source, is utilized optimally for the two beam welding stations and, on the other hand, the production flow is not interrupted and the total cycle time for producing a sub-assembly by the production system is optimized.

The measures and features according to embodiments of the invention are also advantageous, as the parts or the previously joined sub-assemblies and the further part are transported together via a parts transport carrier into the first or second beam welding station and are moved in this beam welding station via at least one vertical positioning device from the parts transport carrier into the preparation position, and the parts are accurately positioned and clamped relative to one another irrespective of the positional accuracy of the parts transport carrier relative to the beam welding station. Similarly, the beam welding station may be of simple construction, as only one vertical positioning device is required. After the welding operation, the welded sub-assembly is deposited on the parts transport carrier and transported away via said parts transport carrier.

Other embodiments, are also advantageous, according to which the parts or the previously joined sub-assembly and the further part are handled via vertical positioning devices configured separately from one another. As a result, an accurate positioning of the parts or the previously joined sub-assembly and the further part relative to one another is achieved.

According to other embodiments, an accurate positioning of the parts relative to one another and relative to the beam welding station is achieved.

Other embodiments permit a particularly simple control of the clamping units comprising the clamping tools.

According to another embodiment, the parts to be joined together or the sub-assembly and the further part are always clamped in the same clamped position irrespective of their dimensional deviations and the joint point formed therebetween is centrally clamped relative to the beam welding station. As a result, a beam welding head has to move exclusively according to a motion path programmed once, and thus the parts or the sub-assembly and the further part are connected together correctly at the joint point.

Another embodiment is also advantageous, as the displacement path between the initial and intermediate position is naturally greater than the clamping path and, therefore, the time required for the advance of the clamping tool(s) from the initial position into the intermediate position is kept within limits, so that the average cycle time for the positioning and clamping process of the parts or sub-assembly and the further part is shortened and a high degree of process reliability is achieved.

According to another embodiment, the parts to be joined or the sub-assembly and the further part are supplied in a specific time interval continuously to the beam welding station and, as a result, an optimal utilization of the beam welding station is achieved.

According to another embodiment, a strategy for the sequence of movement of the parts transport carrier may be carried out, depending on the utilization of the beam welding station.

Another embodiment is also advantageous as the parts and/or the sub-assembly in the beam welding station are only lifted to the extent of a few millimeters from the parts transport carrier, for example, then the positioning and joining process of the parts and/or sub-assembly takes place and then the joined sub-assembly is again deposited on the same parts transport carrier. Thus the cycle time of the beam welding station may be further optimized.

A further optimization of the cycle time for the transport system is disclosed according to another embodiment.

According to another embodiment, an optimal utilization of the energy source is achieved.

By another embodiment, collisions between the beam welding head and the clamping system may be avoided and the beam welding head may only be advanced into the start position when the parts have been fixed and checked for dimensional stability and verified as "perfect parts". If one of the parts does not correspond to the dimensional stability, this part is verified by the evaluation unit as an "imperfect part", and the beam welding head is not even moved into the start position in the vicinity of the joint point between the parts. As a result, unnecessary displacing movements of the beam welding head are avoided, the beam welding station only briefly stopped and the "imperfect part" not further processed and deposited on a parts transport carrier and ejected.

Another embodiment is also advantageous, according to which the parts or the previously joined sub-assembly and the further part are moved via vertical positioning devices, which oppose one another transversely to the advancing direction of the parts transport carrier and are configured separately from one another, into a pre-determined preparation position in the beam welding station and then clamped. In addition, an undesired displacement of the parts or the previously joined sub-assembly and the further part, during the movement from their transport position into the preparation position, is avoided.

According to other embodiments, the lifting device of the vertical positioning device(s) may be controlled independently of the clamping system.

According to other embodiments, a lifting of the parts or previously joined sub-assembly and of the further part from the transport position into the preparation position is promoted.

Other embodiments are also advantageous as the clamping devices of the first and second clamping unit are arranged in a space-saving manner and comprise a clear number of displacement axes, which in turn is important for optimizing the cycle time of the positioning and clamping process of the parts and/or sub-assembly in the clamping system.

In an advantageous embodiment of the production installation, the construction of the clamping devices is further simplified, and a high degree of reliability in the mode of operation of the clamping devices in the basic production operation is provided.

In advantageous embodiments or the invention, an accurate displacement and positioning of the bearing element or of the clamping tool is possible. The steplessly controllable electric motors, in particular servomotors, are connected to an evaluation unit, which is designed for detecting the clamping force and/or the displacement and clamping path, using which it is possible to monitor production.

According to another embodiment it is advantageous that the first part held positioned via the clamping tools in a first spatial direction is also positioned and fixed in a second spatial direction via a pressing element. In this manner, a particularly high degree of positional accuracy of the part relative to the beam welding station is achieved.

Another embodiment is advantageous, according to which the parts or sub-assembly respectively transported on a parts transport carrier to the assembly station are moved via vertical positioning devices, which are separate from one another, into the pre-determined preparation positions and then clamped. As a result, an accurate positioning of the parts or the sub-assembly and of the further part relative to one another is possible.

Another embodiment is also advantageous, according to which the parts or the previously joined sub-assembly and the further part are moved via vertical positioning devices, which oppose one another in pairs and are configured separately from one another, into a pre-determined preparation position independently of one another and then clamped. An undesired displacement of the parts or the sub-assembly and the further part during the movement from their transport position into the preparation position is effectively avoided.

However, another embodiment is also advantageous as the pressing element of the pressing device fulfils a plurality of functions and, as a result, the structure of the clamping devices is further simplified.

According to an embodiment of the clamping devices of the third clamping unit in the first production installation, the parts may, on the one hand, be positioned in a third spatial direction and, on the other hand, clamped. In other words, the clamping devices of the third clamping unit fulfil a plurality of functions and an optimization of the cycle time and a simple structure of the clamping system is achieved.

The arrangement of the third clamping unit, as disclosed in another embodiment, is also advantageous as the space which is otherwise present along, and to the side of, the transport device is utilized.

Another embodiment is also advantageous, as the clamping devices of the third clamping unit comprise a clear number of motion axes, which in turn is important for optimizing the cycle time of the positioning and clamping process of the parts or the sub-assembly and the further part in the clamping system.

In an advantageous embodiment of the invention, an accurate displacement and positioning of the clamping tool is possible. The steplessly controllable electric motors, in particular servomotors, are connected to an evaluation unit, which is designed for detecting the clamping force and/or the displacement and clamping path, using which it is possible to monitor the production.

In a further embodiment of the production installation according to the invention, advantageously, the displacing movements of the clamping devices of the first and second clamping unit are superimposed, so that the displacement times of the individual clamping devices of the clamping system may be reduced.

The invention further relates to a method and a production installation for producing a joint connection between parts.

A clamping unit is known from EP 1 384 550 A1, which comprises a fixed clamping tool and a clamping tool movable by means of a servodrive, between which metal plates may be partially clamped. The clamping unit is flange-mounted on a robot arm and may be positioned spatially by the robot in the region of the working range of the robot arm in any manner. On the clamping unit, in particular on the movable clamping tool, a guide is attached, along which a beam welding head, for example a laser welding head or plasma welding head, may be guided and moved relative to the clamping tool. The beam welding head is moved by means of a welding drive, in particular servodrive. The metal plates resting on one another are firstly at least partially clamped via the clamping tools and the beam welding head moved along the guide relative to the clamping unit and the metal plates welded to one another. The servodrive for the movable clamping tool is connected to an electronic evaluation unit, by means of which the clamping force and/or the displacement path of the movable clamping tool is detected and evaluated. Thus, for example, a monitoring function in the sense of a quality assurance or a monitored clamping of the metal plates may be achieved.

DE 102 06 887 A1 discloses a method for laser-welding sheet metal parts in which the sheet metal parts of a door post are moved and clamped between two clamping tools able to be displaced towards one another by means of steplessly controllable servomotors. The clamping of the sheet metal parts takes place in a position and/or force controlled-manner, depending on the desired-actual value-comparison of the dimensions and/or surfaces of the welded sheet metal part. Via a sensor, the actual position of the surfaces of the door post is detected and input to a controller, from which the desired values for the position are pre-determined from the desired dimensions of the door post. If the actual value of the position deviates from the desired value of the position, at least one of the clamping tools is positioned against the surface of the door post. By electronically controlling the servomotors, the bearing forces of the clamping tools on the surfaces of the door post are determined from the torques exerted and transmitted to the controller. By means of desired-actual value-comparisons in the controller, corresponding correction values are input to the electronic control units of the servomotors. It is a drawback that the position of the door post is determined exclusively via the sensor, and as a result of the basic production process it has to be taken into account that the sensors may provide faulty measurements and, therefore, the clamping and welding of the sheet metal parts may be faulty.

The object of the invention is to provide a production installation for producing a connection between parts, by which production monitoring may take place and the production process may be improved.

The object is achieved by the measures and features in accordance with the invention. It is advantageous that in the assembly station only those parts are supplied to a further operating process whose quality features correspond to the quality requirements and further parts are not even clamped when the previously clamped part deviates from the quality requirements. To this end, the actual values of the clamping force and/or of the displacement and clamping path of a movable clamping tool of each clamping unit are detected and the quality feature, in particular the dimensional stability for each part, is determined. According to an embodiment, the parts are only joined when the prescribed quality feature of each part is maintained. As a result, the assembly station is not blocked by unnecessary clamping and joining processes and a part verified as an "imperfect part" is removed from the assembly station. The evaluation of the quality feature takes place solely using the actual values of the clamping force and/or the displacement and clamping path detected in any case during the positioning and clamping process of a part. Advantageously, according to an embodiment, the desired value for the clamping force and the displacement and clamping path to be covered by the displaceable clamping tool are pre-determined in a defined manner by a tolerance window, which is established such that the subsequent joining process, for example the beam welding, may be still carried out correctly. In other words, by the selected joining method a maximum deviation of a quality feature, in particular the dimensional stability, is pre-determined by the tolerance window, within which a still sufficiently accurate joining result is achieved. Thus a robust production process is provided, which reduces wastage and average production times. Moreover, from the evaluation unit using the detected actual value for the clamping force on the part moved into the clamped position and/or the displacement and clamping path covered by the clamping tool, the dimensions, for example the length, of the part may be determined. As a result, measured value protocols for a quality assurance system may be automatically set. A substantial advantage of the invention lies also in the method according to an embodiment that the parts to be joined together in the assembly station are always positioned in the clamped positions, pre-determined by the tolerance window, and fixed therein. Thus, the joining of the parts may take place without having to undertake lengthy positioning processes of the joining device relative to the joint point. The positioning of the joining device is based on the knowledge that the joint point between parts to be joined together is always within permissible tolerance limits, when the parts correspond to the quality requirements. A monitoring of the exact position of the joint point in time-intensive, sensor-assisted testing processes may be dispensed with, whereby the cycle time for the joining process may be considerably minimized. This additionally results in the advantage that the freedom of movement of the joining device is unrestricted and also smaller sub-assemblies may be easily produced, as the sensor for testing the joint point is dispensed with.

This additionally results in the advantage that the freedom of movement of the joining device is unrestricted and also smaller sub-assemblies may be easily produced, as the sensor for testing the joint point is dispensed with.

Other Embodiments allow a particularly simple control of the clamping units comprising the clamping tools.

According to the another embodiment, irrespective of dimensional deviations of the parts to be joined together, the same clamped position of the parts and of the joint point formed therebetween is adopted centrally relative to the assembly station. As a result, a joining device, in particular a beam welding head or adhesive supply head, is exclusively moved according to a displacement path which has been programmed once, and the parts are thus joined together correctly at the joint point.

Another embodiment is also advantageous, as the displacement path between the initial and intermediate position is naturally greater than the clamping path and, therefore, the time consumption for the advance of the clamping tool(s) from the initial position into the intermediate position is kept within limits, so that the average cycle time for the positioning and clamping process of the parts is shortened and a high degree of process reliability is achieved.

Another embodiment is also advantageous, whereby a control of the displacement speed of the displaceable clamping tool(s) takes place in a load torque-dependent manner. The displacement speed of each clamping tool is always controlled depending on the force increase during the positioning and clamping process. Only with a progressive force increase is the displacement speed of the clamping tool progressively reduced. However, if the force increase is approximately constant, the displacement speed of the clamping tool is also maintained approximately constant. When the clamping force reduces, the displacement speed of the clamping tool is progressively increased. In this manner, the quality features, in particular the dimensional stability, of the parts to be positioned and clamped has an effect on the displacement speed of the clamping tools and an optimization of the cycle time of the clamping system is achieved.

Another embodiment is also advantageous, whereby the control of the clamping devices is substantially simplified.

Another embodiment proves advantageous as, before the startup of the assembly station, reliable values for the lower and upper limits of the clamping force and/or of the displacement and/or clamping path may be determined from practical tests.

Another embodiment is also advantageous, whereby the data, which is electronically detected in any case during the clamping and joining process from one assembly station, may be used for controlling further clamping and joining processes in the same or a further assembly station and, therefore, possible tolerance deviations may be acted upon, so that inaccuracies in the dimensions and shape of the sub-assembly may be corrected and a prescribed final quality of the sub-assembly is maintained. Expediently, the data are stored in a data bank and the data detected from a specific number of clamping and joining process are statistically evaluated and using the evaluation an adaptation of the lower and/or upper limit is carried out. Advantageously, the lower and upper limits of the tolerance window are automatically altered, without manual interference in the process sequence of the assembly station. Such an assembly station is characterised by a high degree of flexibility. If the cost of control is to be kept low, it would, however, also be possible just as easily to correct the lower and/or upper limits of the tolerance window by manual input in the control device of the evaluation unit.

According to a further advantageous embodiment, on the finished joined end product deviations of quality features are determined and the lower and/or upper limits of the tolerance window are acted upon by correction values from the control device. Expediently, measured values are determined and statistically evaluated from a specific number of end products and, using the evaluation, an adaptation of the lower and upper limits is undertaken.

Another embodiment is also advantageous, in which the clamping force is evaluated with a high degree of accuracy from the exerted torque of an electric motor. Additional sensors for detecting the clamping force and/or the displacement and clamping path may be dispensed with. The detected measured values are forwarded for further processing, for example, to a control device.

According to another embodiment, from the exerted torque of an electric motor, the frictional force on the drive unit to be overcome is detected by the evaluation unit. Thus on the one hand, the friction caused by the system and, on the other hand, the friction produced by the weight force of parts, are taken into account.

Another embodiment is also advantageous, according to which the parts are moved via vertical positioning devices, which oppose one another transversely to the advancing direction and are configured separately from one another, into a pre-determined preparation position in the assembly station and then clamped. In this connection, an undesired displacement of the parts during the movement from their transport position into the preparation position is avoided.

Moreover, the invention relates to a method for joining parts in an assembly station.

Joint connections are known from the prior art in which an internal part is attached between two outer parts with defined pretensioning. To this end, the inner part is moved between the outer parts and then the outer parts are advanced towards one another sufficiently far, so that the pretensioning is set. If dimensional deviations occur on the parts, fluctuations in the pretensioning to a greater or lesser degree have to be taken into account. A reproducible connection between the parts is no longer provided.

It is the object of the invention to provide a method for joining parts in an assembly station, with the inaccuracies in dimensions and possibly shapes of the parts to be joined together being eliminated.

The object is achieved by the measures according to the invention. It is advantageous that, by evaluating the clamping force and/or the displacement path between at least one movable clamping tool, a pretensioning of the inner part may be set in a controlled manner. After setting the pretensioning in the inner part, the joining process takes place without altering the pretensioning again. Moreover, it is advantageous that production inaccuracies of the parts have no effect on the pretensioning of the inner part and the final accuracy of the sub-assembly. Additionally, the sub-assembly may be produced particularly economically. A sub-assembly produced according to the method according to the invention finds a wide application, for example in drive engineering, motor vehicle technology, and the like.

Another embodiment is also advantageous, according to which by the resilient restoring force acting on the inner part counter to the advancing movement of the outer part, the parts are pressed against one another at least in partial sections, and as a result the frictional force between the parts is set, which is maintained constant over the entire time of use of the sub-assembly produced according to the inventive method. If the inner part is possibly even plastically deformed, additionally greater dimensional inaccuracies may be eliminated and the elastic resilience of the plastically deformed inner part ensures the corresponding frictional force between the parts.

The object is also achieved by the measures according to the invention. It is advantageous that a prescribed dimension, for example a defined clearance between two parts, is automatically set on a sub-assembly, solely using the positioning and clamping process of the parts. After setting the prescribed dimension, the joining process takes place without having to alter the set dimension again. Moreover, it is advantageous that production inaccuracies of the parts have no effect on the final accuracy of the sub-assembly and dimensionally stable sub-assemblies may be produced. Additionally, the sub-assembly may be produced particularly economically. Another embodiment is also advantageous, according to which the desired value for the clamping force and the displacement and clamping path of the displaceable clamping tool to be covered are pre-determined in a defined manner by a tolerance window, which is established such that the subsequent joining process, for example the beam welding, may still be carried out correctly. In other words, by the selected joining method a maximum deviation of a quality feature, in particular the dimensional stability, is pre-determined by the tolerance window, within which a sufficiently accurate joining result is achieved. Thus wastage is considerably reduced.

According to another embodiment, the welding stresses occurring at two separate points during welding, although these are also very low, are almost completely eliminated, so that the overall accuracy of the sub-assembly is further optimized solely by the clever arrangement and position of the weld seams.

Another embodiment is also advantageous as these joining methods only produce the smallest residual welding stress and the distortion is negligible, and therefore in connection with the high positioning and clamping accuracy of the parts, a high dimensional stability of a sub-assembly welded from the parts is produced, although the production accuracy of the parts is relatively low relative to the overall accuracy of the sub-assembly.

Finally, according to the method according to the invention, a measure is disclosed in which an even better dimensional stability of the assembly is achieved.

The invention is described in more detail hereinafter with reference to the embodiments shown in the drawings, in which:

FIG. 8 shows an exemplary embodiment of a parts delivery site in the form of a conveying device with auxiliary parts transport carriers, in side view and in a considerably simplified representation;

FIG. 9 shows the conveying device according to FIG. 8 in front view, partially in section and in a considerably simplified representation;

FIG. 10 shows a perspective view of an assembly station of the first production installation, shown considerably simplified;

FIG. 11 shows a drive system for a welding device of the assembly station according to FIG. 10, in a considerably simplified representation;

FIG. 12 shows a partial section of the transport device without the parts transport carrier and feed axes arranged on both sides thereof, as well as the drive units for clamping devices of a clamping system of the assembly station according to FIG. 10, in a considerably simplified representation;

FIG. 13 shows a clamping system of the assembly station shown in FIG. 10, in side view and a considerably simplified representation;

FIG. 13a shows a partial region of the clamping system shown in FIG. 13 in an enlarged and simplified view;

FIG. 14 shows a plan view of the clamping system according to FIG. 13, in a considerably simplified representation;

FIG. 15 shows an embodiment of a vertical positioning device of the clamping device of the clamping unit, in side view and in a considerably simplified representation;

FIG. 16 shows a further embodiment of the vertical positioning device for the clamping devices of the clamping unit, in side view and in a considerably simplified representation;

FIG. 17 shows a view of the vertical positioning devices according to FIG. 16 in a considerably simplified representation;

FIGS. 19a to 19c show the positioning and clamping process of a sub-assembly and with a further part to be connected thereto in successive method steps in the second production installation in different views and in a considerably simplified representation;

FIG. 21 shows a diagram of the path of the clamping force over the clamping and displacement path of a clamping tool and the evaluation of the clamping process as an imperfect part;

FIG. 22 shows a diagram of the path of the clamping force over the clamping and displacement path of a clamping tool and the evaluation of the clamping process as an imperfect part;

FIG. 23 shows a further embodiment of a clamping system for carrying out a method for joining two parts with two clamping tools in the intermediate position, in front view and in a considerably simplified representation;

FIG. 24 shows the welded parts as a sub-assembly according to FIG. 23 in a side view and in a considerably simplified representation;

FIG. 25 shows the clamping devices according to FIG. 23 with two clamping tools in a clamped position as well as a schematically indicated beam welding device;

FIG. 29 shows a plan view of the clamping system for producing the sub-assembly according to FIG. 26, in a considerably simplified representation;

FIG. 30 shows a detail of a further embodiment of a sub-assembly with the clamping tools illustrated in the clamped position, sectioned and in a considerably simplified representation;

FIG. 31 shows a further embodiment of a sub-assembly with the clamping tools illustrated in the clamped position, sectioned and in a considerably simplified representation;

Figure 1:
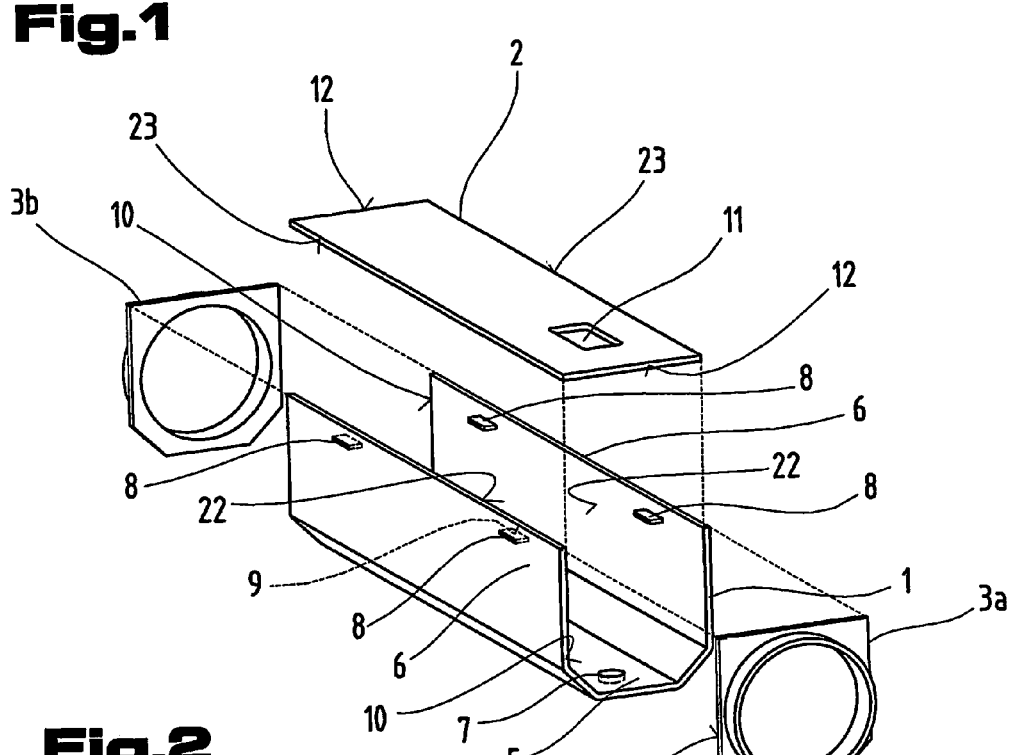
FIG. 1 shows the parts of a sub-assembly to be produced from said parts, in a perspective view and a simplified representation.

Firstly, it should be pointed out that the same parts described in the different embodiments are denoted by the same reference numerals and/or the same component names, the disclosures made throughout the description being able to be transposed in terms of meaning to the same parts bearing the same reference numerals and/or the same component names. The positional information selected for the purposes of the description, such as for example above, below, to the side etc. relate to the drawing being specifically described and illustrated and may be transposed in terms of meaning to a new position when the position is altered. Moreover, individual features or combinations of features from the different embodiments illustrated and described may represent independent inventive solutions or solutions proposed by the invention in their own right.

In FIG. 1, individual parts 1, 2 3a, 3b to be joined together to form a sub-assembly are shown in a perspective view. These parts 1 to 3b are produced in a preferred embodiment respectively from a sheet metal part cut to size, in particular stamped and then shaped. The first stamped and bent part 1 is configured in cross section approximately trapezoidally and/or substantially U-shaped and has a base 5 and two limbs 6 projecting therefrom. On the base 5, for example, a circular positioning opening 7 is arranged, the function thereof being explained below in more detail. The limbs 6 are respectively provided in the region of their opposing front ends with bearing extensions 8 projecting in the direction of the opposing limb 6 on the inner face of the U-shaped part 1, the function thereof being described below in more detail. These bearing extensions 8 are expediently bead-like indentations produced by shaping, and have on their upper face remote from the base 5 a planar support surface 9 extending parallel to the base 5. Moreover, the first part 1 on the front face has planar bearing surfaces 10 for the parts 3a, 3b.

The second part 2 is according to this embodiment cut out from a substantially planar sheet metal part, for example stamped out using a sheet metal blank and is of planar configuration. Additionally, the second part 2 is provided with a, for example, slot-like positioning opening 11, and forms bearing surfaces 12 for the parts 3a, 3b on the front face. The lengths of the first and second part 1, 2 are, apart from the possible production tolerances during stamping, etc. produced to be the same.

The parts 3a, 3b have a planar support plate 15 and a sleeve 16. To this end, the parts 3a, 3b are respectively produced from a sheet metal part cut to size and preferably stamped and a sleeve 16 formed therein by forming, preferably by deep drawing. The sleeves 16 respectively form a bearing eye for a bearing, not shown further, which for example is pressed in.

Figure 2:
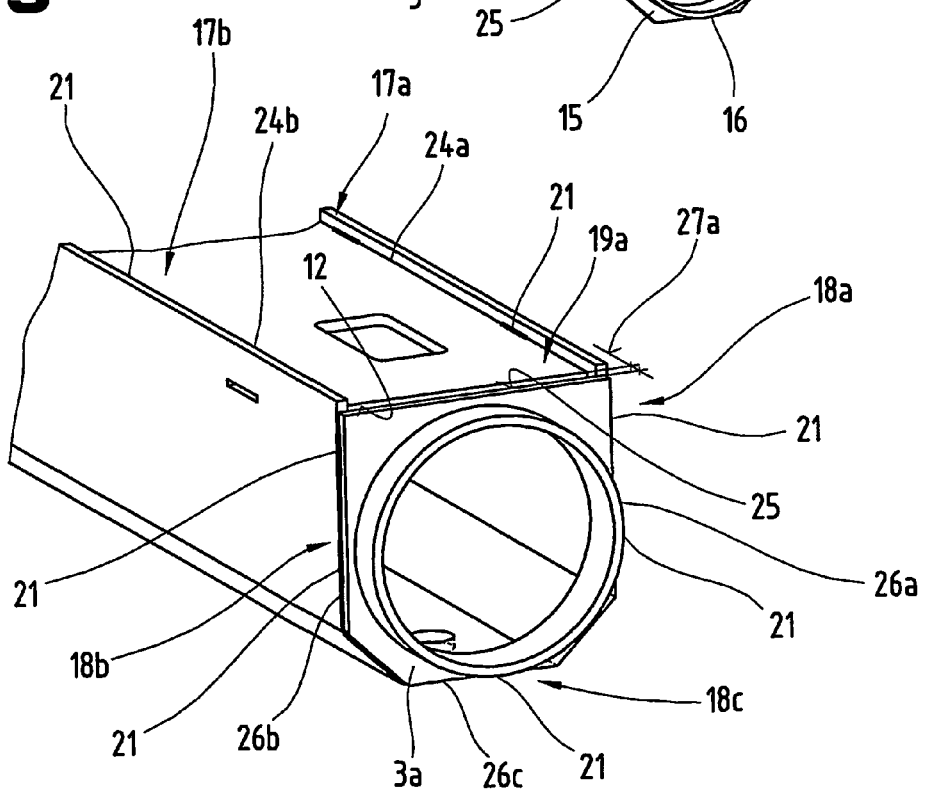
FIG. 2 shows a portion of a sub-assembly joined together from the parts shown in FIG. 1, in a perspective view and a simplified representation.

All parts 1 to 3b are thus produced by simply forming and shaping without cutting, with a high degree of precision, so that the sub-assembly joined from the individual parts 1 to 3b, as is partially shown in FIG. 2, by using suitable joining methods, such as bonding, laser soldering, laser beam welding, plasma beam welding and electron beam welding, may also be produced with a high degree of dimensional accuracy.

Although the production of the parts 1 to 3b without cutting, according to the stamping method, applies as the preferred embodiment, it might also be conceivable that said parts are produced from a sheet metal part cut out using a laser or water jet.

Reference might also be made at this point to the fact that the individual parts 1 to 3b shown in FIGS. 1 and 2 and the sub-assembly produced therefrom do not in any way restrict the invention, but instead, depending on the field of application of the sub-assembly, adopt different geometries and the parts 1 to 3b may be produced in different ways. Thus the parts 1, 3a, 3b produced according to the cold forming method may otherwise also be formed by a solid formed part, for example a forged part which is produced by hot or cold forging in a dimensionally accurate manner. The parts 1 to 4 are formed from steel or plastics material. If the parts are made of plastics material, said parts are produced in an injection moulding and/or extrusion method.

As produced in FIG. 2, the parts 1 to 3b at a plurality of joint points 17a, 17b, 18a, 18b, 18c, 19a, 19b (not included) are joined together at least partially by one or preferably a plurality of joint seams 21. The joint seams 21 are formed by bonded or weld seams, in particular laser, plasma or electron beam weld seams and have a length of several millimetres up to a several centimetres.

The second part 2 is arranged between the limbs 6 of the first part 1, and the limbs 6 of the first part 1 and longitudinal edges of the second part 2 are pressed against one another by means of clamping devices to be described in more detail later. To this end, the limbs 6 and the second part 2 are provided on their sides facing one another with bearing surfaces 22, 23. The parts 1, 2 to be welded to one another thus form in each case a butt joint 24a, b at the joint points 17a, 17b, as a result of the bearing surfaces 22, 23 of the parts 1, 2 abutting one another substantially without gaps. The two parts 1, 2 are joined together via the joint seams 21 to be attached along the butt joints 24a, 24b.

The parts 3a, 3b are connected to the front face of the first part 1. To this end, the part 3a, 3b on its side facing the first part 1 and the first part 1 on its front face are provided with bearing surfaces 10, 25 facing one another. The parts 3a, 3b are pressed against the bearing surfaces 10 of the first part 1 via clamping devices to be described in more detail below with their bearing surfaces 25, so that the bearing surfaces 10, 25 bearing against one another substantially without gaps form a butt joint 26a, 26b, 26c at the joint points 18a, 18b, 18c. The parts 1, 3a, 3b are joined together via joint seams 21 to be attached along the butt joints 26a, 22b, 26c.

Although the stamping and forming of the parts 1 to 3b permit a high degree of dimensional accuracy, slight dimensional inaccuracies may occur. These inaccuracies may result in a joint gap 27a, 27b (not illustrated) occurring between the bearing surfaces 12, 25 which face one another of the parts 2, 3a, 3b. In practice, it has been shown that said joint gap 27a, 27b, up to an extent of 0.2 mm, has no effect on the quality of the welded connection, if it is welded without additional material, as the laser beam at the focal point in any case has a diameter of approximately 0.3 to 0.6 mm and sufficient basic material of the parts 2, 3a, 3b is melted away at the welding portions along the connecting point 19a, 19b, in order to close the joint gap 27a, 27b on the welded portions and to produce a load-bearing welded connection.

In a preferred embodiment, the joint seams 21 are produced by beam welding, in particular laser beam welding and the parts 1 to 3b are welded together at the butt joints 24a, 24b, 26a to 26c formed by the bearing surfaces 10, 25, 22, 23 abutting one another without gaps or joint gaps 27a, 27b. To this end, after the parts 1 to 3b have been positioned and fixed relative to one another, a welding beam, not shown, is at least partially guided along the relevant butt joint 24a, 24b, 26a to 26c or joint gap 27a, 27b, so that along these welding portions, weld seams are produced, which consist of the partially melted basic material (material) of one of the parts 1 to 3b to be welded together or both of the parts 1 to 3b to be welded together. The high luminosity (approximately $10^6$ W/m$^2$) of the welding beam, in particular of the laser beam, at the focal point, moves the basic material (material) along the welded portions for melting. Whilst basic material is melted in the advancing direction of the welding beam, the molten material of the parts to be welded together flows together at the rear. The molten and thoroughly mixed material cools and the molten material solidifies to form a narrow weld seam.

The beam welding is an energy efficient welding method by which so-called "deep welding" is possible and is characterised in that very narrow seam geometries are achieved with a high depth-width-ratio and only a low field energy is required, whereby only a very small heat-affected zone results. As a result, the thermal load on the parts 1 to 3b to be welded together is kept very low, so that a distortion of the parts 1 to 3b is also at a minimum. The weld seams 21 on the butt joints 24a, 24b are formed by fillet welds and the weld seams 21 at the butt joints 26a to 26c and at the joint gaps 27a, 27b by square butt welds.

In mass production of the sub-assembly, in the present case the laser welding, in particular with a fixed body laser, for example an Nd:YAG laser is used, which primarily permits a high degree of flexibility of the welding station to be described below in more detail. The parts 1 to 3b are preferably exclusively connected unreleaseably together by the basic material without additional material.

Naturally, it might also be conceivable that the parts 1 to 3b are connected together by the weld seams produced by the addition of supplementary material and the partially melted basic material of at least one part 1 to 3b or both parts 1 to 3b on each butt joint 24a, 24b, 26a to 26c or joint gap 27.

Figure 3:
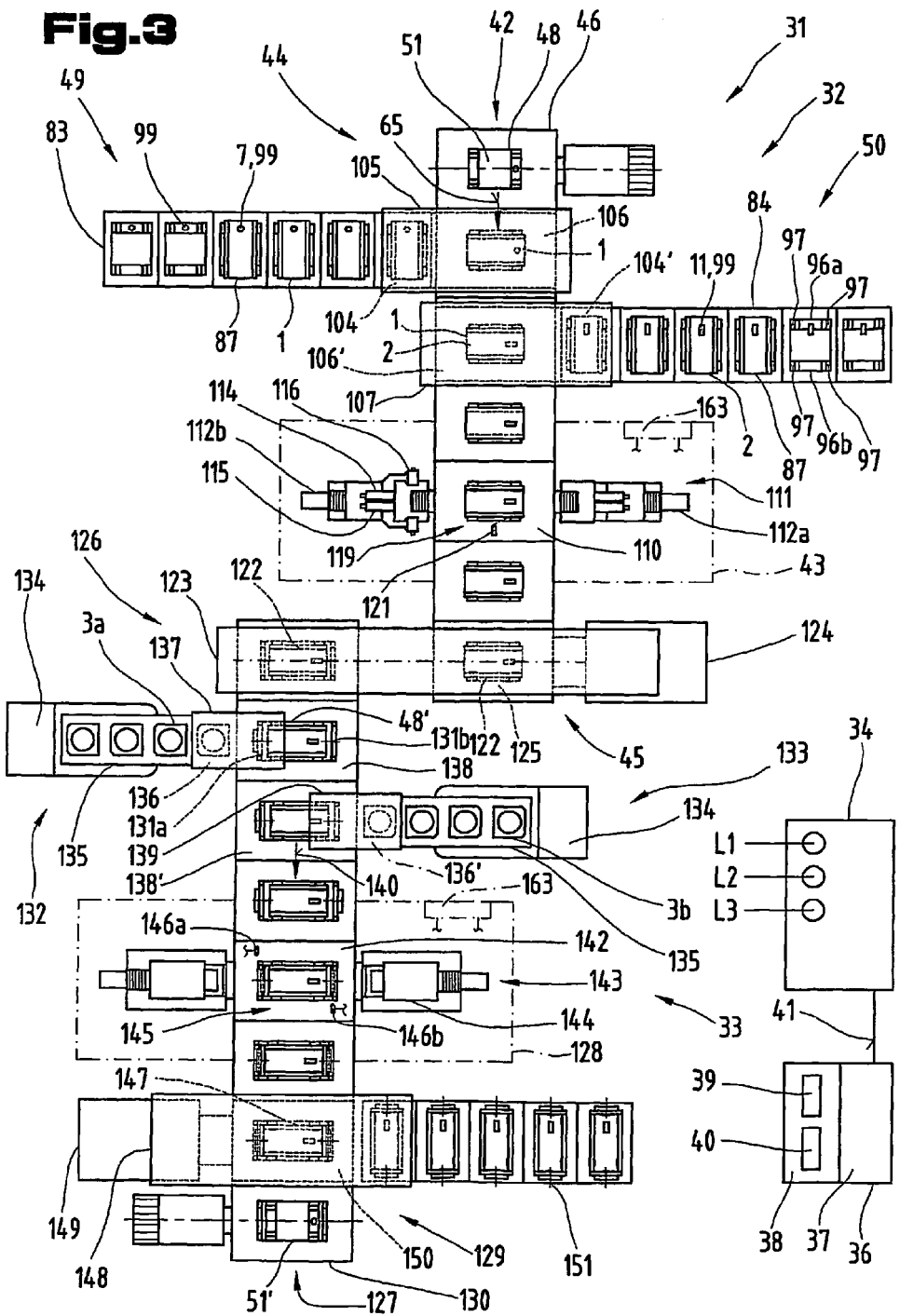
FIG. 3 shows a plan view of a production system according to the invention with a first and second production installation, in a simplified representation.

In FIG. 3, a production system 31 according to the invention is shown for producing the sub-assembly shown, for example, in FIG. 2 in plan view and in a considerably simplified representation. According to this embodiment, said production system 31 comprises at least two cooperating production installations 32, 33 arranged directly in succession, an energy source 34, in particular a laser generator, as well as a control device 36. The control device 36 comprises an energy source 37 and an evaluation unit 38 with a comparison module 39 for the desired-actual value-comparison of a clamping force and/or a displacement and clamping path of a clamping tool and an evaluation module 40 for a quality assessment of a part 1 to 3b, as is described hereinafter in more detail. The control device 36 is connected to the energy source 34 via a connecting lead 41.

Figure 4:
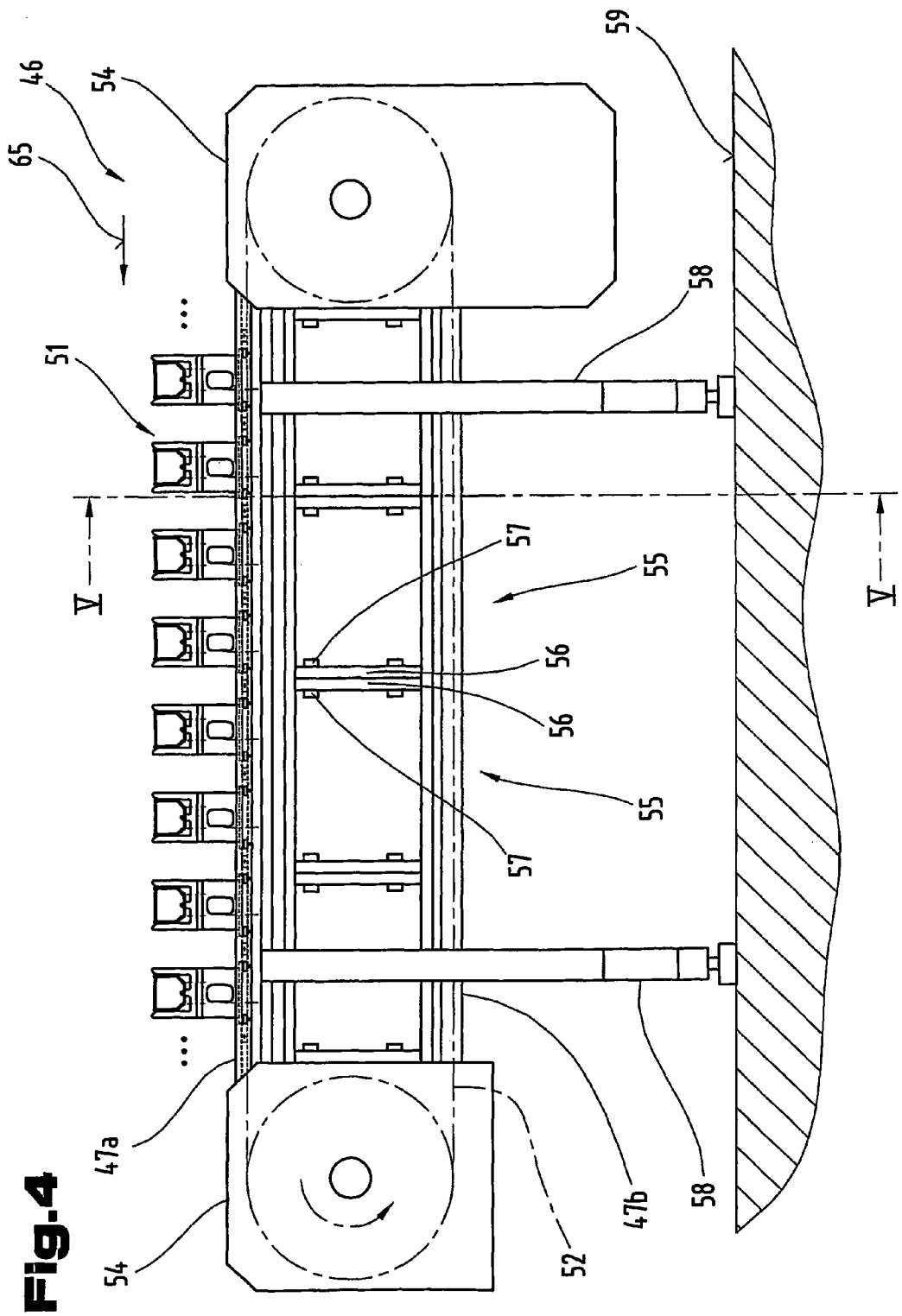
FIG. 4 shows an exemplary embodiment of a transport device of the production installations according to FIG. 3, in side view and a considerably simplified representation.

The first production installation 32 comprises a first transport system 42 and at least one first assembly station 43 which, according to this embodiment, is formed by a welding station. The transport system 42 serves for supplying parts 1, 2 to the assembly station 43 and comprises a first transport device 46 extending preferably in a linear manner between a receiving region 44 and a forwarding region 45 with parts transport carriers 48 which are movable along guide tracks 47a, 47b illustrated in FIGS. 4 to 7, and preferably of the same configuration, as well as at least one parts delivery site with two parts storage units 49, 50 arranged separately from one another. For reasons of improved clarity, only a few parts transport carriers 48 are shown in FIG. 4.

An exemplary embodiment of a transport device 46 is shown in FIGS. 4 to 7. For the transport of the parts 1, 2 on the parts transport carriers 48, receivers 51 are provided which are connected to the parts transport carrier 48. The parts transport carriers 48 form in the present embodiment a transport chain 52. For the advance of the transport chain 52 in a clocked manner, an intermittent feed drive is used, in particular an electric motor, such as a servomotor or stepping motor, which is arranged in the region of a deflector station 54 for the transport chain 52. Between the two deflector stations 54 are located a plurality of housing parts 55. These housing parts 55 have front plates 56 facing one another, which are connected to one another via guide and/or coupling devices 57 to form a self-support housing unit. Perpendicular to the front plates 56 extend the guide tracks 47a, 47b, the pulled strand being guided in the guide track 47a and the returning strand of the transport chain 52 being guided in the guide track 47b.

The transport device 46 formed from the deflector station 54 and the housing parts 55, is supported via support devices 58 on a contact surface 59. The support devices 58 are formed by L-shaped supports arranged mirror symmetrically to a vertical plane of symmetry 60, which are connected via fastening devices 61 to side walls 62 of the housing parts 55.

The transport device 46 comprises the self-support housing unit made up of the housing parts 55, which is provided on the upper face remote from the contact surface 59 with the guide track 47a. The guide track 47a comprises vertical guide tracks 63 fastened to the housing unit and extending parallel to the upper face thereof, for parts transport carriers 48 of the transport chain 52 forming the vertical guidance of the chain members. Additionally, the guide track 47a comprises lateral guide tracks 64 extending parallel to the upper face of the housing unit, for the lateral guidance and the transport parts carriers 48 forming the chain members. The vertical guide tracks 63 are formed by guide strips. The lateral guide tracks 64 are formed by support rollers 66 and pressure rollers 67 arranged spaced apart from one another in the advancing direction—according to arrow 65—of the parts transport carrier 48. The support and pressure rollers 66, 67 are arranged on both sides of the transport chain 52. The support rollers 66 are thus assigned to a first side surface 68 and the pressure rollers 67 to a second side surface 69, opposing said first side surface, of the parts transport carrier 48. The pressure rollers 67 are of conical configuration and compressive force is exerted by said pressure rollers extending transversely to the advancing direction and aligned in the direction of the support rollers 66—according to arrow 65—on the parts transport carrier 48, so that the parts transport carriers 48 are guided substantially without clearance along the guide track 47a. The accurate vertical guidance of the parts transport carriers 48 along the guide track 47a is ensured by the guide strips.

Figure 7:
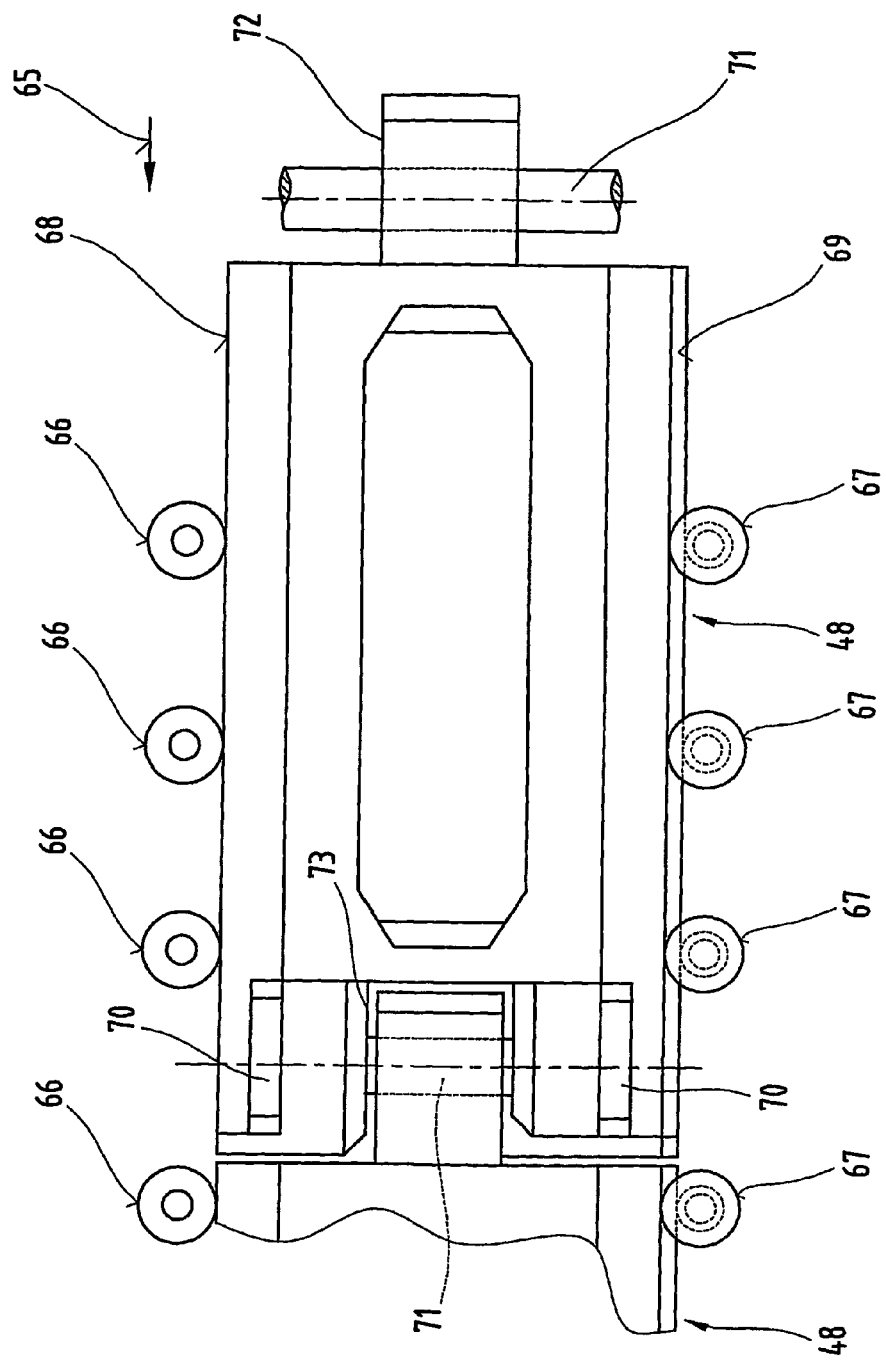
FIG. 7 shows a partial region of a transport chain of the transport device formed by the parts transport carrier according to FIG. 4, in plan view and a considerably simplified representation.

The parts transport carriers 48 are supported and guided via guide rollers 70 rolling vertically on the guide strips. Said guide rollers 70 are mounted on a shaft serving as a link pin 71. The link pin 71 respectively connects two parts transport carriers 48 which are immediately in succession. Each parts transport carrier 48 comprises respectively at the front face a coupling extension 72 as well as a coupling receiver 73. The link pin 71 is mounted on the coupling extension 72 (as shown in FIG. 7).

Reference is made to the fact here that the disclosed transport device 46 may only be considered by way of example and is not limiting. For example, the transport device may be formed just as easily by the transport device disclosed in WO 02/072453 A2. This known transport device comprises a plurality of transport portions arranged in succession, to each of which at least one separate feed device, independent of the adjacent transport portions for the parts transport carrier, and at least two guide tracks distanced from one another transversely to the advancing direction of the parts transport carriers are assigned, along which the parts transport carriers are guided with guide members arranged on their opposing sides and configured to be movable via the respective feed device. Thus the individual parts transport carriers 48 may move independently of one another between the individual transport portions, the assembly station 43 being arranged in one of the transport portions. This transport portion corresponds to a straight transport device.

With regard to the design of the individual transport portions and the parts transport carriers, the relevant detailed disclosure from WO 02/072453 A2 is provided for the subject of this disclosure.

Figure 5:
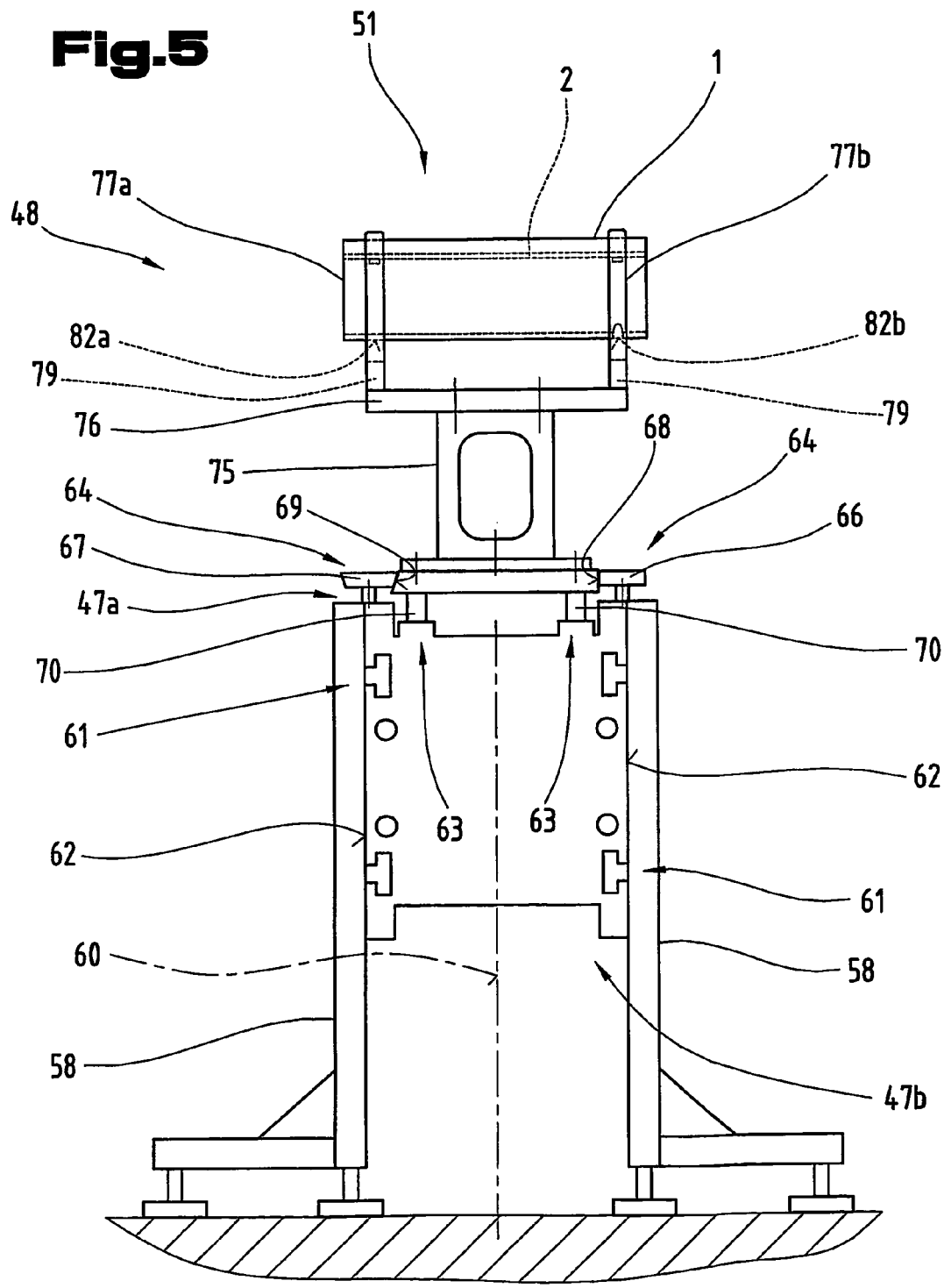
FIG. 5 shows the production installation in front view, in section, along the lines V-V in FIG. 4.
Figure 6:
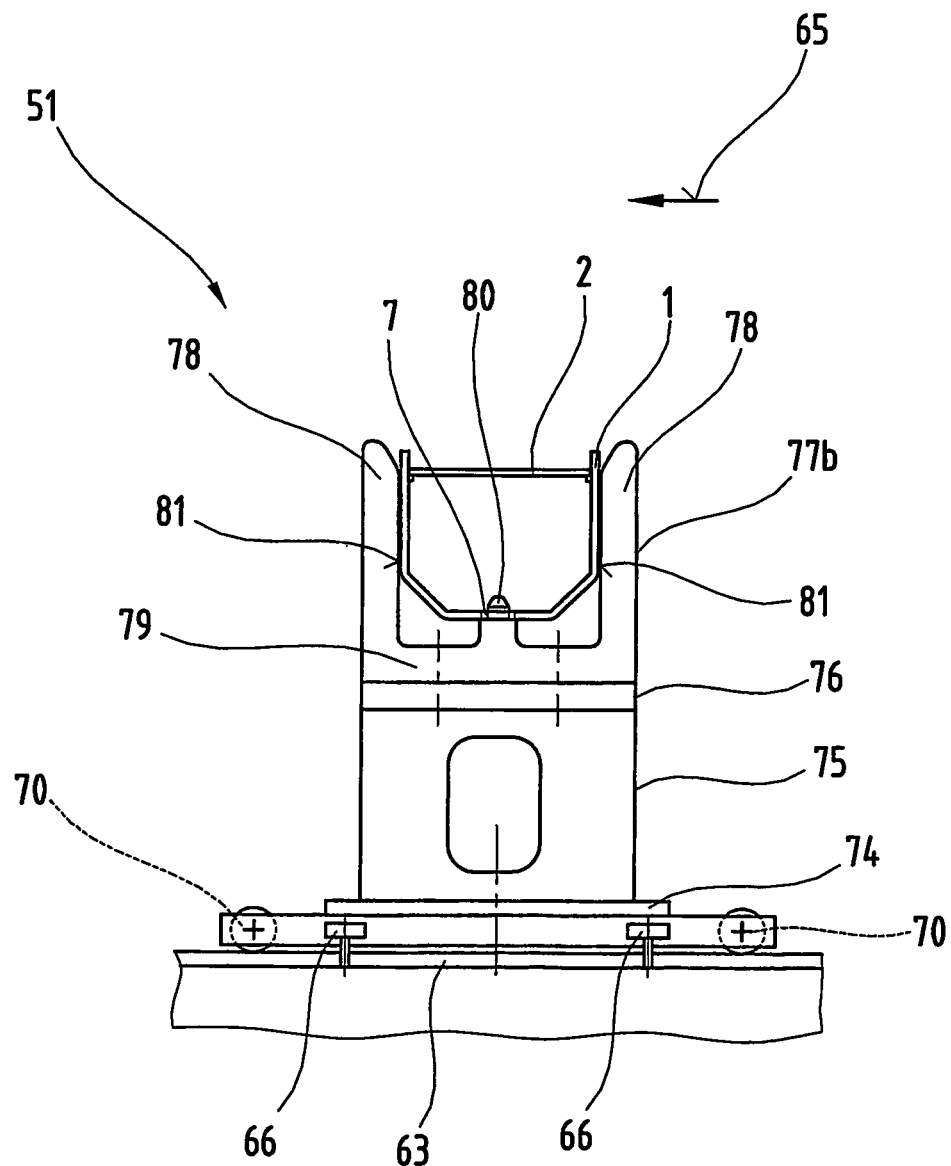
FIG. 6 shows an enlarged view of a parts transport carrier with a receiver for the transport device, in side view and a considerably simplified representation.

The parts transport carriers 48 of the above-disclosed transport devices of variable configuration, are respectively provided with the receiver 51 shown in FIGS. 5 and 6. The receiver 51 is connected via a mounting plate 74 to the parts transport carrier 48 and has a support column 75 fastened thereto, a support plate 76 fastened thereto as well as two fork-like locating clips 77a, 77b arranged spaced apart from one another and connected to the support plate 76. The locating clips 77a, 77b respectively comprise two finger-like guide projections 78 projecting vertically on the support plate 76 and a base 79 connecting said guide projections. At least one of the locating clips 77b is provided in the region of its base 79 with at least one positioning means 80, in particular a pin, which projects into the positioning opening 7 of the first part 1 received by the receiver 51, and as a result the first part 1 is held during its transport along the transport device 46 in a sufficiently accurate position. It is essential that the first part 1 is deposited in the receiver 51, only oriented in position, and is accurately positioned up to a few millimetres relative to the receiver 51. Accordingly, the cross-sectional dimensions of the positioning means 80 are markedly less than the cross-sectional dimensions of the positioning opening 7 in the first part 1.

As illustrated in FIG. 6, the finger-like guide projections 78 are provided on their sides facing one another with planar lateral guide surfaces 81. The bases 79 of the locating clips 78 are respectively provided with a planar bearing surface 82a, 82b for the first part 1 supported thereon. The first part 1 is thus pre-positioned roughly on the parts transport carrier 48 via the receiver 51, and is positioned freely between the guide projections 78 of the locating clips 77a, 77b as well as on the bearing surfaces 82a, 82b.

As further illustrated in FIG. 3, in the receiving region 44 the parts storage units 49, 50 of the parts delivery site are arranged on both sides of the transport device 46, which is configured in a linear manner at least in one partial section. Said parts storage units are respectively configured according to the present embodiment by a storage track system for similar parts 1, 2 in the form of a feed device 83, 84, as shown schematically in FIGS. 8 and 9.

The feed devices 83, 84 are configured substantially identically, and comprise a base frame 85, a traction mechanism drive, in particular a belt drive, and two guide tracks 90 arranged transversely to the advancing direction—according to arrow 86—of auxiliary parts transport carriers 87 arranged at a distance from one another. The traction mechanism drive and the guide tracks 90 are mounted on the base frame 85. The traction mechanism drive comprises an endless tractive means 91 guided about a drive wheel and a plurality of deflection wheels, in particular a flat belt and a drive motor 92 flange-mounted on the drive wheel. The auxiliary parts transport carriers 87 configured in the same manner respectively comprise a receiver 95, which is fastened to a chassis 93 of a traversing gear. The chassis 93 considered in the advancing direction—according to arrow 86—is provided at the front and rear end with one pair of freely rotatable running wheels 94.

The receiver 95 of the auxiliary parts transport carriers 87 on the feed devices 83, 84 is fastened to the upper face of the chassis 93, and has two fork-like locating clips 96a, 96b arranged at a distance from one another and connected to the chassis 93. The locating clips 96a, 96b respectively comprise two finger-like guide projections 97 projecting vertically on the chassis 93 and a base 98 connecting said guide projections. At least one of the locating clips 96b is provided in the region of its base 98 with at least one positioning means 99, in particular a pin for the first part 1 and/or a cuboidal projection for the second part 2, which projects into the positioning opening 7; 11 of the part 1;2 received by the receiver 95, and as a result the part 1; 2 during its transport along the feed device 83, 84 is held in a sufficiently accurate position. It is essential that the part 1; 2 in the receiver 95 is deposited only oriented in position and is positioned accurately relative to the receiver 95 up to a few millimetres. Accordingly, the cross-sectional dimension of the positioning means 99 is of a markedly smaller size than the cross-sectional dimension of the positioning opening 7; 11 in the part 1; 2.

As illustrated in FIGS. 3, 8 and 9, the finger-like guide projections 97 are provided on their sides facing one another with planar lateral guide surfaces 100. The bases 98 of the locating clips 96a, 96b are respectively provided with a planar support surface 101a, 101b for the part 1; 2 supported thereon. The part 1; 2 is thus roughly positioned on the auxiliary parts transport carrier 87 via the receiver 95, and is freely positioned between the guide projections 97 of the locating clips 96a, 96b as well as against the bearing surfaces 101a, 101b.

Each feed device 83, 84 additionally comprises along the transport path of the auxiliary parts transport carriers 87 a stopping device 102. Said stopping device comprises two separately controllable stop elements 103a, 103b which are displaceable from a position of rest into an actuating position, stopping at least one auxiliary parts transport carrier 87, which in particular may be raised and lowered, as are illustrated considerably simplified in FIGS. 8 and 9. The stop elements 103a, 103b are respectively controlled via a schematically illustrated actuator, in particular a pneumatic or hydraulic drive.

The first stop element 103a facing the end of the feed device 83, 84 positioned upstream, serves for accumulating the auxiliary parts transport carriers 87 driven by means of a frictional connection between the surface of the tractive means 91 and the underside of the chassis 93. The auxiliary parts transport carriers 87 accumulated behind the stop element 103a are loaded with the parts 1 and/or 2. The loading may take place manually via an operating person or, for example, automatically by means of a robot.

The second stop element 103b facing the end of the feed device 83, 84 positioned downstream is used so that an individual auxiliary parts transport carrier 87 is stopped in a transfer position 104; 104', from which a part 1; 2 is transferred to a receiving position 106; 106' of the transport device 46. Subsequently, the empty auxiliary parts transport carrier 87 moves out of the transfer position 104; 104' and said auxiliary parts transport carrier is stored behind the stop element 103a for subsequent loading. At the same time, the first stop element 103a is activated and an auxiliary parts transport carrier 87 loaded with a part 1; 2 is moved into the transfer position 104; 104'. The transfer positions 104; 104' are arranged in the vicinity of the transport device 46.

As is further visible from FIG. 3, in the transfer region 44 a first handling system 105, assigned to the downstream end of the feed device 83, is arranged with a claw (not shown) which is displaceable spatially, by means of which the first part 1 provided in the transfer position 104 on the auxiliary parts transport carrier 87, is received by the receiver 95, supplied to a receiving position 105 on the transport device 46 and deposited oriented in position on the receiver 51 of the parts transport carrier 48 of the transport device 46. Previously, an empty parts transport carrier 46 is moved into the receiving position 105 and stopped in said receiving position, then loaded with the first part 1. After the loading of a parts transport carrier 46, said parts transport carrier is moved from the first receiving position 106 into the second receiving position 106', stopped there and loaded with the second part 2.

Additionally, as further illustrated in FIG. 3, in the receiving region 44, a second handling system 107 assigned to the downstream end of the feed device 84, is arranged with a spatially displaceable claw (not shown). The second part 2 provided in the transfer position 104' on the auxiliary parts transport carrier 87, is removed by means of the second handling system 107 and/or claw from the receiver 95, supplied to a receiving position 106' on the transport device 46 and deposited oriented in position on the bearing extensions 8 between the limbs 6 of the first part 1 already located on the parts transport carrier 48.

As illustrated in the figure, the part 1, 2 is rotated by 90° before it is deposited in the receiving position 106, 106' on the receiver 51 or the bearing extensions 8 of the first part 1.

Thus the second part 2 is not deposited directly on the receiver 51 of a parts transport carrier 48, but oriented in position between the limbs 6 of the first part 1 on the bearing extensions 8. As a result, additional structures on the parts transport carrier 48 may be dispensed with, the entire weight of the transport chain 52 reduced and the advancing speed of the parts transport carrier 48 with receivers 51 increased.

As visible further from FIG. 3, the feed devices 83, 84 on both sides of the transport device 46 are arranged opposite one another and in succession in the advancing direction—according to arrow 65—of the parts transport carriers 48. The transfer and receiving positions 104, 104', 106, 106' are also formed in succession in the advancing direction—according to arrow 65—of the parts transport carrier 48. Naturally, the feed devices 83, 84 may also oppose one another mirror symmetrically (not shown). According to this embodiment, one handling system 105 which is assigned to both feed devices 83, 84 is sufficient and by means of which the parts 1, 2 are supplied in succession from the transfer positions 104, 104' to only one receiving position 106 and deposited on the parts transport carrier 48.

A further embodiment, not shown, consists in that the parts 1, 2 are supplied together as sub-assemblies to the parts delivery site. This embodiment has the advantage that only one further handling system 105 is required, and the parts delivery site only comprises one parts storage unit 49, which is configured as disclosed above.

The sub-assembly provided by means of the auxiliary parts transport carrier 87 in the transfer position 104, is removed by the handling system 105 and/or claw from the receiver 95, supplied to the receiving position 105 on the transport device 46 and deposited oriented in position on the receiver 51 of the parts transport carrier 48 of the transport device 46.

As may be seen from the above explanation, the parts transport carriers 48 of the transport device 46 are loaded from the parts delivery site in a clocked manner, in succession with the parts 1, 2 or sub-assemblies.

After the parts 1, 2 to be joined together or joined sub-assemblies have been deposited, oriented in position, on one of the parts transport carriers 48, in particular the receiver 51 thereof, said parts transport carrier is transported into the first assembly station 43 for the parts delivery site, in particular positioned remotely from the transfer positions 104, 104' thereof, and stopped in a holding position 110.

The assembly station 43, in particular welding station, is arranged between the receiving and forwarding region 44, 45 and comprises in the vicinity of a transport portion of the transport device 46 a clamping system ill, feed axes 112a, 112b, at least one vertical positioning device (not illustrated) as well as at least one joining device shown in simplified form for joining the parts 1, 2 to form a sub-assembly. The clamping system 111 comprises three clamping units 114, 115, 116 to be described below in further detail. The feed axes 112a, 112b are configured as linear drives, as shown in more detail in FIG. 12. The joining device is, according to this embodiment, configured as a welding device 119 with at least one beam welding head 121 for joining the parts 1, 2.

The parts 1, 2 delivered together via the parts transport carrier 48 into the welding station are by means of the clamping units 114 to 116 and/or at least one vertical positioning device moved together from a transport position located on the parts transport carrier 48 into preparation positions disengaged from the parts transport carrier 48, in particular slightly lifted vertically, so that the positioning opening 7 and a positioning means 80 of the parts transport carrier 48 are out of engagement. Subsequently, the parts 1, 2 are positioned relative to one another, clamped against one another and subsequently joined, in particular welded or bonded together at least in partial sections by means of the beam welding head 121 of the welding device 119 at the joint points 17a, 17b. These prefabricated sub-assemblies 122 consisting of the welded parts 1, 2 are again deposited on the parts transport carrier 48, preferably remaining during the duration of the joining process in the holding position 110, then transported away into the first forwarding region 45.

In the forwarding region 45 a third handling system 123 is arranged with a claw (not shown) which is freely movable spatially and an imperfect parts box 124. The parts transport carrier 48 receiving the prefabricated sub-assembly is stopped in the forwarding region 45 in an end position 125 and in said end position by means of the handling system 123 and/or claw the sub-assembly 122 is removed from the parts transport carrier 48 and supplied to the second production installation 33 or the imperfect parts box 124.

As disclosed further hereinafter, a detection takes place of the quality features, in particular the dimensional stability, of the individual parts 1, 2, namely in the assembly station 43 using a desired-actual value-comparison of the clamping force and/or of the displacement and/or clamping path of each individual clamping device of the clamping units 114 to 116. These quality features are compared in the comparison module 39 with quality requirements and evaluated in the evaluation module 40. If one of the parts 1, 2 does not correspond to the quality requirements, for example one of the parts 1, 2 is too long, too short, too narrow or too wide, as is detected during the clamping process of each part 1, 2, the parts 1, 2 are not even joined to one another but deposited by the clamping units 114 to 116 and/or the vertical positioning device again on a parts transport carrier 48 and transported via the transport device 46 to the handling system 123 and then via said handling system into the imperfect parts box 124.

If the parts 1, 2, however, correspond to the quality requirements, as detected during the clamping process, the parts 1, 2 are welded to one another and via the transport device 46 transported to the handling system 123 and via said handling system from the forwarding region 45 to a second receiving region 126 of the second production installation 33.

The second production installation 33 comprises a second transport system 127 and at least one second assembly station 128, which is formed according to this embodiment by a welding station. The transport system 127 serves for supplying the sub-assemblies 122, which are prefabricated by the first production installation 32 and joined, as well as further parts 3a, 3b which in turn are joined to the prefabricated sub-assembly 122.

To this end, the second transport system 127 has a second transport device 130 extending in a linear manner preferably between the second receiving region 126 and a second forwarding region 129, with parts transport carriers 48' movable along guide tracks, not illustrated in this figure, and preferably of the same configuration, as well as a parts delivery site. The second transport device 130 has again a plurality of parts transport carriers 48' which in turn are provided with the receiver 51' already described above in detail and two further receivers 131a, 131b for the parts 3a, 3b.

The parts delivery site for the parts 3a, 3b is, according to this embodiment, formed by two devices 132, 133 for separating, conveying and aligning parts 3a, 3b received in a container 134 as bulk material. This device 133, 134 comprises a parts storage unit 135 for the parts 3a, 3b. Such a device 133, 134 is, for example, known from DE 40 25 391 A1 or DE 41 26 689 A1.

As is visible further from FIG. 3, the parts 3a removed from the container 134 are conveyed by means of the device 132 to a transfer position 136 on the parts storage unit 135. In the second receiving region 126, a first handling system 137 assigned to the downstream end of the parts storage unit 135 is arranged with a claw (not shown) which is displaceable spatially, by means of which a separate third part 3a provided in the transfer position 136 of the parts storage unit 135 is removed, supplied to a receiving position 138 on the second transport device 130, and is deposited oriented in position on the receiver 131a of the parts transport carrier 48' of the transport device 130. Previously, a parts transport carrier 48' already loaded with the sub-assembly 122, has been moved into the receiving position 138 and stopped in said position, then loaded with the third part 3a. After loading the parts transport carrier 48', said parts transport carrier is moved from the receiving position 138 into the further receiving position 138', stopped there and loaded with the fourth part 3b.

To this end, in the receiving region 126 a second handling system 139 assigned to the downstream end of the device 133, is arranged with a spatially displaceable claw (not shown). By means of the device 133, the parts 3b removed from the container 134 are conveyed to a transfer position 136' on the parts storage unit 135. The fourth separate part 3b provided in the transfer position 136', is removed therefrom by means of the second handling device 139 and/or claw, supplied to a receiving position 138' on the second transport device 130 and deposited oriented in position on the receiver 131b of the parts transport carrier 48' of the transport device 130.

As is visible from FIG. 3, the devices 132, 133 on both sides of the transport device 130 are arranged opposing one another and in succession in the advancing direction—according to arrow 140—of the parts transport carrier 48'. The transfer and receiving positions 136, 136', 138, 138' are also configured in succession in the advancing direction—according to arrow 140—of the parts transport carrier 48'. Naturally, the devices 132, 133 may also oppose one another mirror symmetrically (not shown). According to this embodiment, one handling system 137 which is assigned to both the devices 132, 133 is sufficient and by means of which the parts 3a, 3b are supplied in succession from the transfer positions 136, 136' to only one receiving position 138, and deposited on the parts transport carrier 48'.

The transport parts carriers 48' are moved away in a clocked manner between the second receiving region and forwarding region 126, 129 in the advancing direction—according to arrow 140. After a part 3a has been deposited on the receiver 131a, the parts transport carriers 48' are moved forward so that the parts transport carriers 48' is moved from the one receiving position 138 to the other receiving position 138' of the parts delivery site.

If now one part 3b has been deposited on the receiver 131b, the parts transport carriers 48' are moved forward, so that the parts transport carrier 48' loaded with a prefabricated sub-assembly 122 and the third and fourth part 3a, 3b, are transported from the receiving position 138' of the parts delivery site together to the assembly station 128, in particular the welding station, and stopped there in a holding position 142.

The second assembly station 128, in particular the welding station, is arranged between the second receiving and forwarding region 126, 129, and comprises in the vicinity of a transport portion of the transport device 130 a clamping system 143, two vertical positioning devices (not shown), as well as at least one joining device shown simplified for joining the parts 1, 2 to form a sub-assembly. The clamping system 143 comprises a clamping unit 144 to be described below in more detail. The joining device is, according to this embodiment, configured as a welding device 145 with at least two beam welding heads 146a, 146b controlled separately for joining the parts 3a, 3b.

In the holding position 142 of the transport part carrier 48', the parts 3a, 3b and the prefabricated 122 sub-assembly are moved together from a transport position located on the parts transport carrier 48' into a preparation position disengaged from the parts transport carrier 48' between clamping devices of the clamping unit 144, in particular lifted, then the sub-assembly 122 and the parts 3a, 3b are positioned relative to one another, clamped against one another and then joined, in particular welded or bonded to one another by means of the beam welding heads 146a, 146b of the welding device 145 at the joint points 18a, 18b, 18c; 19a, 19b at least in partial sections and subsequently again deposited on the parts transport carrier 48' preferably remaining during the duration of the joining process in the holding position 142. Then the joined sub-assembly 147 is transported via the transport device 130 to the second forwarding region 129.

In the second forwarding region 129, a third handling system 148 is arranged with a claw (not shown) which is freely movable spatially, and an imperfect parts box 149. The parts transport carrier 48' receiving the finished sub-assembly 147, is stopped in the forwarding region 129 in an end position 150 and in said end position, by means of the handling system 148 and/or claw, the sub-assembly 147 is removed from the parts transport carrier 48' and supplied to a conveying device 151 or the imperfect parts box 149.

As is disclosed further hereinafter, a detection of the quality features takes place, in particular the dimensional stability of the individual parts 3a, 3b, namely in the assembly station 128 using a desired-actual value-comparison of the clamping force and/or of the displacement and/or clamping path of each individual clamping device of the clamping unit 144. Said quality features are compared in the comparison module 39 with quality requirements, and evaluated in the evaluation module 40. If one of the parts 3a, 3b does not correspond to the quality requirements, for example one of the parts 3a, 3b is twisted in an inadmissible manner, as is detected during the clamping process of each part 3a, 3b, the parts 1, 2, 3a, 3b are not even joined together but deposited by the clamping unit 144 and/or the vertical positioning devices again onto a parts transport carrier 48' and transported via the transport device 130 to the handling system 148 and then via said handling system into the imperfect parts box 149.

If the parts 3a, 3b, however, correspond to the quality requirements, as is detected during the clamping process, the parts 1, 2, 3a, 3b are welded together and transported via the transport device 130 to the handling system 148 and via said handling system from the forwarding region 29 to the conveying device 151.

According to the production system according to the invention 31 and production method, it is now provided that the laser beam from only one beam source forming the energy source 34, for example a laser generator, is alternately supplied to the beam welding head 121 of the first welding station and the beam welding heads 146a, 146b of the second welding station. The beam welding head 121 of the first welding station and the beam welding heads 146a, 146b of the second welding station are connected to a common laser beam source, respectively via an optical waveguide (L1, L2, L3) and via a beam separating filter (not shown). The optical waveguide (L1) leads to the beam welding head 121, the optical waveguide (L2) to the beam welding head 146a and the optical waveguide (L3) to the beam welding head 146b. The laser beam source uses a mirror system, not shown, by which the laser radiation radiated from the laser beam source is coupled and/or reflected into the corresponding optical waveguide (L1; L2; L3) and optionally into the different beam welding heads 110, 146a, 146b, either to the first welding station or to the second welding station.

According to the production method, within a first time interval two parts 1, 2 are transported to the first welding station and a welded sub-assembly 122 of the preceding cycle transported away from the first welding station and meanwhile in the second welding station a sub-assembly 122 previously welded in the first production installation 32 and a third part 3a supplied by the second parts delivery site, are positioned relative to one another, clamped and welded to form the finished sub-assembly 147. Within a second time interval, in the first production installation 32, two parts 1, 2 supplied by the first parts delivery site are positioned relative to one another and clamped and welded to form the sub-assembly 122, and meanwhile in the second production installation 33 a sub-assembly 122 previously welded in the first production installation 32, is transported to the second welding station of the second production installation 33, and a fully welded sub-assembly 147 of the previous cycle in the welding station of the second production installation 33, is transported to the second forwarding region 129.

In FIG. 10, the assembly station 43 and/or welding station is shown with the transport device 46 only partially shown and clamping system 111 as well as the welding device 119, the cover being removed. The welding station comprises a support structure consisting of four posts 152 aligned vertically to the contact surface 59 and a frame connecting said posts. The frame comprises two gantries 153 extending parallel to the advancing direction—according to arrow 65—of the transport device 46, and two gantries 154 extending transversely thereto. The gantries 153, 154 are releasably connected via screws to the stands 152. One gantry 153 is provided with brackets 155, to which a drive system 156 shown in more detail in FIG. 11 is fastened, via which the welding device 119 is displaceably mounted on the frame. Additionally, the support structures comprise a base frame, which on both sides of the transport device 46 comprises mounting plates 157, to which the feed axes 112a, 112b are releasably fastened. The mounting plates 157 are fastened with their ends facing one another on support profiles 158 extending parallel to the advancing direction—according to arrow 65—of the transport device 46 and directly adjacent thereto, and with their ends remote from one another via support brackets 159 fastened to further support profiles 160 extending parallel to the advancing direction—according to arrow 65—of the transport device 46. For reinforcing the support structure, moreover, two further support plates 161 are provided connecting the posts 152 in the bottom region to one another. These support plates 161 are provided with a recess 162 for the penetration of the returning strand of the transport chain 52 of the transport device 46.

As is visible from observing FIGS. 3 and 10 together, the assembly station 43 is provided with a connection interface 163 which is provided with a data interface, a connector for a suction pipe 164, a connector for electrical and/or mechanical and/or optical energy and/or a connector for an optical waveguide (L1, L2, L3). The suction pipe 164 is connected via the connection interface 163 to a ventilation system, not shown, and the optical waveguide (L1, L2, L3) to the energy source 34 via the connection interface 163. Moreover, the connection interface 163 is in turn connected to an electrical and/or mechanical energy source 36 and/or control device 37. Naturally, the optical waveguide (L1, L2, L3) may also be directly connected to the optical energy source 34.

In FIG. 11, the drive system 156 is shown, by which the beam welding head 121 of the welding device 119 may be spatially moved. The drive system 156 comprises two linear drives 170a, 170b fixedly arranged on the brackets 155 of the frame illustrated in FIG. 10, with synchronously displaceable carriages (not visible) respectively via one steplessly controllable electric motor 171a, 171b, in particular servomotor or stepping motor, and a third linear drive 172 fastened to the carriages, with carriages (not visible) displaceable via a steplessly controllable electric motor 173, in particular servomotor or stepping motor, as well as a fourth linear drive 174 fastened to said carriage with vertically displaceable carriages (not visible) via a steplessly controllable electric motor 175, in particular servomotor or stepping motor, which is connected to the carriage of the third linear drive 172. The welding device 119 is mounted via a fastening device 176 at the lower end of the fourth linear drive 174 and configured by means of the first/second linear drive 170a, 170b to be displaceable transversely to the advancing direction of the transport device 46 (illustrated in FIG. 10) and by means of the third linear drive 172 in the advancing direction of the transport device 46 and by means of the fourth linear drive 174 in the vertical direction. The beam welding head 121 is additionally pivotably mounted about a vertical pivot axis 177 and about a pivot axis 178 extending parallel to the first/second linear drive 170a, 170b, to the fastening device 176, as is disclosed in detail in FIGS. 32 and 33. The beam welding head 121 is pivotable about the vertical axis 177 and about the horizontal axis 178, respectively by approximately 270°.

In FIGS. 12 to 17 described together, a partial region of the transport device 46 and of the clamping system 111 of the first assembly station 43 is considerably simplified and shown in different views. For reasons of improved clarity, the parts transport carriers 48 are not shown in the figures.

FIG. 12 shows in this connection the clamping system 111 in the set-up position, in which the support frames to be described in more detail below and clamping tools of the clamping units 114 to 116 are removed from the drive units 180a to 182b of the clamping units 114 to 116. The drive units 180a to 182b respectively have a linear drive 184a to 186b controlled by means of an electric motor 188a to 190b and a set-up platform 187. The linear drives 184a to 186b respectively comprise a carriage 191a to 193b which is displaceable in a horizontal plane, to which a set-up platform 187 is fastened. According to the embodiment shown, the set-up platform 187 is formed by the carriages 191a to 193b.

The feed axes 112a, 112b are also formed by linear drives 196a, 196b, which are controlled by electric motors 197a to 197b, and respectively comprise a carriage 198a, 198b which is displaceable in the horizontal plane.

Figure 14A:
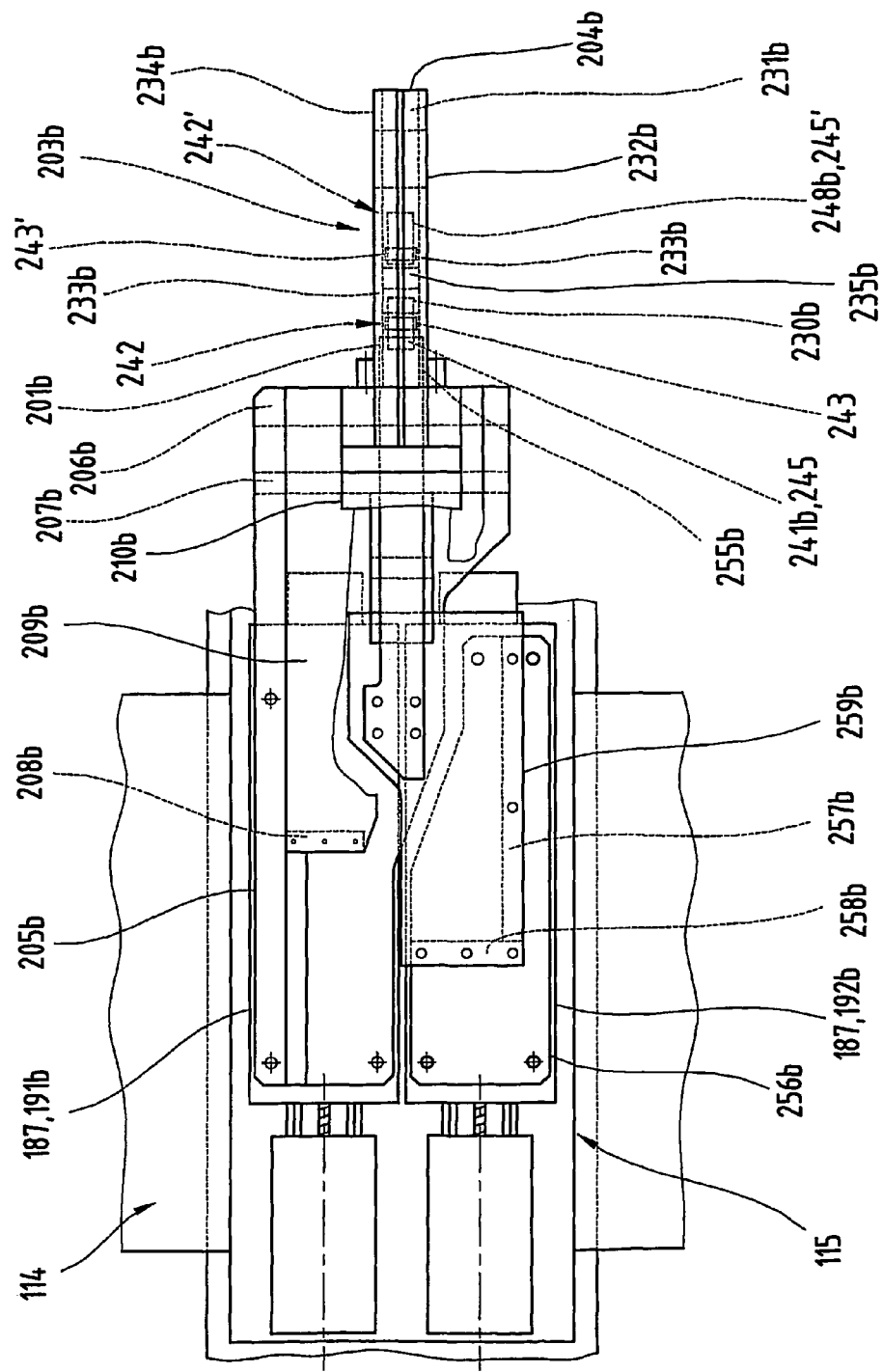
FIG. 14a shows a partial section of the clamping system according to FIG. 14 in an enlarged and considerably simplified representation.

As now shown in FIGS. 13 to 14a, the first and second clamping units 114, 115 of the clamping system 111 comprise clamping devices 194a to 195b arranged on both sides of the linear transport portion of the transport device 46 and cooperating and possibly synchronously displaceable via the drive units 180a, 180b transversely to the advancing direction—according to arrow 46—of the parts transport carriers 48.

The clamping devices 194a, 194b of the first clamping unit 114 respectively comprise the drive unit 180a, 180b, a vertical positioning device 200a, 200b, a clamping tool 201a, 201b, a support frame 202a, 202b, a pressing device 203a, 203b for fixing the parts 1, 2 between the clamping devices 194a, 194b and an abutment 204a, 204b. The clamping tool 201a, 201b is connected via the support frame 202a, 202b to the set-up platform 187 of the drive unit 180a, 180b. The support frame 202a, 202b of the clamping devices 194a, 194b respectively comprise a lower mounting plate 205a, 205b fastened to the set-up platform 187, support walls 206a to 208b fastened thereto, an upper mounting plate 209a 209b connected thereto on the upper face, as well as a support plate 210a, 210b fastened thereto. The abutment 204a, 204b is fastened to the support plate 210a, 210b and the support wall 206a, 206b facing the transport device 46. The abutment 204a, 204b comprises a cantilever arm 211a, 211b which is provided on its lower face facing the drive unit 180a, 180b with a collet chuck 212a, 212b.

The cooperating clamping tools 201a, 201b of the clamping devices 194a, 194b which are possibly synchronously displaceable transversely to the advancing direction—according to the arrow 46—of the parts transport carriers 48, are oriented towards one another and fastened to the support frame 202a, 202b, in particular to the front support wall 206a, 206b. Each of the clamping tools 201a, 201b is, according to this embodiment, formed by a support element 213a, 213b of a lifting device 214a, 214b comprising the vertical positioning device 200a, 200b and is configured as an angle section. The projecting limb of the angle section is connected to the support wall 206a, 206b of the support frame 202a, 202b, whilst the horizontal limb projects perpendicular to the support wall 206a, 206b. The horizontal limb of the angle section and/or of the clamping tool 201a, 201b has, according to this embodiment, a stop bevel 215a, 215b inclined downwards in a direction of the transport device 46, a horizontal support surface 216a, 216b adjacent thereto and a stop element with a vertical stop surface 217a, 217b. A front edge 218a, 218b of the clamping tools 201a, 201b is configured just below a transport plane and/or transport position 219 of the first part 1 deposited on the parts transport carrier 48, as shown in FIG. 18a.

In FIG. 15, a further embodiment of the vertical positioning device 200a, 200b of the clamping devices 194a, 194b and a partial section of the support frame 202a, 202b are shown considerably simplified. The vertical positioning device 200a, 200b comprises a further embodiment of a lifting device 220a, 220b. This lifting device 220a, 220b has an actuator 224a, 224b and the support element 213a, 213b lifting or lowering the parts 1, 2 together between a transport position and a preparation position located relative thereto above or below. The support element 213a, 213b is formed by the clamping tool 201a, 201b, and an L-shaped slider element 221a, 221b is connected thereto. The slider element 221a, 221b is guided via at least one guide member 222a, 222b on at least one guide track 223a, 223b on the support frame 202a, 202b, in particular guided on the support wall 206a, 206b, and displaceable substantially vertically via the actuator 224a, 224b along the guide track 223a, 223b. The clamping tool 201a, 201b projects vertically on the guide track 223a, 223b. The actuator 224a, 224b is, according to the embodiment shown, formed by an electric drive or fluid drive and coupled to the support element 213a, 213b and/or the slider element 221a, 221b in a mobile manner.

The clamping tools 201a, 201b of the clamping device 194a, 194b are synchronously displaceable between an initial position as illustrated in solid lines, and an actuating position located above or below, as illustrated in broken lines. In this case, via suitable means, for example a mechanical end stop, the control of the actuator 224a, 224b is undertaken, so that the clamping tools 201a, 201b in their actuated position always adopt an accurate vertical position and a reliable clamping process of the first part 1, not illustrated in this figure, may be carried out. Each support element 213a, 213b and/or clamping tool 201a, 201b has only one horizontal support surface 216a, 216b and a stop element forming the vertical stop surface 217a, 217b.

A further embodiment, not shown, consists in that on the support frame 202a, 202b, in particular on the front support wall 206a, b an actuator 224a, 224b in the form of a linear drive is fastened, which comprises an electric motor and a displaceable carriage positioned via a threaded spindle flange-mounted thereto and guided along a guide track. The clamping tool 201a, 201b, is fastened in this case to the carriage.

In FIGS. 16 and 17 described together, a further variant of the vertical positioning device 200a, 200b of the clamping devices 194a, 194b is shown in different views. Each clamping device 194a, 194b comprises, according to this embodiment, two clamping tools 201, 201b, each of which forms the support surface 217a, 217b, and stop surface 216a, 216b. The clamping tools 201, 201b are arranged on both sides of the guide track 223a, 223b, and fastened to the support frame 202a, 202b. According to this embodiment, the vertical positioning device 200a, 200b and/or the lifting device 220a, 220b and the clamping tool 201a, 201b are configured separately from one another. The vertical positioning device 200a, 200b comprises, in turn, the lifting device 220a, 220b, the latter of which forming the support element 213a, 213b lifting or lowering the parts 1, 2 (not shown) between a transport position located on the parts transport carrier 48 and a preparation position located above or below relative thereto. Accordingly, the clamping tool 201a, 201b and the support element 213a, 213b are separated from one another and configured to be displaceable relative to one another. The lifting device 220a, 220b comprises at least one guide member 222a, 222b, by means of which the support element 213a, 213b is guided on at least one guide track 223a, 223b, and by means of an actuator 224a, 224b is vertically displaceable along the guide track 223a, 223b according to the illustrated double arrow.

The guide member 222a, 222b is mounted on a carriage 225a, 225b. The carriage 225a, 225b is connected via a bracket to the bearing element 213a, 213b. The actuator 224a, 224b is in turn coupled in a mobile manner via a transfer element 226a, 226b to the carriage 225a, 225b and/or support element 213a, 213b. The actuator 224a, 224b is formed by an electric motor or fluid motor. The support element 213a, 213b projects with its edge facing the transport device 46 (see FIGS. 13 and 14) on the edge 118a, 118b of the clamping tool 201a, 201b and has on its upper face a stop element 227a, 227b, in order to ensure that during the lifting of the parts 1, 2, not shown, the first part 1 does not collide with the clamping tool 201a, 201b. Accordingly, the stop element 227a, 227b is arranged offset relative to the edge 218a, 218b of the clamping tool 201a, 201b in the direction of the transport device 46, and the edge 218a, 218b projects over the vertical stop surface thereof.

The support element 213a, 213b is configured to be displaceable from an initial position, as illustrated in solid lines, into an actuating position located just above the support surface 216a, 216b of the clamping tool 201a, 201b, as illustrated in broken lines. The support elements 213a, 213b of the clamping devices 194a, 194b thus lift a part 1 mounted thereon together with the part 2 or lower the part 1 together with the part 2. After reaching the actuating position of the support elements 213a, 213b or during the lowering thereof in the direction of the initial position, the pairs of clamping tools 201a, 201b and/or the clamping devices 194a, 194b are advanced towards one another so that a spacing between the edges 218a, 218b facing one another of the clamping tools 201a, 201b is smaller than the length of the first part 1 (not shown). If now the support elements 213a, 213b are moved downwards with the parts 1, 2 in the direction of the initial position, the part 1 is deposited together with the part 2 on the support surfaces 216a, 216b of the clamping tools 201a, 201b located in one plane. The support elements 213a, 213b are moved back as far as their initial positions. The clamping process of the part 1 is described in more detail hereinafter.

A further embodiment, not shown, consists in that the vertical positioning devices 200a, 200b and/or the lifting devices 220a, 220b with the support elements 213a, 213b supporting the part 1, are formed on both sides of the transport device 46 and separate from the clamping devices 194a, 194b; 195a, 195b of the clamping units 114, 115 and are arranged in the assembly station 43 in the vicinity of the clamping units 114, 115.

It is equally possible that the assembly station 43 in the vicinity of the clamping units 114, 115 only has one vertical positioning device 200a and/or one lifting device 220a with the support element 213a, by means of which the two parts 1, 2 are lifted or lowered together between a transport position and a preparation position.

If the parts 1, 2 are transported on two parts transport carriers 48 separately from the receiving positions 106, 106' to the holding position 110 in the assembly station 43, on the one hand, a first vertical positioning device is provided for the first part 1 and, on the other hand, a second vertical positioning device is provided for the second part 1. The vertical positioning devices respectively comprise the lifting devices. The first lifting device forms a first support element, lifting or lowering the first part 1 between a transport position located on the parts transport carrier 48 and a preparation position of the first part 1, located above or below relative thereto. The second lifting device forms a second support element lifting or lowering the second part 2 between a transport position located on the parts transport carrier 48 and a preparation position of the second part 2, located above or below relative thereto. Generally, the first and second vertical positioning devices may be of identical construction. In this connection, one of the clamping devices 194a, 194b, 195a, 195 may be provided with the second vertical positioning device or both clamping devices 194a, 194b, 195a, 195 of the clamping units 114, 115 may be provided respectively with a second vertical positioning device. On the other hand, the assembly station 43 may also be provided with at least one second vertical positioning device, which is configured separately from the clamping units 114, 115 and is arranged in the vicinity thereof.

As already described above, each clamping device 194a, 194b comprises a pressing device 203a, 203b as is shown in FIGS. 13a and 14a. The pressing devices 203a, 203b of the clamping devices 194a, 194b respectively comprise two pressing elements 230a, 230b, 231a, 231b displaceable relative to one another via separate actuating devices 228a, 228b, 229a, 229b and a housing part 232a, 232b, which is fastened via a flange to the support frame 202a, 202b, in particular the vertical support wall 206a, 206b. The housing part 232a, 232b comprises two side walls 233a, 233b arranged spaced apart from one another, a base 234a, 234b connecting said side walls and a cover 235a, 235b. The base and cover 234a, 234b, 235a, 235b form on their inner faces facing one another, respectively one guide surface 236a, 236b, along which horizontal sliders 237a, 237b, 238a, 238b, to be described in more detail below, are guided. The horizontal sliders 237a, 237b, 238a, 238b form in turn guide surfaces 239a, 239b on their outer faces facing the guide surfaces 236a, 236b and resting thereon. Additionally, the horizontal sliders 237a, 237b, 238a, 238b are provided on their inner faces facing one another with inner guide surfaces 240a, 240b. The horizontal sliders 237a, 237b, 238a, 238b are supported with their inner guide surfaces 240a, 240b on one another and mutually guide one another.

The first pressing element 230a, 230b is fastened to a first vertical slider 241a, 241b. The first vertical slider 241a, 241b is coupled in a mobile manner via a sliding arrangement 242 with the lower horizontal slider 237a, 237b. To this end, the lower horizontal slider 237a, 237b which is displaceable in the longitudinal direction of the housing part 232a, 232b, horizontally and transversely to the advancing direction— along the arrow 46—of the parts transport carriers 48, is provided with a sliding element 243, for example a cylindrical pin, which is mounted inside an arcuate sliding track 244 in the first vertical slider 241a, 241b. As is visible in FIGS. 14, 14a, the bases 234a, 234b, covers 235a, 235b and the horizontal sliders 237a, 237b, 238a, 238b are provided with first vertically superimposed through-openings 245. The vertical slider 241a, 241b is of approximately cuboidal configuration and the contour of the through-opening 245 corresponds to the outer contour of the vertical slider 241a, 241b. The vertical slider 241a, 241b penetrates the through-openings 245 and is forcibly guided by means of the through-openings 245 formed in the housing part 232b and/or base 234a, 243b and covers 235a, 235b. The lower vertical slider 241a, 241b is connected via a coupling element 246 to a first drive motor 247a, 247b, for example an electric motor or fluid motor. The drive motor 247a, 247b is fastened to the support frame 202a, 202b, in particular the central support wall 207a, 207b.

If now the lower horizontal slider 237a, 237b is displaced from left to right by means of the drive motor 247a, 247b, from the illustrated initial position into an actuating position shown in FIG. 18c, at the same time the first pressing element 230a, 230b is moved in the direction of the stationary clamping tool 201a, 201b and the first part 1, not shown further, is fixed between the clamping tool 201a, 201b and the pressing element 230a, 230b.

The second pressing element 231a, 231b is fastened to a second vertical slider 248a, 248b, and provided with a collet chuck 252a, 252b. The second vertical slider 248a, 248b is coupled in a mobile manner via a sliding arrangement 242' to the upper horizontal slider 238a, 238b. To this end, the upper horizontal slider 238a, 238b which is displaceable in the longitudinal direction of the housing part 232a, 232b horizontally and transversely to the advancing direction—along arrow 46—of the parts transport carrier 48 is provided with a sliding element 243', for example a cylindrical pin, which is mounted within an arcuate sliding track 244' in the second vertical slider 248a, 248b. As is visible in FIGS. 14, 14a, the bases 234a, 234b, covers 235a, 235b and the horizontal sliders 237a, 237b, 238a, 238b are provided with second vertically superimposed through-openings 245'. The vertical slider 248a, 248b is of approximately cuboidal configuration and the contour of the through-opening 245' corresponds to the outer contour of the vertical slider 248a, 248b. The vertical slider 248a, 248b penetrates the through-openings 245' and is forcibly guided by means of the through-openings 245' formed in the housing part 232b and/or bases 234a, 234b and covers 235a, 235b. The vertical slider 248a, 248b is connected via a coupling element 249a, 249b to a second drive motor 251a, 251b, for example an electric motor or fluid motor. The second drive motor 251a, 251b is connected via a mounting bracket 250a, 250b to the support frame 202a, 202b, in particular the support wall 207a, 207b.

If now the upper horizontal slider 238a, 238b is displaced from left to right by means of the drive motor 251a, 251b from the illustrated initial position into an actuating position shown in FIG. 18c, at the same time the second pressing element 231a, 231b is moved in the direction of the fixed abutment 204a, 240b and the second part 2, not shown further, is fixed between the clamping jaws 212a, 212b, 252a, 252b.

The actuating device 228a, 228b actuating the first pressing element 230a, 230b comprises the above described first vertical slider 241a, 241b, the sliding arrangement 242, the coupling element 246a, 246b and the first drive motor 247a, 247b. The actuating device 229a, 229b actuating the second pressing element 231a, 231b, comprises the above-described second vertical slider 248a, 248b, the sliding arrangement 242', the coupling element 249a, 249b and the second drive motor 251a, 251b.

According to this embodiment, the second actuating device 229a, 229b forms a lifting device of a second vertical positioning device, the second pressing element 231a, 231b and/or the clamping jaw 252a, 252b forming the support element of the lifting device, lifting or lowering the second part 2 between a transport position located on the parts transport carrier 48 and a preparation position located above or below relative thereto.

As also illustrated in FIGS. 13 and 14, the clamping system 111 of the assembly station 43 shown in FIGS. 1 and 10 comprises the second clamping unit 115. Said clamping unit has cooperating clamping devices 195a, 195b arranged on both sides of the transport device 46.

The clamping devices 195a, 195b of the second clamping unit 115 respectively comprise the drive unit 181a, 181b, a support frame 254a, 254b as well as a clamping tool 255a, 255b. The clamping tool 255a, 255b is connected via the support frame 254a, 254b to the set-up platform 187 of the drive unit 181a, 181b. The support frame 254a, 254b comprises a mounting plate 256a, 256b fastened to the set-up platform 187, vertically aligned support walls 257a, 257b, 258a, 258b fastened thereto, as well as a support plate 259a, 259b fastened thereto at the top. The clamping tool 255a, 255b is mounted on the support plate 259a, 259b. The clamping tools 255a, 255b oriented towards one another are configured to be relatively displaceable, via the drive units 181a, 181b, transversely to the advancing direction—along the arrow 65—of the parts transport carrier 48 and to the clamping tool 201a, 201b of the clamping devices 194a, 194b of the first clamping unit 114. The clamping tools 201a, 201b which are optionally synchronously displaceable relative to one another and the clamping tools 255a, 255b, are displaceable exclusively in horizontal planes.

As is further visible from FIGS. 13 and 14, the clamping system 111 of the assembly station 43 shown in FIGS. 1 and 10 comprises a third clamping unit 116, which comprises two clamping devices 260a, 260b arranged in succession in the advancing direction—along the arrow 65—of the parts transport carrier 48 and cooperating via the drive units 182a, 182b. The clamping devices 260a, 260b of the third clamping unit 116 respectively comprise the drive unit 182a, 182b, a support frame 261a, 261b, as well as a clamping tool 262a, 262b. Each clamping tool 262a, 262b is connected via the support frame 261a, 261b to the set-up platform 187 of the drive unit 182a, 182b. The drive units 182a, 182b of the clamping devices 260a, 260b are mounted on the carriage 198b via an approximately U-shaped fastening plate 263. The limbs of the fastening plate 263 bear the drive units 182a, 182b, whilst the base thereof is connected to the carriage 198b. The support frame 261a, 261b comprises a mounting plate 264a, 264b fastened to the set-up platform 187, as well as vertically aligned support walls 265a, 265b fastened thereto, to which the clamping tool 262a, 262b is connected. The clamping tools 262a, 262b are possibly configured to be synchronously displaceable via the drive units 182a, 182b in the advancing direction—along the arrow 65—of the parts transport carrier 49.

As is visible from observing the figures, the clamping devices 194a, 195a are constructed on the carriage 198a of the linear drive 196a (feed axis 112a) and the clamping devices 194b, 195b, 260a, 260b are constructed on the carriage 198b of the linear drive 196b (feed axis 112b).

Reference is made briefly at this point to the fact that the linear drives of the clamping units 114 to 116 known per se and of the drive system 156 for the welding device 119 as well as the feed axes 112a, 112b, respectively comprise an electric motor, in particular a steplessly controllable servomotor or stepping motor, a threaded spindle flange-mounted directly thereon and at least one spindle nut displaceable along guides via the threaded spindle, the carriage of the clamping units 114 to 116 and of the drive system 156 being mounted on the spindle nut. The electric motors are connected via connecting leads to the electronic control device 36. As is described further hereinafter, the torque exerted and/or the motor current from each of the electric motors of the clamping units 114 to 116 is detected, transmitted to the control device 36 and/or the evaluation unit 38 and therefrom a clamping force and/or a displacement and/or clamping path is transmitted to each individual clamping device of the clamping units 114 to 116, whereupon a desired-actual value-comparison is carried out in the comparison module 39 and information about the quality feature of the part 1, 2 to be processed in the form of a "perfect part" or "imperfect part" is evaluated in the evaluation module 40 and input into the control device 36, using which the clamping devices of the clamping units 114 to 116 and/or the drive system 156 for the welding device 119 as well as the feed axes 112a, 112b are controlled.

Figure 18B:
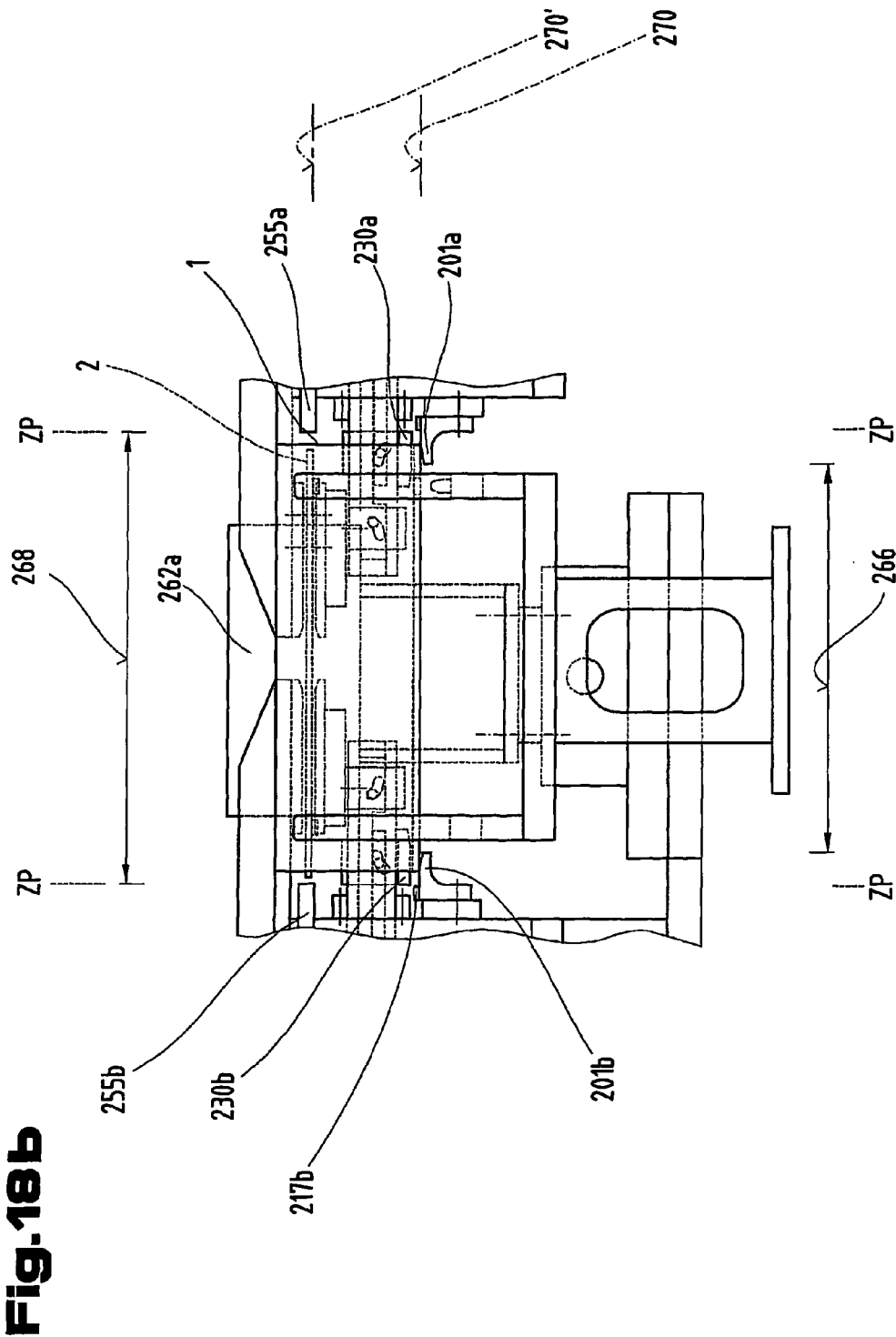
FIGS. 18a to 18f show the positioning and clamping process of two parts to be connected to one another in successive method steps in the first production installation, in different views and in a considerably simplified representation.
Figure 18:
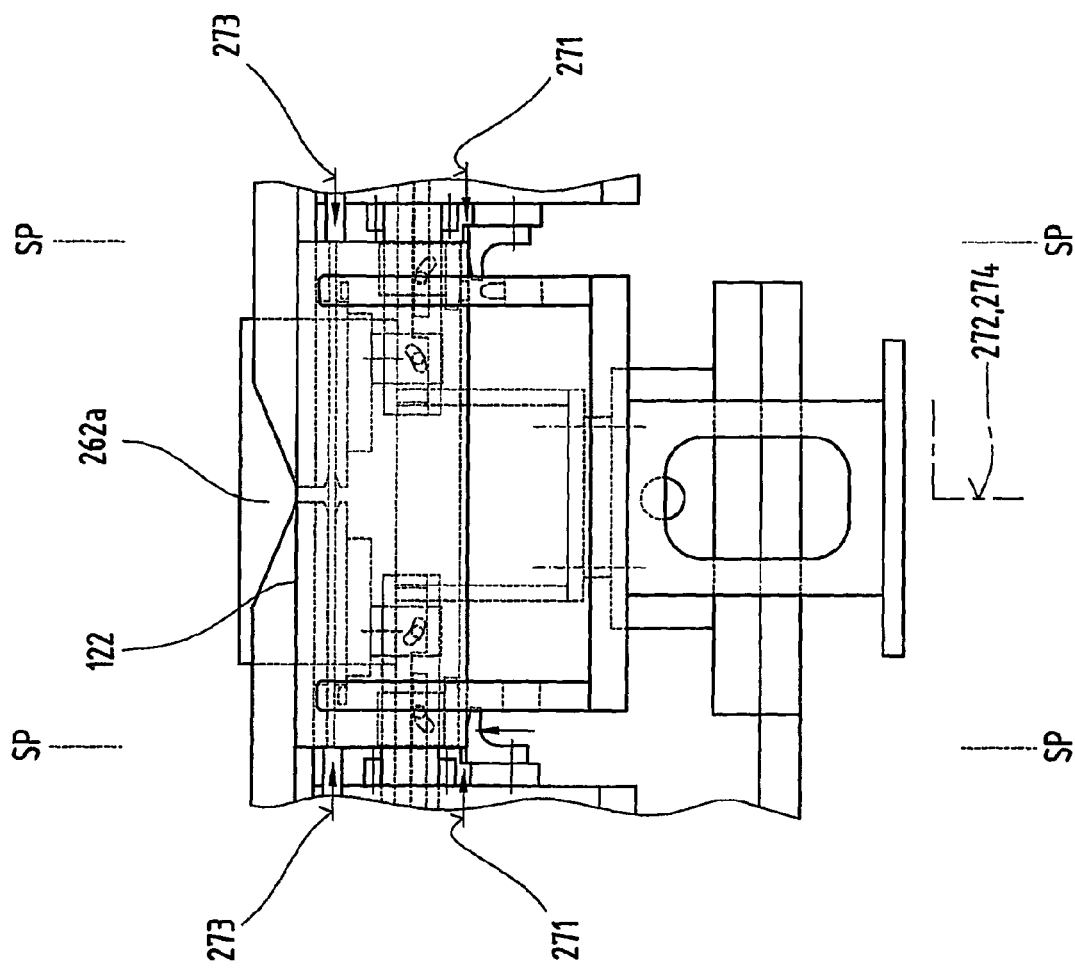

In FIGS. 18a to 18f, the clamping process by means of the clamping system 111 is now described in more detail. Initially, the clamping devices 194a, 194b, 195a, 195b of the clamping units 114, 115 are moved towards one another by moving the carriages 198a, 198b of the feed axes 112a, 112b, so that a clearance width 266 measured between the edges 218a, 218b of the clamping tools 201a, 201b facing one another is reduced to such an extent until said clearance width is smaller than the length 267 of the first part 1. Also, a clearance width 268 measured between the stop surfaces 269 facing one another is reduced. In this connection, the clamping tools 201a, 201b, 255a, 255b of the clamping units 214, 215 are respectively moved from an initial position (AP) remote from part 1, 2 as illustrated in broken lines in FIG. 18a, into an intermediate position (ZP) as illustrated in broken lines in FIG. 18b. The movement of the clamping tools 201a, 201b, 255a, 255b between the intermediate position (ZP) and a clamped position (SP) securing and/or clamping the part 1, 2, as shown in FIG. 18d, takes place via the drive units 180a, 180b, 181a, 181b. In the intermediate position (ZP), the stop surfaces 217a, 217b, 269a, 269b of the clamping tools 201a, 201b, 255a, 255b are located in the vicinity and just in front of the bearing surfaces 10, 12 of the parts 1, 2.

As described above, the clamping tools 201a, 201b which may be advanced towards one another are provided with the stop bevel 215a, 215b, so that solely due to the advancing movement of the clamping tools 201a, 201b from the initial position (AP) into the intermediate or clamped position (ZP, SP), the part 1 delivered previously by means of the parts transport carrier 48 into the holding position 110 of the assembly station 43, is pushed onto the clamping tools 201a, 201b and lifted away from the parts transport carrier 48. As explained in the preceding figures, the second part 2 is supported on bearing extensions 8 of the first part 1 and the parts 1, 2 are transported together via a parts transport carrier 48 into the assembly station 43 and lifted or lowered together from the parts transport carrier 48. In this connection, the first part 1 is moved from the transport position 219 located on the parts transport carrier 48 into a preparation position 270 located above or below the parts transport carrier 48 and the second part 2 is moved from the transport position 219' located on the parts transport carrier 48 into a preparation position 270' located above or below the parts transport carrier 48. If, in contrast thereto, the parts 1, 2 are delivered separately on two parts transport carriers 48, the first part 1 is lifted or lowered via the first vertical positioning device 200a, 200b and the second part 2 is lifted or lowered via the second vertical positioning device from the parts transport carrier 48.

In the preparation positions 270, 270', the parts 1, 2 are located between the opposing clamping tools 201a, 201b and 255a, 255b of the clamping devices 194a, 194b, 195a, 195b.

During the advancing movement of the clamping devices 194a, to 195b of the clamping units 114, 115, at the same time the clamping tools 262a, 262b of the clamping devices 260a, 260b of the clamping unit 115 are respectively moved from an initial position (AP) see FIG. 18a, into an intermediate position (ZP) see FIG. 18e, just in front of the limbs 6 of the part 1. The movement of the clamping tools 262a, 262b between the intermediate position (ZP) and a clamped position (SP) fixing the parts 1, 2, as shown in FIG. 18d, takes place via the drive units 182a, 182b.

According to FIG. 18c, initially the clamping tools 201a, 201b of the clamping devices 194a, 195b are displaced towards one another until the stop surfaces 217a, 217b bear against the bearing surfaces 10 on the front face of the first part 1, so that the first part 1 is positioned and clamped in a first spatial direction. The part 1 is thus acted upon by opposing clamping forces—along arrows 271 illustrated. In this manner, the first part 1 is secured in a first spatial direction.

In a first embodiment, the electric motors 188a, 188b of the clamping devices 194a, 194b are electronically coupled and the clamping tools 201a, 201b are displaced synchronously relative to one another and/or moved towards one another via the drive units 180a, 180b from the intermediate position (ZP) shown in FIG. 18b into the clamping clamped position (SP) illustrated in broken lines in FIG. 18c, until the stop surfaces 217a, 217b bear against the stop surfaces 10 on the front face of the first part 1 and clamp the part 1 therebetween. As a result, the part 1 is centrally received and clamped in its clamped position 274 (see FIGS. 18d, 18f) relative to the assembly station 43, as shown in FIGS. 1 and 10, as indicated by dashed-dotted lines. The actual values of the clamping forces are determined preferably continuously from the exerted torques and/or the motor current of the steplessly controllable electric motors 188a, 188b of the clamping devices 194a, 194b and transmitted to the electronic evaluation unit 38 (see FIG. 3) and a desired-actual value-comparison of the clamping forces carried out therein, as is described in more detail with reference to FIGS. 20 to 22. Additionally, the displacement and clamping paths of the clamping tools 201a, 201b covered between the initial, intermediate and clamped position (AP, ZP, SP) are preferably continuously detected as actual values and transmitted to the evaluation unit 38, then a desired-actual value-comparison of the displacement and clamping paths of the clamping tools 201a, 201b is preferably carried out continuously therein.

In a second embodiment, only one of the clamping tools 201b is displaced via the drive unit 180b from the intermediate position (ZP) shown in FIG. 18b into the clamped position (SP) illustrated in broken lines in FIG. 18c, whilst the other clamping tool 201a remains in the intermediate position (ZP), and as a result adopts the clamped position (SP). Accordingly, the clamped position (SP) corresponds to the intermediate position (ZP). According to this embodiment, only the exerted torque and/or the motor current from an electric motor 188b is detected and the clamping force acting on the part 1 is detected therefrom and transmitted to the evaluation unit 38 as well as a desired-actual value-comparison of the clamping force carried out therein, as is described in more detail with reference to FIGS. 20 to 22. Additionally, the displacement and clamping paths covered between the initial and intermediate positions (AP, ZP) of the clamping tools 201a, 201b as well as the displacement and clamping paths of the clamping tool 201b covered between the intermediate and clamped positions (AP, ZP, SP) are preferably continuously detected as actual values and transmitted to the evaluation unit 38, then a desired-actual value-comparison of the displacement and clamping paths of the clamping tools 201a, 201b is preferably carried out continuously.

As illustrated in FIG. 18c, during the clamping process and/or the advancing movement of one or both clamping tools 201a, 201b from the intermediate position (ZP) into the clamping clamped position (SP), or after the clamping tools 201a, 201b have reached the clamped position (SP), the pressing elements 230a, 230b are actuated and displaced from a resting position, as illustrated in FIG. 18b into a pressing position, as illustrated in FIG. 18c. The pressing elements 230a, 230b are displaced in the direction of the support surface 216a, 216b and pressed with a pressing force against the base 5 of the part 1, so that the first part 1 is positioned and held in the pressing position of the pressing elements 230a, 230b, also in a second spatial direction.

After the first part 1 is secured in two spatial directions, the second part 2 is also positioned, clamped and fixed by means of the clamping tools 255a, 255b of the clamping devices 195a, 195b of the second clamping unit 115 relative to the first part 1.

As further illustrated in FIG. 18c, initially the clamping tools 255a, 255b are displaced towards one another until the stop surfaces 269a, 269b bear against the bearing surfaces 12 on the front face of the second part 2, so that the second part 2 is displaced relative to the first part 1, positioned relative to the first part 1 in a first spatial direction and clamped. The part 2 is in this case clamped by opposing clamping forces—along the arrow 273 illustrated in FIG. 18d. Thus the second part 2 is secured in the direction of its longitudinal extension relative to the first part 1 and in a second spatial direction.

To this end, in a first embodiment, the electric motors 189a, 189b may be electronically coupled to the clamping devices 195a, 195b and the clamping tools 255a, 255b displaced synchronously to one another and/or moved towards one another via the drive units 181a, 181b from the intermediate position (ZP) shown in FIG. 18b into the clamped position (SP) illustrated in FIG. 18c in broken lines, until the stop surfaces 269a, 269b bear against the bearing surfaces 12 on the front face of the second part 2 and clamp the part 2 therebetween. As a result, the part 2 in its clamped position (see FIGS. 18d, 18f) relative to the assembly station 43, as shown in FIGS. 1 and 10, is centrally received and clamped, as indicated by dashed-dotted lines. The actual values of the clamping forces are preferably determined continuously from the exerted torques and/or the motor current of the steplessly controllable electric motors 189a, 189b of the clamping devices 195a, 195b and transmitted to the electronic evaluation unit 38 (see FIG. 3) and a desired-actual value-comparison of the clamping forces being carried out therein, as is described in more detail with reference to FIGS. 20 to 22. Additionally, the displacement and clamping paths of the clamping tools 255a, 255b covered between the initial, intermediate and clamped positions (AP, ZP, SP) are preferably continuously detected as actual values and transmitted to the evaluation unit 38, then a desired-actual value-comparison of the displacement and clamping paths of the clamping tools 255a, 255b is preferably carried out continuously therein.

In a second embodiment, only one of the clamping tools 255b is displaced via the drive unit 181b from the intermediate position (ZP) shown in FIG. 18b into the clamped position (SP) illustrated in broken lines in FIG. 18c, whilst the other clamping tool 255a remains in the intermediate position (ZP) and as a result adopts the clamped position (SP). Accordingly, the clamped position (SP) corresponds to the intermediate position (ZP). According to this embodiment, only the exerted torque and/or the motor current from an electric motor 189b is detected and the clamping force acting on the part 2 determined therefrom and transmitted to the evaluation unit 38 and a desired-actual value-comparison of the clamping force is carried out therein, as is described in more detail with reference to FIGS. 20 to 22. Additionally, the displacement and clamping paths covered between the initial position and intermediate position (AP, ZP) of the clamping tools 255a, 255b and the displacement and clamping paths of the clamping tools 255b covered between the intermediate and clamped positions (AP, ZP, SP) are preferably detected continuously as actual values and transmitted to the evaluation unit 38, then a desired-actual value-comparison of the displacement and clamping paths of the clamping tools 255a, 255b is preferably continuously carried out therein.

According to FIG. 18c, before and during the clamping process and/or the advancing movement, of one or both clamping tools 255a, 255b from the intermediate position (ZP) into the clamped position (SP), or after the clamping tools 255a, 255b have reached the clamped position (SP), the pressing elements 231a, 231b of the second vertical positioning devices are actuated and displaced from a resting position as illustrated in FIG. 18b into a pressing position as illustrated in FIG. 18c. The pressing elements 231a, 231b are to this end moved in the direction of the abutment 204a, 204b, the part 2 moved relative to the first part 1 and pressed against the part 2 with a pressing force, so that in the pressing position of the pressing elements 231a, 231b, the part 2 is also positioned and held in a second spatial direction.

In the following steps, as described in FIGS. 18e and 18f, the parts 1, 2 are also now positioned and secured in a third spatial direction relative to the assembly station 43, by the clamping tools 262a, 262b of the clamping devices 260a, 260b being displaced towards one another until the stop surfaces 277a, 277b bear against the outer face of the limbs 6 of the first part 1, and both parts 1, 2 are moved together, positioned and clamped against one another into the clamped position 272, 274 which is pre-determined spatially. The parts 1, 2 are thus acted upon by opposing clamping forces—along arrows 278 illustrated. The clamping forces 278 of the clamping tools 262a, 262b are thus selected such that the first and second parts 1, 2 relative to the clamping tools 201a, 201b, 255a, 255b and pressing elements 230a, 230b, 231a, 231b may be slightly displaced in the third spatial direction into the clamped position 272, 274 and/or in the advancing direction—along arrow 65—of the parts transport carrier 48. In this manner, the parts 1, 2 are also secured in a third spatial direction and in the clamped position 272, 274 exactly spatially positioned, fixed and clamped together along the joint points 17a, 17b.

To this end, in a first embodiment the electric motors 190a, 190b of the clamping devices 260a, 260b may be electronically coupled and the clamping tools 262a, 262b are displaced synchronously relative to one another and/or moved towards one another via the drive units 182a, 182b from the intermediate position (ZP) shown in FIG. 18e, into the clamped position (SP) illustrated in broken lines in FIG. 18f, until the stop surfaces 277a, 277b bear against the limbs 6 of the second part 2 and the parts 1, 2 are clamped against one another. As, by means of the clamping tools 262a, 262b, a symmetrical clamping takes place, the parts 1, 2 are now also moved in a third spatial direction into the pre-determined clamped position 272, 274 and centrally received and clamped relative to the assembly station 43. The actual values of the clamping forces are preferably continuously determined from the exerted torques and/or the motor current of the steplessly controllable electric motors 190a, 190b of the clamping devices 260a, 260b, and transmitted to the electronic evaluation unit 38 (see FIG. 3) and a desired-actual value-comparison of the clamping forces is carried out therein, as is described in more detail with reference to FIGS. 20 to 22. Additionally, the displacement and clamping paths of the clamping tools 262a, 262b covered between the initial, intermediate and clamped positions (AP, ZP, SP) are preferably continuously detected as actual values and transmitted to the evaluation unit 38, then a desired-actual value-comparison of the displacement and clamping paths of the clamping tools 262a, 262b is preferably continuously carried out.

In a second embodiment, only one of the clamping tools 262b is displaced via the drive unit 182b from the intermediate position (ZP) shown in FIG. 18e into the clamped position (SP), illustrated in broken lines in FIG. 18f, whilst the other clamping tool 262a remains in the intermediate position (ZP) and, as a result, adopts the clamped position (SP). Accordingly, the clamped position (SP) corresponds to the intermediate position (ZP). According to this embodiment only the exerted torque and/or the motor current from an electric motor 190b is detected and the clamping force acting on the parts 1, 2 is determined therefrom and transmitted to the evaluation unit 38 as well as a desired-actual value-comparison of the clamping force carried out therein, as described in more detail with reference to FIGS. 20 to 22. Additionally, the displacement and clamping paths of the clamping tools 262a, 262b covered between the initial and intermediate positions (AP, ZP) and the displacement and clamping paths of the clamping tool 262b covered between the intermediate and clamped positions (AP, ZP, SP) are preferably continuously detected as actual values and transmitted to the evaluation unit 38, then a desired-actual value-comparison of the displacement and clamping paths of the clamping tools 262a, 262b is preferably continuously carried out therein.

After the two parts 1, 2 have been moved in the three spatial directions into the clamped position 272, 274, positioned therein, clamped and possibly fixed and the quality features checked and positively evaluated, the parts 1, 2 are at least partially connected to one another along the regions pretensioned by the clamping tools 262a, 262b at the joint points 17a, 17b by means of joint seams 21, in particular welded. During the joining process, the clamping tools 201a, 201b, 255a, 255b, 262a, 262b are maintained stationary.

In this connection, it is advantageous that the joint points 17a, 17b between the parts 1, 2, provided these correspond to the quality requirements, in particular the dimensional stability, are always pre-determined at the same spatial position and the joining device, in particular the beam welding head, may be moved according to a motion path programmed once, and thus the parts 1, 2 welded together. This motion path is, for example, programmed in the teach-in method, and is stored in the control device 36. Weld following which is known from the prior art may, as a result, be dispensed with. As is described further in FIGS. 20 to 22, the position of the joint points 17a, 17b may be within a permissible tolerance window, and the welded connection may be carried out nevertheless, as the welding beam at the focal point has a diameter of approximately 0.3 mm to 0.5 mm. The diameter of the focal point affects the definition of the tolerance window.

After the parts 1, 2 are joined to form the sub-assembly and the joining process has been terminated, the clamping tools 201a, 201b, 255a, 255b, 262a, 262b are moved from their clamped positions (SP) into the initial positions (AP) and thus, by increasing the clearance width 266, the sub-assembly 122 is again deposited on the parts transport carrier 48, preferably remaining during the clamping and welding process in the holding position 110 and transported away from the assembly station 43. On the parts transport carrier 48, the positioning extension 80 is fed into the positioning opening 7 and the sub-assembly 122 positioned relative to the parts transport carrier 48 with sufficient accuracy.

Preferably, the feed axes 112a, 112b move the clamping tools 201a, 201b, 255a, 255b, 262a, 262b of the clamping devices 194a to 195b, 260a, 260b in a controlled manner uniformly from the initial position (AP) to the clamped position (ZP). The control of the displacement speed of the clamping tools 201a, 201b, 255a, 255b, 262a, 262b may take place in various ways.

In a first embodiment, initially the clamping tools 201a, 201b, 255a, 255b, 262a, 262b are accelerated from the initial position (AP) until just before the intermediate position (ZP) and moved in a decelerated manner as far as the intermediate position (ZP) and brought to a standstill, whereupon one or both clamping tools 201a, 201b, 255a, 255b, 262a, 262b are accelerated from the intermediate position (ZP) and moved in a decelerated manner as far as the clamped position (SP) and brought to a standstill. The manner of controlling the displacement speed of the clamping tools 201a, 201b, 255a, 255b, 262a, 262b is described hereinafter in more detail with reference to FIGS. 20 to 22.

Figure 20:
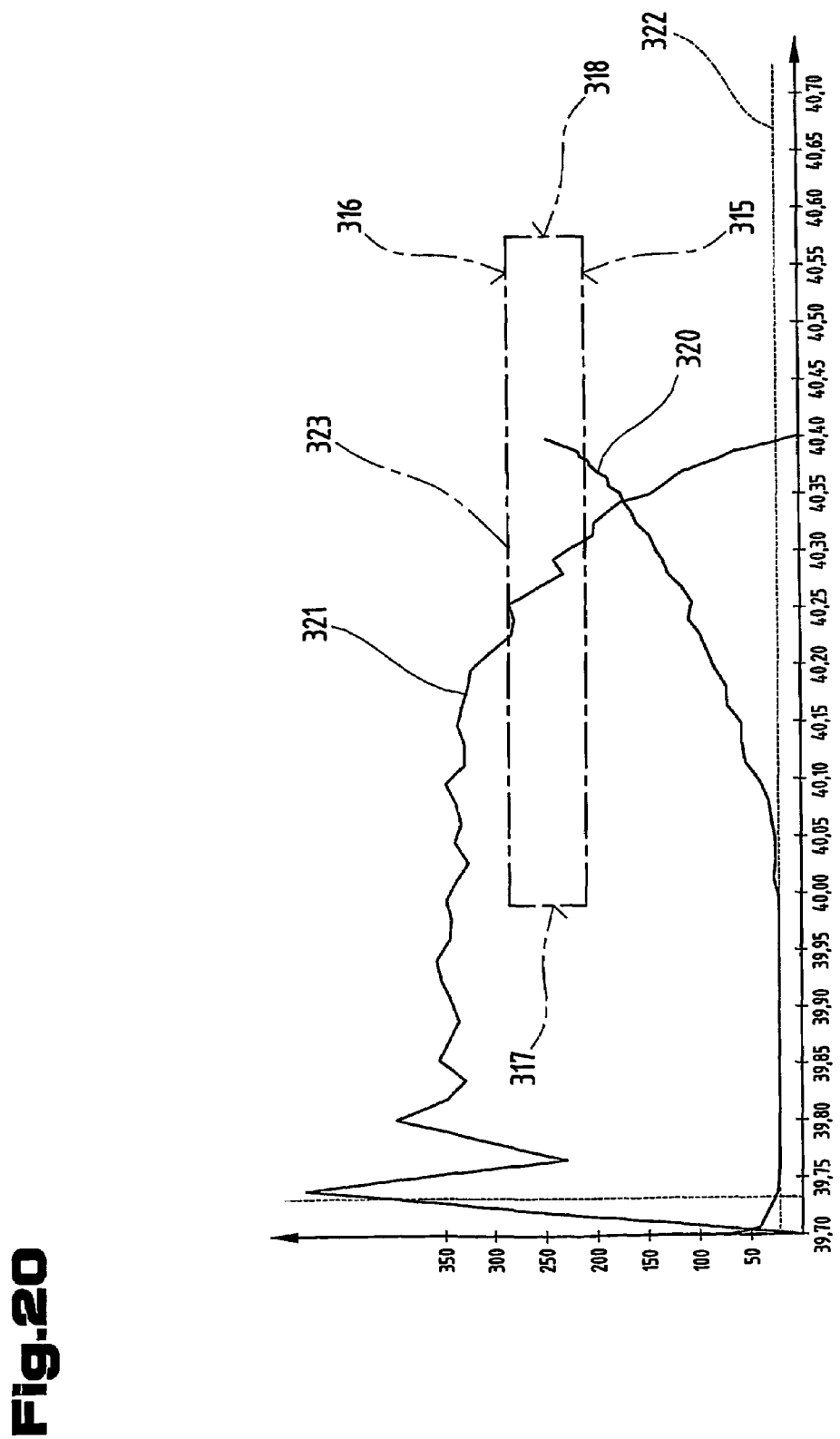
FIG. 20 shows a diagram of the path of the clamping force over the clamping and displacement path of a clamping tool and the evaluation of the clamping process as a perfect part.

In a second embodiment, the clamping tools 201a, 201b, 255a, 255b, 262a, 262b are accelerated from the initial position (AP) until just before the intermediate position (ZP) and moved in a decelerated manner as far as the intermediate position (ZP), then one or both clamping tools 201a, 201b, 255a, 255b, 262a, 262b are accelerated from the intermediate position (ZP) until the stop surfaces 217a, 217b, 269a, 269b, 277a, 277b bear against the part 1, 2 approximately at a constant displacement speed or further moved in a decelerated manner and only then, depending on the force increase is the displacement speed, as described in more detail in FIGS. 20 to 22, decelerated in a controlled manner until at a standstill.

In the intermediate position (ZP) the clamping tools 201a, 201b, 255a, 255b, 262a, 262b may grip the part 1; 2 and be displaced into the preparation position 270, 270' shown, the stop surfaces 217a, 217b, 269a, 269b, 277a, 277b being at a distance from the part 1, 2 or said stop surfaces being still slightly at a distance from the part 1; 2.

Preferably the electric motors 197a, 197b are coupled to the feed axes 112a, 112b electronically, and by their advancing motion the clamping tools 201a, 201b, 255a, 255b, 262a, 262b of the clamping devices 194a to 195b, 260a, 260b are displaced from a preliminary position into the initial position (AP) shown in FIG. 18a. The displacement movement of the clamping tools 201a, 201b, 255a, 255b, 262a, 262b from the initial position (AP) into the intermediate and clamped positions (ZP, SP) takes place by means of the drive units 180a to 181b.

Figure 19B:
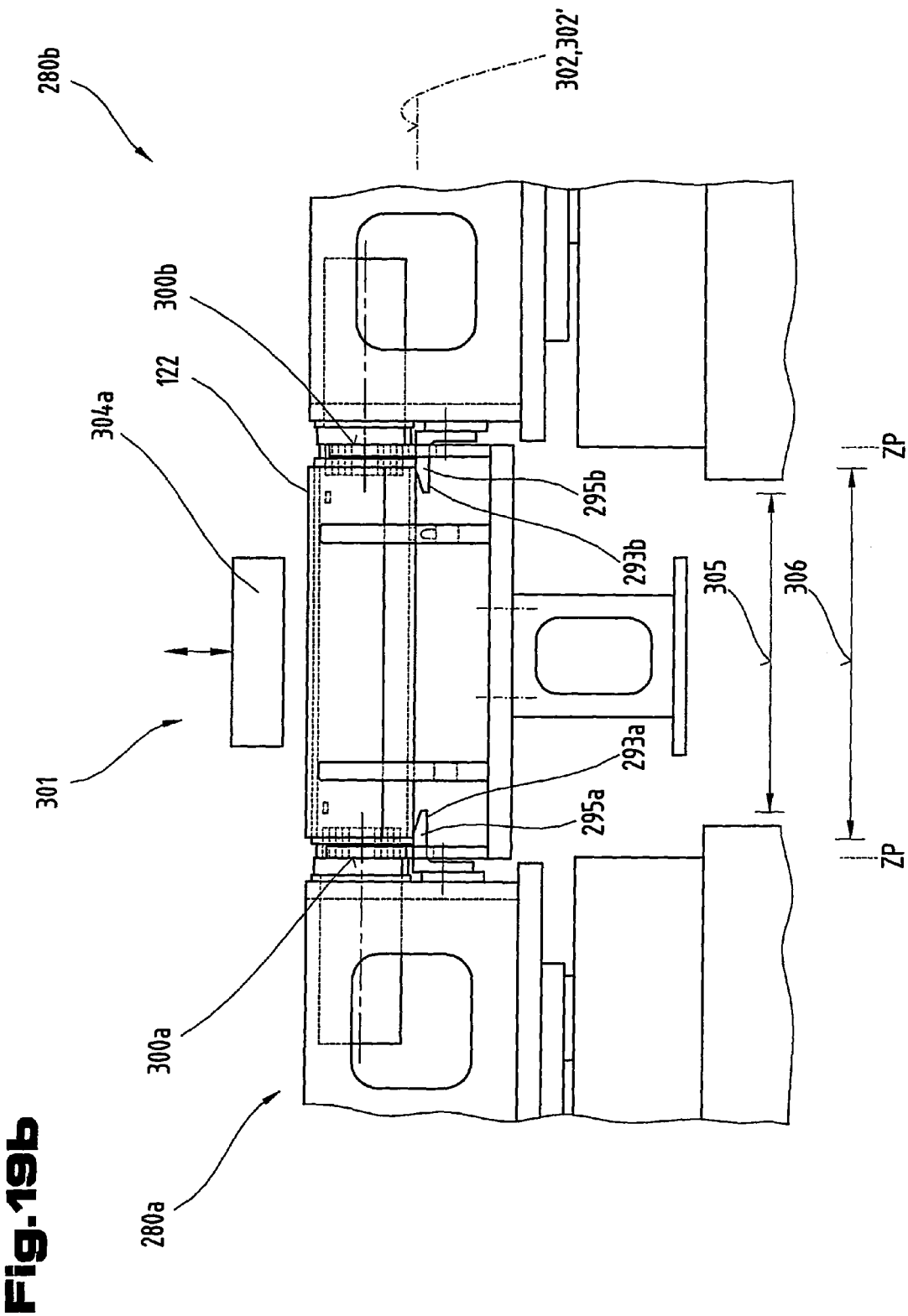

In FIGS. 19a to 19c described together, the clamping system 143 for the second assembly station 128 (as shown in FIG. 3) and the method sequence are described in more detail. The clamping system 143 comprises, according to this embodiment, the clamping unit 144, which is formed by clamping devices 280a, 280b arranged on both sides of a linear transport portion of the second transport device 130. These clamping devices 280a, 280b respectively comprise a drive unit 281a, 281b, a clamping tool 282a, 282b displaceable in the direction of the illustrated double arrow, a support frame 283a, 283b, a vertical positioning device 288a, 288b as well as an actuating device 289a, 289b for the clamping tool 282a, 282b. The drive units 281a, 281b respectively have a linear drive 285a, 285b controlled by means of an electric motor 284a, 284b and a set-up platform 286. The linear drives 285a, 285b respectively comprise a carriage 287a, 287b displaceable in a horizontal plane, to which the set-up platform 286 is fastened. According to the embodiment shown, the set-up platform 286 is formed by the carriages 287a, 287b. The clamping tool 282a, 282b is connected via the support frame 283a, 283b to the set-up platform 286 of the drive unit 281a, 281b. The support frames 283a, 283b of the clamping devices 280a, 280b respectively comprise a mounting plate 290a, 290b fastened to the set-up platform 286, and two side walls 291a, 291b fastened thereto and spaced apart from one another, as well as a support wall 292a, 292b connecting said side walls and arranged on one side facing the transport device 130.

The vertical positioning device 288a, 288b comprises a lifting device 293a, 293b with a support element 295a, 295b, lifting or lowering the previously welded sub-assembly 122 and the parts 3a, 3b together between a transport position 294, 294' thereof located on the parts transport carrier 48' and a preparation position 302, 302' thereof located above or below said transport position. Said support element 295a, 295b has just one stop bevel 296a, 296b extending downwards at an angle in the direction of the transport device 130 as well as a horizontal support surface 297a, 297b for the sub-assembly 122 and the part 3a, 3b. The support element 295a, 295b of the lifting device 293a, 293b is fastened to the support frame 283a, 283b, in particular to the support wall 292a, 292b. Naturally, the support element 295a, 295b of the vertical positioning device 288a, 288b, according to this embodiment, may also be configured to be vertically displaceable via an actuator, as described in FIGS. 15 to 17. Also, the vertical positioning device 288a, 288b may be arranged separately from the clamping devices 280a, 280b within the assembly station 128.

The clamping tool 282a, 282b is, according to this embodiment, formed by a collet chuck with clamping segments 298 radially displaceable via the actuating device 289a, 289b, as indicated only schematically. The actuating device 289a, 289b additionally has an actuator 299a, 299b, for example a fluid drive, by means of which the clamping segments 298 may be acted upon from inside by the pressure means. The clamping tool 282a, 282b or the support frame 283a, 283b are provided with a stop surface 300a, 300b.

Additionally, the assembly station 128 comprises a pressing device 301, which is configured separately from the clamping unit 144, and three pressing elements 304a, 304b, 304c arranged separately from one another and displaceable along the double arrows. The pressing elements 304a, 304b, 304c are assigned to the previously welded sub-assembly 122.

In FIG. 19a, the parts transport carrier 48' is moved into the holding position 142 (see FIG. 3) between the clamping devices 280a, 280b of the clamping unit 144 and stopped therein. Initially, the clamping tools 282a, 282b of the clamping devices 280a, 280b are moved by means of the drive units 281a, 281b transversely to the advancing direction—along arrow 140—of the parts transport carrier 48' from an initial position (AP) remote from the parts 3a, 3b as illustrated in broken lines in FIG. 19a, into an intermediate position (ZP) as illustrated in broken lines in FIG. 19b. Accordingly, a clearance width 305 measured between the edges facing one another of the support elements 295a, 295b oriented towards one another, is reduced to such an extent that said clearance width is smaller than the length 306 of the sub-assembly 122. Similarly, a clearance width measured between the stop surfaces 300a, 300b facing one another is reduced. As a result, the parts 3a, 3b and sub-assembly 122 delivered together to the parts transport carrier 48' are pushed along the stop bevels 296a, 296b onto the support elements 295a, 295b and lifted from the transport position 294, 294' on the parts transport carrier 48', in particular the receivers thereof 51', 131a, 131b, into the preparation position 302, 302', and stored on the support surfaces 297a, 297b. At the same time, the clamping tools 282a, 282b, in particular the clamping segments 298 thereof, penetrate the sleeves 16 of the parts 3a, 3b and the parts 3a, 3b are received by the clamping tools 282a, 282b. When pushing the parts 3a, 3b onto the clamping tools 282a, 282b, the clamping segments 298 are in a non-actuated initial position.

According to FIGS. 19b and 19c, preferably both clamping tools 282a, 282b of the clamping units 280a, 280b are advanced synchronously towards one another from the intermediate positions (ZP) into the clamped positions (SP), until the stop surfaces 300a, 300b bear against the front faces of the parts 3a, 3b and the parts 3a, 3b with opposing clamping forces—along the illustrated arrows 307—are clamped against the sub-assembly 122. In this case, the parts 3a, 3b and sub-assembly 122 are displaced relative to one another, so that said parts and sub-assembly are positioned and clamped in the direction of a longitudinal extension of the parts 3a, 3b/sub-assembly 122 and/or in a first spatial direction.

In a further embodiment, only one of the clamping tools 282b of the clamping units 280b is displaced from the initial position (AP) into the clamped position (SP), whilst the other clamping tool 282a of the clamping units 280a remains in the intermediate position (ZP) as a clamped position (SP). The actual values of the clamping force and/or clamping forces and clamping and displacement paths are detected, transmitted to the evaluation unit 38 and compared with the desired values and the quality features evaluated as is described below.

According to FIGS. 19a and 19c, next the pressing elements 202 to 204 are displaced towards the sub-assembly 122. The sub-assembly 122 is acted upon via the pressing elements 304a, 304b, 304c from above and to the side with pressing forces. The pressing forces are selected such that the sub-assembly 122 relative to the parts 3a, 3b and/or the clamping surfaces 300a, 300b of the clamping tools 282a, 282b may be slightly displaced in a second and third spatial direction. In this manner, the sub-assembly 122 is also positioned in the second and third spatial direction as well as moved into the clamped position 308 defined spatially and also fixed therein.

Subsequently, the parts 3a, 3b are moved from their preparation position 302' into the clamped position 312, 313, by the clamping segments 298 of the clamping tools 282a, 282b being actuated and displaced from their initial position into an actuating position and thus pressed against the inner surface of the sleeves 16, as illustrated in FIG. 19c. In the actuating position of the clamping segments 298, the parts 3a, 3b are received centred thereon and the central axes of both sleeves 16 form a common axis. Thus the parts 3a, 3b are positioned relative to the sub-assembly 122, secured spatially in the second and third spatial direction and moved into the clamped position 312, 313 defined spatially and held fixed therein.

By the clamping tools 282a, 282b, in particular the clamping segments 298, dimensional deviations of the sleeve 16 may be corrected, by the clamping segments 298 being moved radially outwardly to such an extent that the sleeves 16 of the parts 3a, 3b are changed from an actual shape into a desired shape, as is described in AT 1278/2004, and may form the subject matter of the present invention. As a result, therefore, slight deviations in the shape of the sleeves 16 may also be easily eliminated. In the shaping actuating position, the clamping segments 298 of the clamping tools 282a, 282b are pressed against the inner surface of the sleeve by a pretensioning force, so that the sleeve 16 is elastically and/or plastically deformed.

After the parts 3a, 3b and sub-assembly 122 are positioned in the three spatial directions and moved into the respective clamped position 308, 312, 313, clamped therein and fixed and the quality features are checked and positively evaluated, the parts 3a, 3b together with the sub-assembly 122 are connected to one another at the joint points 18a, 18b, 18c; 19a, 19b by means of joint seams 21, in particular welded. The joint seams 21 are formed by square butt welds, so that a positional accuracy of the parts 3a, 3b in a plane extending transversely to the longitudinal extension of the sub-assembly 122 of 0.1 mm to 0.5 mm is sufficient. During the joining process, the clamping tools 282a, 282b, the clamping segments 298 and the pressing elements 304a, 304b, 304c are maintained stationary.

If the joining process is terminated, the clamping tools 282a, 282b are moved from their clamped positions (SP) into the initial positions (AP), and thus by increasing the spacing 305, the finished, joined sub-assembly 147 is again deposited on the parts transport carrier 48', preferably remaining during the clamping and joining process in the holding position 142 and transported from the assembly station 128.

The intermediate position (ZP) is established before the startup of the production system 1 for each of the above-mentioned clamping devices and is approximately between 0.3 mm and 5 mm, in particular between 1 mm and 3 mm, in front of the bearing surfaces 10, 12 and/or front faces of the parts 1, 2, 3a, 3b.

Also, it might be mentioned at this point in summary that from those clamping tools which move from the intermediate position (ZP) into the clamped position (SP), the actual values of the clamping forces and displacement and clamping paths are detected, compared with the desired values and the quality features evaluated, whilst from those clamping tools which exclusively move into an intermediate position (ZP) corresponding to a clamped position (SP), only the actual values of the displacement paths are detected and compared with the desired values for controlling the position and/or positioning the clamping tools.

According to the method disclosed, either both clamping tools 201a, 201b, 255a, 255b, 262a, 262b; 282a, 282b of the clamping units 114 to 116; 144 are displaced towards one another and/or in opposite directions or only one of the clamping tools 201a, 201b, 255a, 255b, 262a, 262b; 282a, 282b of the clamping units 114 to 116; 144 is displaced from the initial position (AP) into the clamped position (SP). The latter method is used when the parts 1, 2 3a, 3b are made with a relatively high degree of accuracy, such as for example by precision blanking, deep drawing or solid forming.

In FIGS. 20 to 22 described together, a method for positioning and checking a quality feature of a part 1 to 3b to be further processed as well as a method for joining parts 1 to 3b in an assembly station 43; 128 previously disclosed is now described. The positioning and clamping process for the parts 1, 2 is disclosed hereinafter.

Initially, the first part 1 is moved by means of the clamping tools 201a, 201b from the parts transport carrier 48 from the transport position 219 into the preparation position 270, by the clamping tools 201a, 201b respectively moving from the initial position into the intermediate position. This takes place preferably at high speed, in order to keep the cycle time for the positioning and clamping of the first part 1 as short as possible. In the intermediate position, the stop surfaces 217a, 217b of the clamping tools 201a, 201b are positioned just in front of the front and/or bearing surfaces 12 of the first part 1, but the part 1 is already located on the stop bevels 215a, 215b or the horizontal support surfaces 216a, 216b.

FIGS. 20 to 22, show the evaluation and/or recording of the displacement and clamping path as well as the clamping force, for example, on the part 1 of a clamping tool 201b moving between the intermediate and clamped position. To this end, preferably, the actual values of the displacement and clamping paths and the clamping force are detected continuously and transmitted to the electronic evaluation unit 38 illustrated in FIG. 3, then by means of the comparison module 39 a desired- and actual value-comparison of the displacement and clamping paths and the clamping force on the part 1 is preferably continuously carried out.

According to the invention it is now provided that the desired value for the clamping force of the clamping tool 201b is pre-determined in a limited manner by a tolerance field with a lower limit 315 and an upper limit 316 and the desired value for the displacement and/or clamping path covered by the clamping tool 201b is predefined in a limited manner by a tolerance field with a lower limit 317 and an upper limit 318. The lower and upper limits 315 to 318 define a tolerance window. For monitoring the clamping process and/or the controlled clamping process the displacement and/or clamping path covered and/or extending between the intermediate and final clamped position and the clamping force relative to the displacement and/or clamping path is recorded.

By the relative movement of the clamping tools 201, 201b, since the stop surfaces 217a, 217b bear against the front and/or bearing surfaces 10 of the part 1, the part 1 is slightly pretensioned, and as a result of which the clamping force rises.

As already described above, a monitoring of a quality feature, in particular the dimensional stability of the part 1, is now possible by means of the method according to the invention. Thus it may now be established whether the length 267 thereof has been made within pre-determined tolerances. For example, depending on the joining method the tolerance limits are +/−0.2 mm. If the length 267 of the first part 1 exceeds the lower or upper tolerance limit, the overall accuracy of the sub-assembly 122, 147 to be produced may no longer be ensured and said insufficiently accurate part 1 has to be discarded as an imperfect part from the production process, as explained in more detail in the diagrams of FIGS. 21 and 22.

FIG. 20 shows the evaluation of the clamping force and the displacement and clamping paths of a part 1, the quality feature thereof, in particular the dimensional stability, being fulfilled within pre-determined tolerance limits. As is visible from the diagram, the clamping force 320 on the part 1 and the displacement speed 321 of the clamping tool 201b over the displacement and clamping path between the intermediate and clamped position are evaluated. Preferably, the frictional force 322 occurring during the displacement of the clamping tool 201b between the intermediate and clamped position is detected from the exerted torque and/or motor current of the electric motor 188b for this clamping device 194b during the clamping process. The frictional force 322 is input into the control device 36 as an amount on the dotted vertical line and automatically therefrom the lower and upper limit 315, 316 of the desired value for the clamping force is acted upon by the amount of frictional force 322.

If the clamping tool 201b is moved from the intermediate into the clamped position, the stop surfaces 217a, 217b strike the bearing surfaces 10 of the part 1 and, as a result of the increasing pretension in the part 1, the clamping force rises. On the displacement path from the intermediate position to the bearing surface 10 and/or at the start of clamping of the part 1, only the frictional force to be overcome during the movement of the clamping tool 201b by the linear drive 184b is detected. At the same time, the displacement speed of the clamping tool 201b and/or the clamping device 194b is evaluated. As is visible, the clamping tool 201b is briefly accelerated out of the intermediate position and then with progressively increasing clamping force braked in a controlled manner from the maximum speed to a minimum speed. The minimum speed is 0 mm/sec. The control of the speed takes place by means of control mechanisms known per se.

The part 1 is evaluated as a "perfect part" and the at least one clamping tool 201b stopped in its clamping movement, provided that the actual value of the displacement and clamping path covered by the clamping tool 201b displaced from the intermediate into the clamped position and the actual value of the clamping force on the part 1 is within the tolerance window. In other words, in the clamped position of the part 1, therefore when said part is positioned, clamped and fixed, the clamping tools 201a, 201b are advanced towards one another to such an extent that a pretensioning in the part 1 is created and thus the actual value of the clamping force is between the lower and upper limits 315, 316.

Since the part 1 corresponds to the quality requirements, and has been verified as a "perfect part" by the control device 36, the part 1 is fixed in its clamped position 272 by means of the pressing elements 230a, 230b, the clamping unit 115, in particular at least one of the clamping devices 195a, 195b controlled by the control device 36 and the clamping process and a monitoring of a quality feature, in particular the dimensional stability of the second part 2, initiated. Accordingly, the first part 1 is only prepared for a further operating process, when said part also fulfils the quality requirements. The part 1 and the clamping tools 201a, 201b are kept unchanged in the meantime in the clamped position thereof.

Initially, the part 2 is positioned by means of the second vertical positioning devices in the preparation position 270' between two cooperating clamping tools 255a, 255b. Then the clamping tools 255a, 255b are moved from their initial positions into the intermediate positions and are stopped briefly therein. Subsequently, at least one of the clamping tools 255b is moved from the intermediate into the clamped position. If the stop surfaces 269a, 269b strike the stop surfaces 12 of the part, as a result of the increasing pretensioning in the part 2 the clamping force increases. The speed control takes place on the same basis as described above. The part 2 is evaluated as a "perfect part" and the at least one clamping tool 255b is stopped in its clamping movement, provided that the actual value of the displacement and clamping path covered by the clamping tool 255b displaced from the intermediate position into the clamped position and the actual value of the clamping force on the part 2 are within the tolerance window. During the displacement movement of the clamping tool 255b, the second part 2 is positioned relative to the first part 1 in at least one spatial direction, in particular in the direction of the longitudinal extension thereof.

Preferably, the parts 1, 2 are aligned centrally to one another, therefore the central axes of the parts 1, 2 extending transversely to the displacement direction—according to the double arrow 323 illustrated in FIG. 18a—of at least one clamping tool 255b extend in a congruent manner. If both clamping tools 201a, 201b, 255a, 255b of the clamping units 194a, 194b, 195a, 195b are displaceable relative to one another, the parts 1, 2 are clamped centrally to one another solely due to the synchronous advancing movement thereof. As a result, it is possible that the production tolerances of the parts 1, 2 in the displacement direction—along the double arrow 323—are divided such that the joint gap 27a, 27b on both opposing sides—as illustrated in FIG. 2 for one side of the sub-assembly—is set equally to a permissible degree. If this size is within the dimension of approximately 0.3 mm to 0.6 mm, pre-determined by the focal point of the laser beam, the second part 2 is evaluated as a "perfect part" during the positioning and clamping process. If, however, the joint gap 27a is displaced only on one side, said joint gap would be inadmissibly wide, the second part 2 evaluated during the positioning and clamping process as an "imperfect part", so that a joining, in particular laser welding, could not take place to a corresponding degree of quality. In practice, it has been shown that the clamping tools 201a, 201b, 255a, 255b of the clamping units 194a, 194b, 195a, 195b are intended to be displaced synchronously relative to one another, when greater production tolerances of the part(s) 1, 2 have to be taken into account. In this manner, parts 1, 2 of lower quality may also be used, without affecting the overall accuracy of the sub-assembly 122, 147.

Only after the second part 2 has also been evaluated as a "perfect part" and released, are the two parts 1, 2 joined together. This has the advantage that exclusively the parts 1, 2 which correspond to the quality features, in particular those which maintain the dimensional stability, are joined together and a sub-assembly 122 is produced which takes into account the highest requirements for production accuracy.

In this connection, it is advantageous if the joining of the parts 1, 2 takes place by means of laser or plasma welding, as a good compromise between flexible production, on the one hand, and high production accuracy, on the other hand, may be made. The distortion as a result of heat during laser or plasma welding due to welding stress is almost negligible, and the high requirements for dimensional stability are able to be maintained. It is advantageous, however, if the joining takes place by bonding, whereby the dimensional accuracy may be maintained in even narrower tolerance limits.

After the parts 1, 2 are joined together, said joined sub-assembly 122 is in turn deposited on a parts transport carrier 48, and by means of said parts transport carrier transported out of the assembly station 43 and possibly supplied to a further assembly station 128.

On the other hand, the clamping tool 201b is stopped in its clamping movement and the part 1 evaluated from the current operating process as an imperfect part, provided that the actual value of the displacement and clamping path covered by the clamping tool 201b displaced from the intermediate position into the clamped position, and/or the actual value of the clamping force on the part 1 is outside the pre-determined tolerance window, as is shown in FIG. 21 and FIG. 22. According to FIG. 21 it is visible that the part 1 does not correspond to the required dimensional stability and falls below the minimum size and, therefore, is too short. Accordingly, the clamping tool 201b would have to move considerably beyond the upper limit 318 of the displacement and clamping path, in order to achieve the desired value for the clamping force on the part 1.

As, expediently, the displacement speed of the clamping tool 201b is controlled depending on the force increase, in particular the displacement speed of the clamping tool 201b is only progressively reduced with a progressive force increase, there is the advantage that the displacement speed of the clamping tool 201b is reduced over a wide region of the displacement and clamping path, only by a small value relative to the maximum speed. The clamping force is approximately constant over a wide region of the displacement and clamping path, which is why the displacement speed of the clamping tool 201b is also kept approximately constant over this region. Only after it is established by the control unit that the desired value of the displacement and clamping path and/or the clamping force will be outside the tolerance window, is the clamping tool 201b decelerated in a controlled manner and stopped.

If, however, the part 1 is too long, according to the view in FIG. 22, therefore, and it does not correspond to the required dimensional stability and the maximum size is exceeded, the clamping force reaches its desired value even before reaching the lower limit 317 for the displacement and clamping path. As the clamping force increases excessively, the controlled displacement speed of the clamping tool 201b is considerably reduced at the same time.

Since the part 1 does not correspond to the quality requirements and has been verified as an "imperfect part" by the control device 36, the clamping process is terminated and said part 1 is discarded from the current operating process. To this end, initially the clamping tool 201b is returned counter to the clamping movement from the clamped position into the intermediate or initial position. With reducing clamping force, the displacement speed of the clamping tool 201b is progressively increased up to the maximum speed. As all movements of the clamping tool 201b take place at optimised displacement speeds, the assembly station 43, 128 is only blocked for a short time period.

It is essential that for each of the clamping tools 201b, 269b moving between the intermediate and clamped position, a desired-actual value-comparison of the displacement and clamping paths and clamping forces is carried out in the evaluation unit 38 (see FIG. 3) and using said comparison, the verification between the "perfect part" and "imperfect part" takes place.

In FIGS. 23 to 25 described together, a further embodiment of a sub-assembly is shown in different views, which is produced by the production installation according to the invention with a different embodiment of clamping units of the clamping system and/or according to the method according to the invention. This sub-assembly consists of at least two profile-like parts 330, 331, which according to this embodiment are guided in one another and are arranged relative to one another in a rotationally secure manner via indentations 332, 333.

The parts 330, 331 are preferably produced from a formed part, in particular a stamped and bent part or solid formed part. The outer part 330 has on its inner face guide surfaces facing one another which are at least partially formed by the internal contour of the part 330, and between which the inner part 331 is received. The inner part 331 forms at least partially on its outer face guide surfaces which are formed by the outer contour of the part 331 and face the guide surfaces of the outer part 330.

The parts 330, 331 are initially respectively moved into a preparation position shown in FIG. 23 between cooperating clamping tools 334a, 334b by only schematically indicated clamping devices 335a, 335b of a clamping unit 336 and subsequently in the above-described manner clamped by means of at least one clamping tool 334a; 334b displaceable from an intermediate position into a clamped position. Previously, both clamping tools 334a, 334b are moved into the intermediate position, as shown in FIG. 23, and if required stopped in said position. The clamping tool 334b, according to this embodiment, remains in the intermediate position corresponding to the clamped position, whilst the clamping tool 334a moves out of the intermediate position into the clamped position and is pressed against the part 330 with opposing clamping forces and/or clamping force components—along the arrow 338. On the other hand, both clamping tools 334a, 334b are also respectively displaced synchronously relative to one another from their intermediate position into the clamped position. The disclosed clamping devices 335a, 335b comprise drive units 337a, 337b which are configured as linear drives with one respective carriage (not shown) mounting the clamping tool 334a, 334b. The carriage forms the set-up platform.

Also, according to this embodiment, the actual value of the clamping force on the part 330 and/or displacement and clamping path covered by the clamping tool 334a; 334b displaced from the intermediate position into the clamped position is detected, and transmitted to an electronic evaluation unit, then a desired-actual value-comparison of the clamping force and/or or of the displacement and clamping path is carried out therein, as has already been described above in detail.

The desired value of the clamping force and/or of the displacement and clamping path of the clamping tool(s) 334a; 334b is thus established such that the inner part 331 arranged inside the outer part 330 is elastically and/or plastically deformed.

The outer part 330 is deformed and/or moved by means of the clamping tool(s) 334a; 334b to such an extent against the action of the resilient restoring force of the inner part 331 until the actual value of the clamping force and/or of the displacement and clamping path corresponds to the desired value of the clamping force and/or of the displacement and clamping path. In this connection, the corresponding guide surfaces of the parts 330, 331 come to bear flat against one another. After the actual value has reached the desired value, and the inner part (331) is pretensioned via the outer part (330), the outer part 330 in the region of its overlapping longitudinal edges (joint point) is joined together at least in partial sections, in particular welded or bonded by means of laser welding, electron beam welding or plasma welding, as illustrated in FIGS. 24 and 25. The joining device, in particular a beam welding head 339, is schematically indicated in FIG. 24. Expediently, the modulus of elasticity of the inner part 331 is lower than that of the outer part 330. For example, the outer part 330 may be slightly plastically deformed and the inner part 331 purely elastically deformed. Such a sub-assembly may, for example, be used as a telescopic steering shaft for a motor vehicle.

Figure 27:
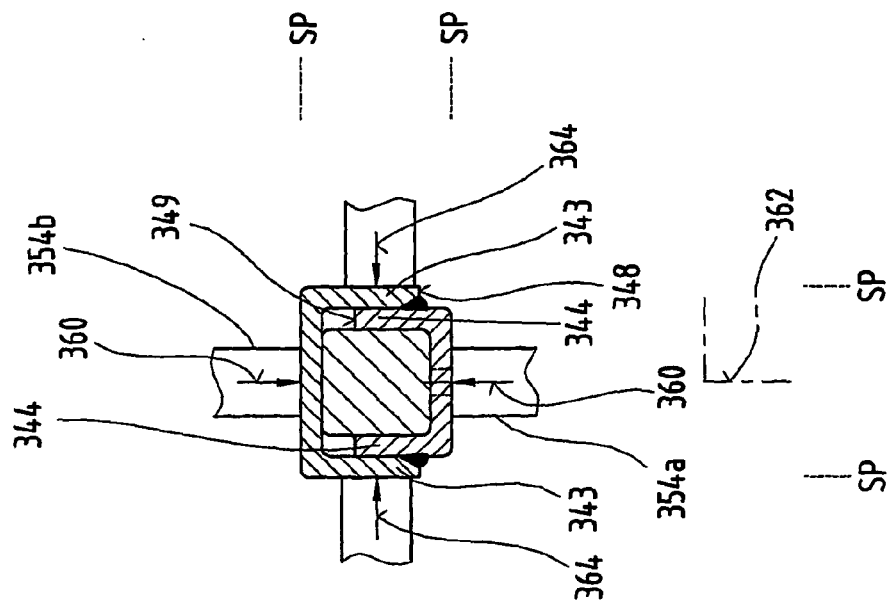
FIG. 27 shows the embodiment according to FIG. 26 with the clamping tools of the clamping units located in a clamped position.
Figure 26:
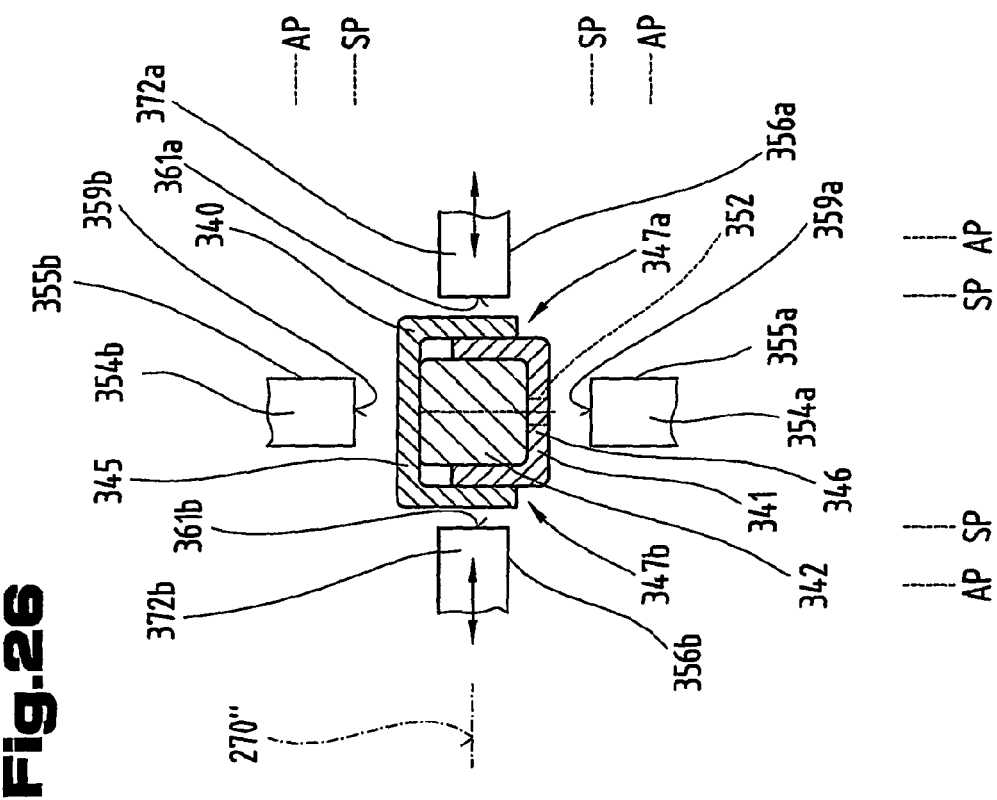
FIG. 26 shows a further embodiment of a sub-assembly and the clamping tools located in an intermediate position of clamping units, sectioned in front view and a considerably simplified view.
Figure 28:
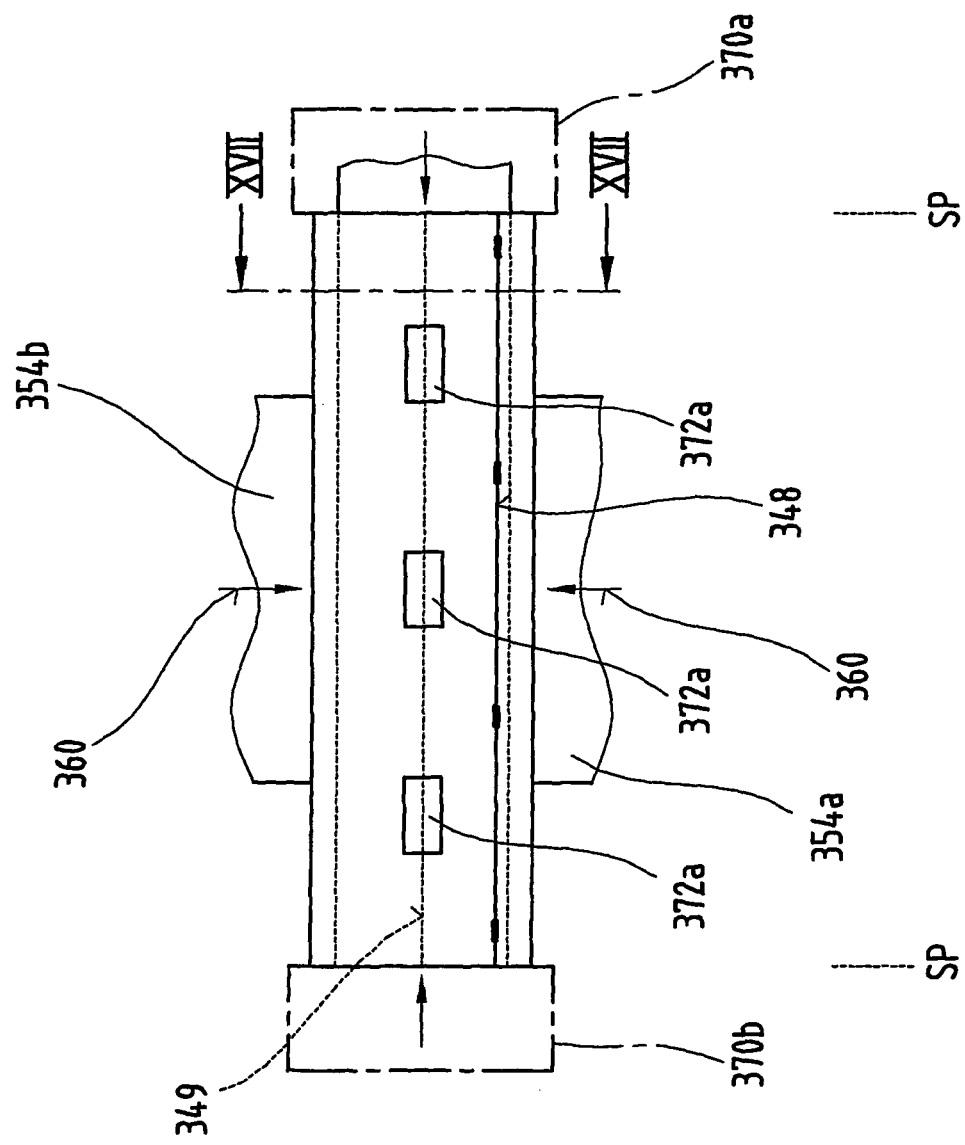
FIG. 28 shows the sub-assembly according to FIG. 26 and the clamping tools located in the clamped position, in side view and in a considerably simplified representation.

In FIGS. 26 to 29 described together, a further embodiment of a sub-assembly is shown, which is produced by the production installation according to the invention with a further embodiment of clamping units of the clamping system and/or according to the method according to the invention. This sub-assembly consists of three parts, the two outer parts 340, 341 and a central part 342 mounted therebetween. The outer parts 340, 341, in a plane perpendicular to the longitudinal extension thereof, are configured in a substantially U-shaped manner and have parallel limbs 343, 344 arranged at a distance from one another, and a base 345, 346 connecting said limbs. The limbs 343, 344 of the outer parts 340, 341 are oriented towards one another. In this connection, the limbs 343, 344 of the parts 340, 341 as shown in FIGS. 26 to 28, are arranged overlapping one another at joint points 347a, 347b, so that opposing front edges 348, 349 of the U-shaped parts 340, 341 are arranged at a distance from one another or the front edges 348, 349 are oriented towards one another and positioned against one another. The parts 340, 341, 342 are made to size from metal and/or plastics material. Due to production tolerances, however, the dimensional stability of the individual parts 340 to 342 is insufficient and the final quality of the sub-assembly is not satisfactory.

If it is now required that the central parts 342 under the action of force, in particular a defined releasing force, may be displaced relative to the outer parts 340, 341 in the direction of the longitudinal extension of the sub-assembly, a reproducible behaviour of the releasing force is achieved by the central part 342 being pretensioned between the two outer parts 340, 341, in particular the central part 342 being elastically and/or plastically deformed. Such a sub-assembly may, for example, be used as a so-called blocking device of an anti-theft device or crash device on a steering shaft of a motor vehicle or an overload security on a joint connection, in particular as a slide coupling. The central part 342 is mounted by a frictional connection between the two outer parts 340, 341. If the releasing force exceeds the maximum permissible frictional force, the frictional connection is released and the inner part 342 may be displaced relative to the outer parts 340, 341. Kinetic energy is released on the displacement path. If this sub-assembly is used as a crash device, on the displacement path the impact energy acting on the vehicle is dissipated in an accident and the risk of injury to the vehicle driver reduced.

The parts 340, 341 are preferably produced from a shaped sheet metal part. The inner part 342 forms an interference fit with the outer parts 340, 341 joined together. The outer parts 340, 341 have on their inner face guide surfaces at least partially facing one another, which are formed on the base 345, 346 and between which the inner part 342 is arranged. The inner part 342 forms at least partially on its outer face, guide surfaces which are formed by portions of the outer contour of the part 342, and face the guide surfaces of the outer parts 340, 341. The central part is supported on the base 345, 346 of the parts 340, 341. The inner part 342 bears at least partially with its outer contour on the inner contour of the outer parts 340, 341 with a pretensioning force. The pretensioning force is thus selected to be sufficiently high that it corresponds to the maximum permissible frictional force. Preferably, the modulus of elasticity of the inner part 342 is lower than that of the outer parts 340, 341.

The method for producing this sub-assembly is described in more detail hereinafter.

The parts 340 to 342 are preferably respectively removed from a parts delivery site by means of at least one handling system and deposited roughly pre-positioned on one or more parts transport carriers 48 oriented in position relative to one another. To this end, as described above, the parts transport carrier 48 may be provided with a positioning means 80 and one of the outer parts 340, 341 with a positioning opening 352. These parts 340 to 342 are together supplied by means of the parts transport carrier 48 of the transport device 46 to the assembly station 350, and stopped therein in a holding position. Subsequently, the parts 340, 341 are moved via at least one support element of a lifting device comprising the vertical positioning device, together from the transport position on the parts transport carrier 48 into the preparation position 270" located above or below said parts transport carrier, between cooperating clamping devices 355a, 355b, 356a, 356b of the clamping units 357, 358, in particular lifted or lowered. To this end, the clamping tool 354a and/or the clamping device 355a is displaced by means of the drive unit, not shown further, in particular a linear drive, from the initial position (AP) thereof located below the transport position into an intermediate position (ZP) located above the transport position. The clamping devices 355a, 355b arranged above one another respectively have a clamping tool 354a, 354b and a drive unit and form the first clamping unit 357. The support element of the lifting device 353 is, according to this embodiment, formed by the lower clamping tool 354a of the first clamping unit 357.

During the displacement movement or subsequently to the displacement movement of the clamping device 355a and/or of the clamping tool 354a, by means of the drive units, not shown further, in particular linear drives, the clamping devices 355b, 356a, 356b and/or clamping tools 354b, 372a, 372b are displaced from their initial position (AP) into an intermediate position (ZP), as illustrated in the figures in broken lines.

According to the figures, the clamping tools 354a, 354b of the clamping devices 355a, 355b are displaced relative to one another until the stop surfaces 359a, 359b thereof bear against the parts 340, 341, so that the outer parts 340, 341 are advanced towards one another, positioned and the central part 342 is pretensioned in a first spatial direction. The relative displacement of the clamping tools 354a, 354b of the clamping devices 355a, 355b leads to the parts 340, 341 being advanced towards one another against the action of the elastic restoring force of the part 342. If the actual value of the clamping force and/or of the displacement and clamping path reaches the desired value of the clamping force and/or of the displacement and clamping path, the relative displacement of the clamping tools 354a, 354b is stopped relative to one another. The parts 340, 341 are thus acted upon with opposing clamping forces—along the arrows 360 illustrated in FIG. 27. The clamping forces are maintained until the parts 340, 341 have been joined. In this manner, the outer parts 340, 341 are respectively positioned and secured in a first spatial direction and relative to one another.

Subsequently, the clamping tools 372a, 372b of the clamping devices 356a, 356b are displaced relative to one another until the stop surfaces 361a, 361b bear against the parts 340, 341, in particular the limbs 343, so that the outer parts 340, 341 are respectively positioned in a second spatial direction and moved into a clamped position 362 pre-determined spatially, and possibly the central part 342 is also pretensioned in the second spatial direction. The parts 340, 341 are thus acted upon by opposing clamping forces—along arrows 364 illustrated according to FIG. 27.

As illustrated in broken lines in FIGS. 28 and 29, at least the outer parts 340, 341 may be positioned before they have been joined together, via further clamping devices 370a, 370b of a third clamping unit 371 in the direction of the longitudinal extension thereof and the quality features, in particular the dimensional stability, are detected in the above described manner and evaluated. The clamping devices 370a, 370b, as have been described above with reference to FIGS. 14, 14a, respectively have a clamping tool 369a, 369b and a drive unit and/or linear drive.

As already described, the clamping tools 354a, 354b, 372a, 372b; 369a, 369b of the first, second and third clamping unit 357, 358; 371 may be respectively moved synchronously from the intermediate position (ZP) into the clamped position (SP), by the electric motors of the drive units being electrically coupled. On the other hand, only one of the clamping tools 354a, 354b, 372a, 372b; 369a, 369b of the first, second and also the third clamping unit 357, 358; 371 may respectively move from the intermediate position (ZP) into the clamped position (SP) and advanced towards the stationary clamping tool 354a, 354b, 372a, 372b; 369a, 369b. The intermediate position (ZP) thus corresponds to the clamped position (SP).

The positioning and clamping process takes place according to the above-described manner by detecting the actual values for clamping force and/or the displacement and clamping path and by a desired-actual value-comparison of the clamping force and/or of the displacement and/or clamping path for the clamping tools 354a, 354b, 372a, 372b; 369a, 369b of each clamping unit 357, 358; 371 moving from the intermediate position (ZP) into the clamped position (SP). The desired values for the clamping force and/or displacement and clamping path results from pre-determining the disengaging force and is, for example, determined empirically from tests, and obtained or calculated from empirical values.

If the clamping forces and/or the displacement and clamping paths of the clamping tools 354a, 354b, 372a, 372b; 369a, 369b of each clamping unit 357, 358; 371 are within the above-described tolerance window, the clamping forces on the parts 340, 341 are maintained for a sufficiently long time until the parts 340, 341 are at least partially joined together at the joint points 347a, 347b. The tolerance window for the clamping force and/or the displacement and clamping path of each clamping tool 354a, 354b, 372a, 372b; 369a, 369b is preferably empirically determined so that the disengaging force is reliably set.

For better understanding of the construction of the clamping system 351 comprising the clamping units 357, 358; 371, said clamping system 351 is shown schematically in FIG. 29.

The clamping devices 356a, 356b arranged adjacent to one another respectively have a drive unit and three clamping tools 372a, 372b displaceable via the drive unit, which are fastened via a common support frame 373a, 373b to the set-up platform formed by a carriage 374a, 374b of the linear drive of the drive unit 375a, 375b. The support frame 373a, 373b is configured as in FIGS. 14, 14a and has the two support walls and a mounting plate. The clamping devices 356a, 356b form the second clamping unit 358.

The cooperating clamping devices 356a, 356b are arranged in succession on an approximately U-shaped fastening plate 376 in the advancing direction—along the arrow 65. This fastening plate 376 is mounted on a carriage 377 of a linear drive configured as a feed axis 378, with an electronically controlled electric motor 379. By means of the feed axis 378, the cooperating clamping devices 356a, 356b of the second clamping unit 358 may be displaced together. Whilst the parts transport carriers 48 of the transport device 46 are moved away in a clocked manner, the clamping devices 356a, 356b are positioned in a preliminary position to the side of the transport device 46. During the stationary period of at least the parts transport carrier 48 moved into the holding position, the clamping tools 372a 372b of the clamping devices 356a, 356b are respectively moved into an initial position.

As further illustrated in FIG. 29, the clamping device 370b of the third clamping unit 371 is optionally mounted on the fastening plate 376. The clamping device 370a is fastened to the side of the transport device 46 on a mounting plate, not shown, of a base frame of the assembly station and respectively comprises the clamping tools 369a, 369b.

The clamping devices 355a, 355b of the first clamping unit 357 are mounted on the base frame of the assembly station.

On the other hand, it is, however, also possible that the clamping devices 356a, 356b; 370a 370b of the second and/or third clamping unit 338; 371, are formed by pressing devices and the clamping tools 372a, 372b are formed by pressing elements, which may be displaced between a resting position and a pressing position, in the pressing position the limbs 343, 344 of the parts 340, 341 being pressed against portions of the outer periphery of the inner part 342, without an evaluation of a clamping force on the parts 340 to 342 and/or of a displacement and clamping path taking place.

Preferably, the parts 340 to 342 have already been supplied as a sub-assembly in the parts delivery site into a transfer position and transferred from there via a handling system to a receiving position of the transport device 46. The sub-assembly, oriented in position, is lifted in the holding position from the parts transport carrier 48 by means of a vertical positioning device.

If, however, the parts 340 to 342 are supplied successively and/or in groups to the assembly station, for the sub-assembly consisting of the parts 341, 342, a first vertical positioning device is provided and for the part 340 a second vertical positioning device is provided. For example, the second vertical positioning device is formed by a handling system with a claw, which removes the part 340 from the parts delivery site and is deposited onto the sub-assembly located in the holding position. Subsequently, the positioning and clamping process takes place by means of the clamping system 351.

In FIG. 30, a further embodiment of a sub-assembly, in particular an articulated connection, consisting of three parts 381 to 383 is shown. The parts 381, 382 are formed by a first and second articulated rod. The third part 383 is formed by a bearing pin, which comprises a conical head and a cylindrical shaft connected thereto. The head is inserted into a conical receiver in the first articulated rod.

So that the parts 381, 382 of the articulated connection may be pivoted as smoothly as possible relative to one another, the parts 381, 382 are not pretensioned relative to one another but connected to one another such that a clearance 384 and/or a spacing is set between the parts 381, 382. The clearance 380 may be set to zero or such that said clearance forms a small gap, to the extent of a few tenths of a millimetre. The clearance 383 is set via the bearing pin.

Hereinafter, details are only provided about the positioning and clamping process of the parts 381 to 383, as the different possibilities for the transport thereof has already been described in detail above.

In the figure shown, the parts 381 to 383 are already in the preparation position between clamping tools 385a, 385b of cooperating clamping devices 386a, 386b, which are respectively moved by means of drive units and/or linear drives, not shown, from the initial position (AP) into the intermediate position (ZP). Only one of the clamping tools 385a, 385b may be moved or both clamping tools 385a, 385b may in turn be moved synchronously towards one another into the clamped position (SP). It is assumed hereinafter that the clamping tools 385a, 385b are already in the intermediate position (ZP) and at least one clamping tool is moved into the clamped position (SP). According to the embodiment shown, the clamping tools 385a, 385b act on the bearing pin.

Initially, in the preparation position, the parts 381, 382 are aligned in their orientation to one another and, for example, the part 382 is held fixed, whereupon the bearing pin is axially displaced by means of the clamping tool 385a, the actual value of the displacement path being determined and being input to the evaluation unit 38, in which a desired-actual value-comparison of the displacement path is carried out. If the actual value reaches the desired value of the displacement path, the parts 381 to 383 are positioned and held in their clamped position and thus relative to one another such that the clearance 384 between the parts 381, 382 is set. The moving clamping tool 385a is held positioned in the clamped position (SP) and then the shank of the bearing pin and the part 382 are joined.

In a further embodiment, in the preparation position the parts 381, 382 are aligned in their orientation relative to one another and, for example, the part 382 is held fixed, whereupon the bearing pin is axially displaced by means of the clamping tool 385a and the part 381 is advanced towards the part 382 and briefly pressed against said part, whereupon the clamping tool 385a is displaced in the opposing direction into a clamped position (SP) and/or sufficiently far that the clearance 384 between the parts 381, 382 is set. To this end, in addition to the clamping tool 385a, a further second clamping tool 385b, as illustrated in broken lines, opposing said clamping tool, is required. The bearing pin is received between stop surfaces of the clamping tools 385a, 385b facing one another. From the clamping tools 385a, 385b the actual value of the displacement and/or clamping path is continuously determined and compared with the pre-determined desired value of the displacement and/or clamping path and the desired-actual value-comparison evaluated. If the clamping tools 385a, 385b respectively reach the pre-determined desired value for the displacement and/or clamping path, the clearance 384 is set. After the clearance 384 and/or size has been set, the parts 382, 383 are joined.

In a further embodiment, the bearing pin is axially displaced by means of the clamping tool 385a and the part 381 advanced towards the part 382, and pressed against said part by a clamping force. As illustrated in broken lines, a second clamping tool 385b acts on the bearing pin. From the first and/or second clamping tool 385a; 385b the actual value of the clamping force is continuously detected and transmitted to the evaluation unit 38. If the actual value of the clamping force reaches a pre-determined setting force, the moving clamping tool 385a, 385b is stopped and then moved in the opposing direction into a clamped position (SP). In this connection, the clamping tool 385a, 385b is displaced sufficiently that the actual value of the clamping force reaches a desired value of the clamping force, which is lower relative to the setting force and is designed such that the parts 381 to 383 are supported against one another sufficiently and do not fall apart. If the actual value of the clamping force now lies within the above-described lower and upper limits 315, 316 of the clamping force, the clearance 384 is set to zero. The parts 381 to 383 are in this state and/or in the clamped position (SP) substantially unloaded and without force.

If, however, a clearance 384 of a few hundredths of a millimetre, for example 0.05 mm, is intended to be set, from the first and/or second clamping tool 385a; 385b the actual value of the clamping force and the displacement and clamping path is continuously detected and transmitted to the evaluation unit. If the actual value of the clamping force reaches a pre-determined setting force, the moving clamping tool 385a, 385b is stopped and then moved in the opposing direction into a clamped position (SP). In this case, the clamping tool 385a, 385b is displaced such that the actual value of the clamping force reaches a desired value of the clamping force which is smaller than the setting force and is designed such that the parts 381 to 383 are supported against one another sufficiently but are substantially unloaded. Subsequently, the desired clearance 384 is set. To this end, if the desired value of the clamping force has been reached, the actual value of the displacement and clamping path is detected. The first and/or second clamping tool 385a, 385b is now displaced into the clamped position (SP) by a displacement and clamping path corresponding to the clearance 384 and the parts 381, 382 are moved apart. If the desired value of the displacement and clamping path is reached, the first and/or second clamping tool 385a; 385b is held in the clamped position (SP) until the parts 382, 383 are joined together.

The last embodiments have proved advantageous, as for production reasons, the parts 381 to 383 generally have slight surface roughness and by the mutual pressing of the parts 381 to 383 the surface portions pressed together are plastically deformed, as is known to the person skilled in the art by the term "creep". In this manner, also a clearance 384 of zero millimetres may be accurately set and also maintained in the operation of the articulated connection.

As not shown further, there is also the possibility that for setting a dimension a spacer, for example a feeler gauge, is used between two parts. Said spacer is arranged according to the embodiment in FIG. 30 between the parts 381, 382 over the period of the clamping and joining process and has a substantially greater strength relative to the material of the parts 381, 382. According to this embodiment, initially in the preparation position the parts 381, 382 are aligned in their orientation relative to one another and, for example, the part 382 is held fixed and the spacer inserted between the parts 381, 382. Subsequently, at least one of the clamping tools 386a, 386b is pressed against the part 381 and/or part 383, and the part 381 moved in the direction of the part 383 until reaching the level of the spacer corresponding to the dimension 384. At the same time, the clamping force increases. The actual value of the clamping force and the displacement and clamping path are continuously detected and transmitted to the evaluation unit 38. If the actual value of the clamping force or of the displacement and clamping path reaches the desired value of the clamping force or of the displacement and clamping path, the moving clamping tool 385a is stopped, the parts joined 381, 383 and then the spacer removed and the sub-assembly transported away from the assembly station. In this manner, the dimension 384 may be accurately set.

In FIG. 31 a further embodiment of a sub-assembly consisting of three parts 391 to 393 is shown, which are of tubular configuration. The parts 392, 393 are pushed onto the part 391 at the ends.

According to this embodiment, a size of spacing 394 is intended to be set between the front edges of the parts 392, 393 remote from one another and/or an overall length of the sub-assembly.

In the figure shown, the parts 391 to 393 are already in the preparation position between clamping tools 395a, 395b of cooperating clamping devices 396a, 396b which are moved respectively by means of drive units and/or linear drives, not shown, from the initial position (AP) into the intermediate position (ZP). Again, only one of the clamping tools 395a, 395b or both clamping tools 395a, 395b may be moved synchronously towards one another into the clamped position (SP).

Initially, the parts 392, 393 are pushed onto the part 391 at the ends and then the ends widened relative to the parts 392, 393 via a collet chuck or via internal high pressure forming. The ends thus widen plastically until they come to bear against the inner face of the parts 392, 393 on the periphery. The outer parts 392, 393 also widen at this time but only in the elastic region, so that after the unloading of the pressing force the material of the parts 392, 393 springs towards the plastically widened ends of the inner part 391, whereby a frictional connection is provided between the parts 391 to 393. As the ends of the part 391 are plastically widened, a high positional accuracy of the parts 391 to 393 is achieved. The longitudinal axes of the parts 391 to 393 are exactly aligned.

The parts 392, 393 are then pushed by means of the first and/or second clamping tool 395a, 395b onto the widened ends relative to the fixed part 391 in the preparation position in the axial direction to such an extent that the size of spacing 394 is set.

Preferably, both clamping tools 395a, 395b are respectively synchronously advanced towards one another from the intermediate position (ZP) thereof into the clamped position (SP) and thus the actual value of the displacement and clamping path is detected. If the actual value of the displacement and clamping path reaches the desired value of the displacement and clamping path, the sleeve-like parts 392, 393 are pushed into the clamped position and the spacing size 394 is set. Subsequently, the parts 392, 393 are joined to the part 391, in particular welded or bonded.

Such an assembly may, for example, be configured as an outer steering column for a steering shaft of a motor vehicle, in which bearings (not shown), such as ball bearings, are pressed into the parts 392, 393. The parts 392, 393 serve as accurate bearing receivers.

In a further embodiment, the sub-assembly forms a articulated shaft which comprises the tubular first part 391 and at the ends thereof articulated parts 392, 393. An articulated shaft not only requires an accurate spacing of the bearing axes of the articulated parts 392, 393 but the bearing axes of the articulated parts 392, 393 also have to extend vertically to the longitudinal axis of the part 391 and parallel to one another. In order to achieve this, the articulated parts 392, 393 are rotated on the tubular part 391 counter to one another such that a rotational angle and/or angular dimension between the bearing axes of the articulated parts 392, 393 of 0° is set. To this end, the articulated parts 392, 393 are respectively gripped by a clamping tool and moved into a clamped position, in which the angular size and the spacing between the bearing axes is accurately set. For setting the angular size, the actual value of the displacement path of the clamping tool corresponding to the rotational angle is continuously detected and transmitted to the evaluation unit 38. If the actual value of the displacement path reaches the desired value of the displacement path, the clamping tool is stopped in the displacement movement. Subsequently, the parts 381, 382, 383 are joined. The setting of the size of the spacing between the bearing axes takes place in the above described manner.

Figure 32:
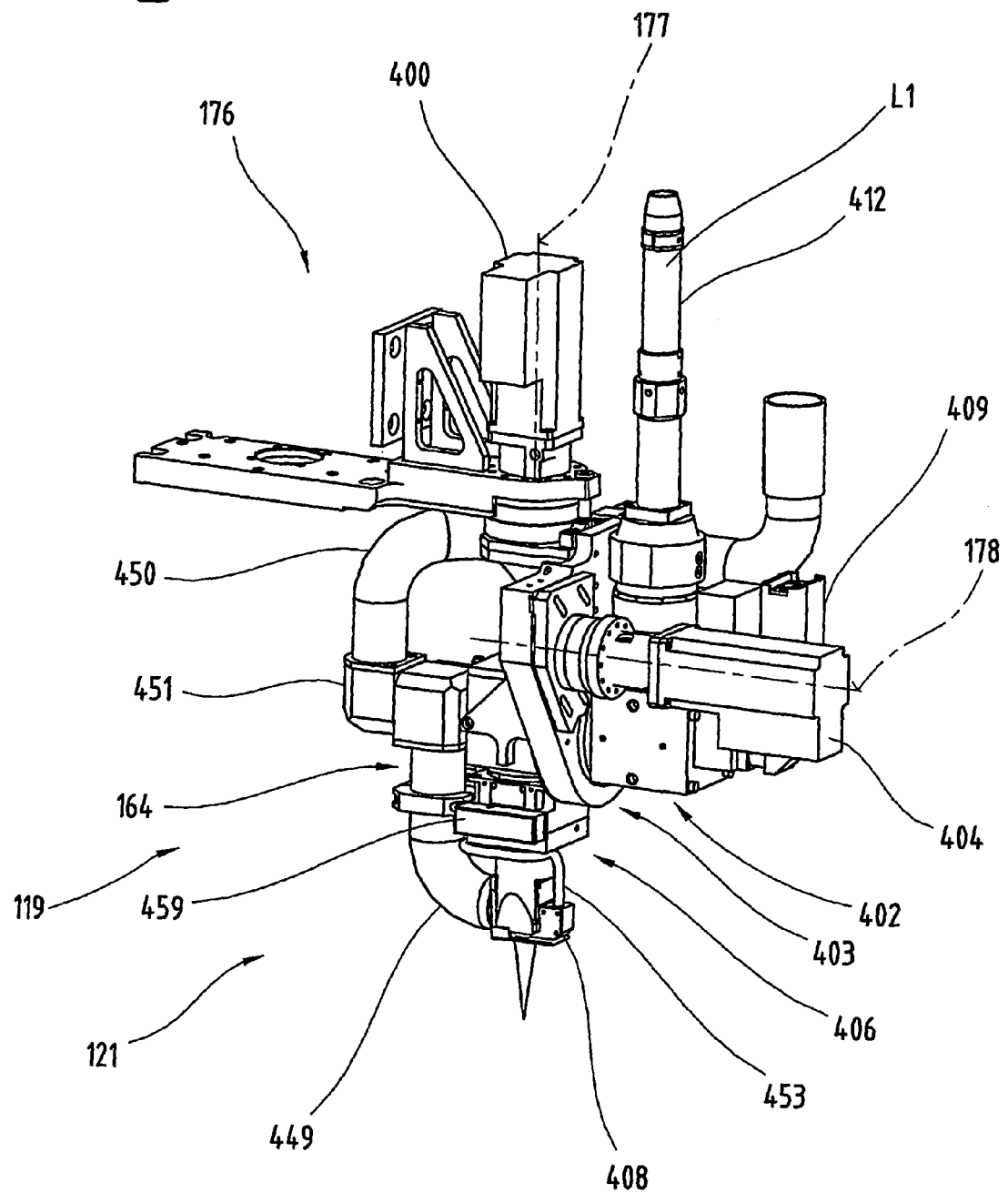
FIG. 32 shows a perspective view of a beam welding head of the welding device of the assembly station according to FIG. 10, in a considerably simplified representation.
Figure 33:
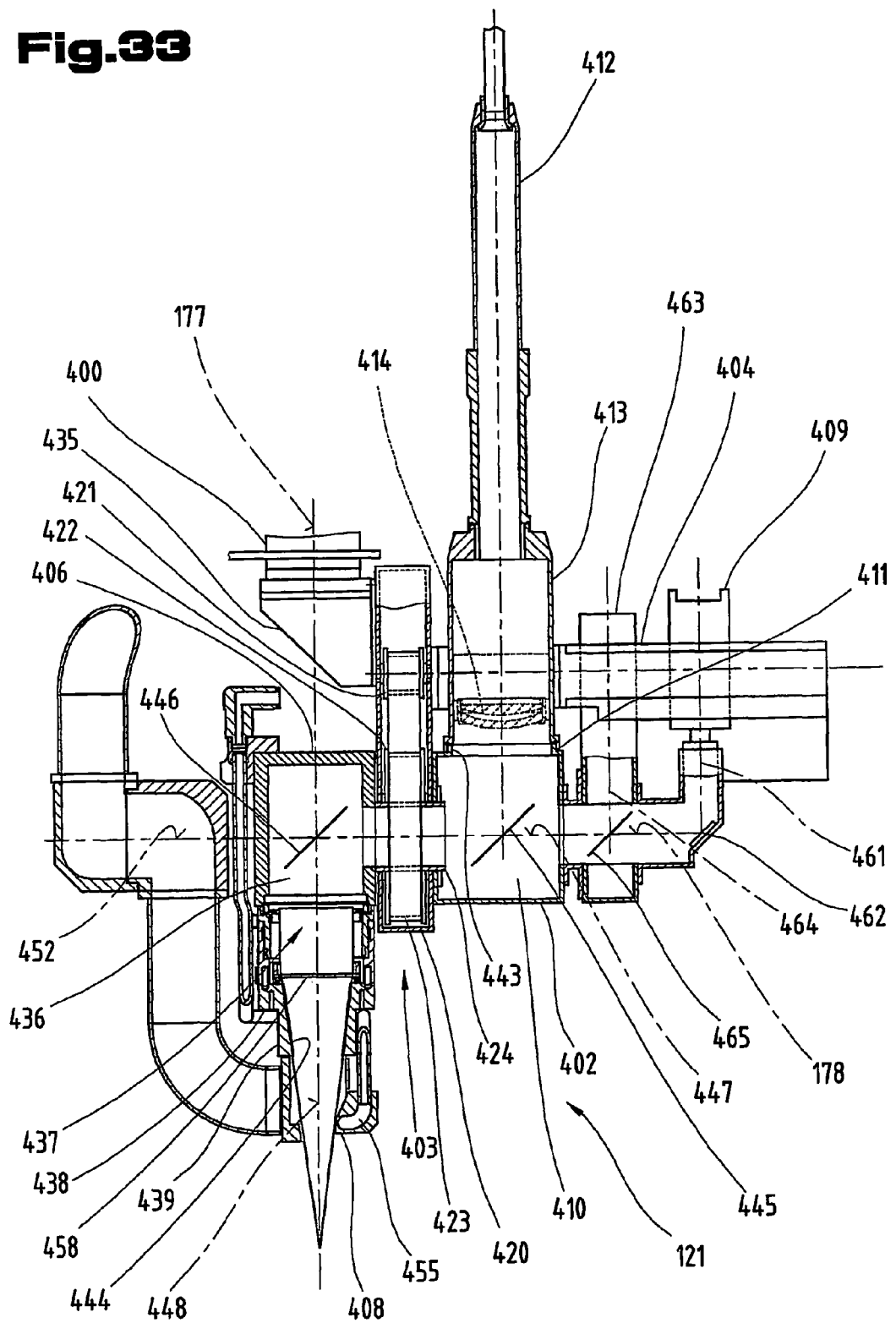
FIG. 33 shows the welding device according to FIG. 32, partially sectioned and in a considerably simplified representation.

In FIGS. 32 and 33 described together, the welding device 119 is shown for the welding station in different views. The welding device 119 comprises the drive system 156 shown in FIG. 11 and a beam welding head 121 movable by means of said drive system in a spatially positioned manner. The beam welding head 121 is additionally pivotably mounted via the actuator 400 about the vertical axis 177 on a fastening device 176 and comprises a base part 402, a drive device 403 and a beam guiding part 406 pivotable about the horizontal axis 178 via a second actuator 404 relative to the base part 402, a nozzle 408, and a monitoring member 409. The welding device 119 further comprises a suction pipe 164, a connecting lead 412, in particular an optical waveguide, as well as optionally a gas line, not shown, for a welding gas, in particular a protective gas, in order to be able to weld in a protective gas atmosphere.

The base part 402 forms according to this embodiment a housing with a chamber 410 and is provided with an optical connection coupling 411. The flexible and/or elastic connecting lead 412, in particular the optical waveguide (L1), guiding the laser radiation from the energy source 34 shown in FIG. 3, in particular the laser generator, to the beam welding head 121, is coupled via a schematically shown connection coupling 413 to this connection coupling 411. The connection coupling 413 comprises a coupling housing, in which a collimating lens 414 is arranged via which a position of the focal point of the beam cone emerging from the beam welding head 121 may be set. The connection couplings 411, 413, which are releasable from one another, form a coupling device. The longitudinal axes of the optical connection couplings 411, 413 form a common axis and extend perpendicular to the optical axis 447 of the laser radiation which is incident on the mirror 446.

As visible in the figures, the drive device 403 is expediently arranged between the base part 402 and the pivotable beam guiding part 406. The drive device 403 comprises a housing 420, which consists of a first housing part facing the beam guiding part 406, and a second housing part facing the base part 402. The drive device 403 has a traction mechanism drive, in particular a toothed belt drive, with a first drive element 421 coupled to the actuator 404, a second drive element 422 as well as a tractive means 423 connecting said drive elements in a mobile manner. The first drive element 421 comprises a first deflection wheel mounted via a drive shaft in the housing 420 and flange-mounted to the actuator 404, and the second drive element 422 comprises a second deflection wheel mounted in the housing 420 via a second drive shaft 424. The deflection wheels are connected to the drive shafts, respectively fixedly in terms of rotation. The drive shaft 424 is formed by a hollow shaft with a through-opening coaxial to the pivot axis 178 and rotatably mounted on the base part 402 with a first end, and a second end connected to the beam guiding part 460 fixedly in terms of rotation. In this manner, a driving torque is transmitted from the actuator 404 to the beam guiding part 406 and the focussed beam cone emerging from the beam welding head 121 may be positioned spatially about the pivot axis 178 by preferably 270°. The housing 420 of the drive device 403 is connected via a flange 435 to the fastening device 176 and/or the actuator 400. The base part 402 and actuator 404 are fastened to the housing 420 of the drive device 403.

The beam guiding part 406 forms a beam guiding housing with a chamber 436 and comprises a focussing device 437, which has at least one focussing lens and serves for bundling the laser radiation. The beam guiding housing has an adapter 438 and tubular extension 439, which are respectively provided with a through-opening for the bundled laser radiation, coaxial to an optical axis 448. The focussing device 437 is arranged on the beam input side on the adapter 438 in the region of the through-opening.

As further illustrated in FIG. 33, the base part 402 is provided with a through-opening which forms a beam input 443. The through-opening on the beam guiding part 406 forms a beam output 444. Between the beam input 443 and beam output 444 extends a beam path for the laser radiation. Along the beam path according to this embodiment two mirrors are arranged 445, 446 and the focussing device 437 is provided in the vicinity of the beam output 444.

Expediently, the chambers 410, 436 of the base and beam guiding parts 402, 406 are respectively provided with the mirror 444, 445 which are arranged at an angle of preferably 45° to an optical axis 447 of the laser radiation coinciding with the pivot axis 178. There is the possibility that the focussing device 437 is formed by the mirror 446, and as a result the additional focusing device may be dispensed with. According to this embodiment, the mirror 446 forms the focussing lens. The optical axis 447 of the laser beam striking the mirror 446 arranged in the beam guiding part 406 and the pivot axis 178 form a common axis. An optical axis 448 of the laser beam emitted from the focussing device 437 and/or the laser beam reflected from the mirror 446 extends at right angles to the optical axis 447.

The laser radiation coupled by the laser generator into the optical waveguide (L1; L2; L3) is collected via the collimating lens 414, radiated at right angles to the optical axis 447, deflected on the first mirror 444 by 45°, reflected parallel thereto in the direction of the pivot axis 178 onto the second mirror 446 and from there in turn deflected by 90° and focussed via the focussing device 437 of the beam welding head 121 as a beam cone onto the parts 1 to 3*b*, 3*c* to be welded, etc. The beam path is accordingly divided into three beam portions and the optical axes of the first beam portion, viewed in the direction of the laser radiation, and third beam portion extend axially parallel and the optical axis of the second beam portion at right angles thereto.

The welding device 119 is additionally provided with the suction pipe 164, which forms at least two portions 449, 450 which are connected to one another via an articulation 451. The first portion 449 extends from the region of the beam output 444 of the beam welding head 121 in the direction of the pivot axis 178 of the beam guiding part 406 and the second portion 450 from the region of the pivot axis 178 of the beam guiding part 406 in the direction of the connecting element of the connection interface 163 fastened to the gantry 154 (see FIG. 3 and FIG. 10). An articulation axis 452 of the articulation 451, the pivot axis 178 of the beam guiding part 406 and the optical axis 447 of the second beam portion of the beam path form a common axis. The first portion 449 of the suction pipe 164 is connected fixedly in terms of movement to the beam guiding part 406, in particular the extension 439 of the beam guiding housing. Via the suction pipe 164, the welding fumes produced during welding are sucked from the welding station and passed to the central ventilation system (not shown).

As described above, the welding device 119 may additionally be provided with the gas supply line. This gas supply line is formed by a tube, which forms two portions, which are connected to one another via an articulation. The first portion extends from the region of the beam output 444 of the beam welding head 121 in the direction of the pivot axis 178 of the beam guiding part 406 and the second portion from the region of the pivot axis 178 of the beam guiding part 406 in the direction of the connecting element of the connection interface 163 fastened to the gantry 154 (see FIG. 3 and FIG. 10). An articulation axis of the articulation coincides with the pivot axis 178 of the beam guiding part 406 and the optical axis 447 of the second beam portion of the beam path.

By means of the embodiment of the welding head 121 according to the invention it is now achieved that the optical waveguide (L1; L2; L3) which is sensitive to bending and/or torsional loads, but also the second portion 450 of the suction pipe 164 and possibly the second portion of the gas supply line in the assembly station, the flexible connecting leads, such as fluid or power lines, are always guided substantially vertically to the actuators 400, 404, and only moved along a circular-arc path at an angle of approximately 270°. The latter energy-supplying flexible connecting lead is connected to the actuator 404 and possibly by the interposition of the connection interface 163 to the energy source 37.

The beam welding head 121 is provided in the region of the beam output 443 with the nozzle 408 arranged to the side of the focussed welding beam. Said nozzle is fastened to the beam guiding housing of the beam guiding part 406 and via an air line 453 connected to compressed air supply equipment, not shown. The nozzle 408 produces a two-dimensional air stream, acting on the optical axis 448 of the focussing device 437 in a plane extending perpendicular, in particular an air curtain (air flow) which intersects the beam cone radiated from the beam welding head 121. This is known to the person skilled in the art by the term "crossjet" which ensures that the weld spatter produced during the welding process is kept away from the optical system, in particular the focussing device 437 and mirror 446. The nozzle 408 has a nozzle body, in which a pressure chamber 455 is formed, which is connected via a supply opening to the air supply line 453. An outlet of the pressure chamber 455 is formed as a slot, through which the compressed air is forced out at high speed onto the welding beam and/or beam cone.

Additionally, for protecting the optical system against weld spatter, a protective screen 458 is provided which is arranged as a cassette 459 in a receiving compartment in the beam guiding housing of the beam guiding part 406 in a replaceable manner.

As is further visible in FIG. 33, on the base part 402 on the housing side, the monitoring member 409, in particular a CCD camera is fastened, by which before the startup of the production system 1, the displacement path of the beam welding head 121 pre-determined by the position of the joint seams 21 to be produced, is programmed in the "teach-in" method and/or during the joining process a monitoring of the quality of the joint seams 21 to be produced is carried out along the defined joint points (as illustrated in FIG. 2) between two parts 1 to 3b, etc. to be connected together.

Thus the parts of the sub-assembly are not only checked for their dimensional stability, but also information about the quality of the joint seams, in particular weld seams, is provided. Thus a high degree of process reliability is provided.

The transmission and receiving beams 461 of the CCD camera are deflected at a mirror 462 and at the mirror 446 respectively by preferably 45° relative to the pivot axis 178 and projected by the CCD camera onto the surface of the parts to be connected together and/or the reflected light is received by the CCD camera. So that the position of the joint points in the "teach-in" method may be accurately determined, by means of an illumination source 463 a reticle, not shown further, is projected onto the surface of the parts to be connected together and the beam welding head 121 and/or the optical axis 448 accurately moved into position using the reticle and the displacement path covered thereby programmed and stored as a displacement path for the beam welding head 121. A light beam 464 radiated from the illumination source 463 is again deflected at a mirror 465 preferably by 45° relative to the pivot axis 178 and the mirror 446 and projected onto the surface of the parts.

The mirrors 445, 465 are formed by so-called semi- and/or partially transparent mirrors, so that the transmission and/or receiving beam 461 may pass through the mirrors 445, 465 and the light beam 464 through the mirror 445.

Finally, reference is also made to the fact that from the desired-actual value-comparison of the clamping force and/or of the displacement and/or clamping path, the dimensions, in particular the length of each part, may also be evaluated.

Equally well, alternatively to a linear drive comprising a threaded spindle and spindle nut for the clamping units, feed axes or the drive system for the welding device, a linear motor, in particular an asynchronous and/or synchronous linear motor may be used. Linear motors permit the direct production of linear movement without gear mechanisms. They consist of a primary part through which current flows (comparable with the stator of a rotation motor) and a reaction part, which is the secondary part (comparable with the rotor of a rotation motor). Expediently, the primary part is arranged fixedly and, for example, fastened to the support structure of the assembly station, whilst the secondary part is arranged on the carriage of the drive units displaceably guided in a manner which is substantially free of clearance. For driving the carriage in a contactless manner, for example, a long-stator synchronous motor is provided. In this connection, the drive power is supplied to the primary part located in the displacement path, whilst the carriage only contains the excitation element. The excitation element is arranged such that the carriage is carried by the forces of the magnetic field. According to this embodiment, the current of the primary part flowed through by current is detected and in the evaluation unit 38 the actual value of the displacement and/or clamping path and/or the clamping force is determined therefrom.

The exemplary embodiments show possible variants, and it should be pointed out at this stage that the invention is not restricted to the variants thereof specifically illustrated here, but instead the individual variants may be used in various different possible combinations, which possibilities will be within the reach of the person skilled in this technical field in conjunction with the technical teaching of the invention. All conceivable variants which can possibly be achieved by combining individual details from the illustrated and described variants are included within the scope of the invention.

For the sake of procedure, reference is finally made to the fact that for better understanding of the production system, the clamping systems and sub-assemblies, said systems and sub-assemblies and/or the components thereof have been shown partially not to scale and/or at an enlarged scale and/or reduced scale.

Primarily, the individual embodiments shown in FIGS. 1 to 33 may form the subject of original solutions according to the invention. According to the invention, these relevant objects and solutions may be derived from the detailed description of these figures.

LIST OF REFERENCE NUMERALS

1 Part
2 Part
3a,b Part
5 Base
6 Limb
7 Positioning opening
8 Support extension
9 Support surface
10 Bearing surface
11 Positioning opening
12 Bearing surface
15 Support plate
16 Sleeve
17a, b Joint point
18a, b, c Joint point
19a, b Joint point
21 Joint seam
22 Bearing surface
23 Bearing surface
24a, b Butt joint
25 Bearing surface
26a, b, c Butt joint
27a, b Joint gap
31 Production system
32 Production installation
33 Production installation
34 Energy source
36 Control device
37 Energy source
38 Evaluation unit
39 Comparison module
40 Evaluation module
41 Connection lead
42 Transport system
43 Assembly station
44 Transfer region
45 Forwarding region
46 Transport device
47a, b Guide track
48 Parts transport carrier
48' Parts transport carrier
49 Parts storage unit
50 Parts storage unit
51 Receiver
52 Transport chain
54 Deflector station
55 Housing part
56 Front plate
57 Coupling device
58 Support device
59 Contact surface
60 Plane of symmetry
61 Fastening device
62 Side wall
63 Vertical guide track
64 Lateral guide track
65 Arrow
66 Support roller
67 Pressure roller
68 Side surface
69 Side surface
70 Guide roller
71 Link pin
72 Coupling extension
73 Coupling receiver
74 Mounting plate
75 Support column
76 Support plate
77a, b Locating clip
78 Guide projection
79 Base
80 Positioning means
81 Lateral guide surface
82a, b Support surface
83 Feed device
84 Feed device
85 Base frame
86 Arrow
87 Auxiliary parts transport carrier
90 Guide track
91 Tractive means
92 Drive motor
93 Chassis
94 Running wheel
95 Receiver
96a, b Locating clip
97 Guide projection
98 Base
99 Positioning means
100 Lateral guide surfaces
101a, b Support surface
102 Stopping device
103a, b Stop element
104 Transfer position
104' Transfer position
105 Handling system
106 Receiving position
106' Receiving position
107 Handling system
110 Holding position
111 Clamping system
112a, b Feed axis
114 Clamping unit
115 Clamping unit
116 Clamping unit
119 Welding device
121 Beam welding head
122 Sub-assembly
123 Handling system
124 Imperfect parts box 125 End position
126 Second receiving region
127 Second transport system
128 Second assembly station
129 Second forwarding region
130 Second transport device
131a, b Receiver
132 Device
133 Device
134 Container
135 Parts storage unit
136 Transfer position
136' Transfer position
137 Handling system
138 Receiving position
138' Receiving position
139 Handling system
140 Arrow
142 Holding position
143 Clamping system
144 Clamping unit
145 Welding device
146a, b Beam welding device
147 Sub-assembly
148 Handling system
149 Imperfect parts box
150 End position
151 Conveying device
152 Post
153 Gantry
154 Gantry
155 Bracket
156 Drive system
157 Mounting plate
158 Support profile
159 Support bracket
160 Support profile
161 Support plate
162 Recess
163 Connection interface
164 Suction pipe
170a, b Linear drive
171a, b Electric motor
172 Linear drive
173 Electric motor
174 Linear drive
175 Electric motor
176 Fastening device
177 Pivot axis
178 Pivot axis
180a, b Drive unit
181a, b Drive unit
182a, b Drive unit
184a, b Linear drive
185a, b Linear drive
186a, b Linear drive
187 Set-up platform
188a, b Electric motor
189a, b Electric motor
190a, b Electric motor
191a, b Carriage
192a, b Carriage
193a, b Carriage
194a, b Clamping device
195a, b Clamping device
196a, b Linear drive
197a, b Electric motor
198a, b Carriage
200a, b Vertical positioning device
201a, b Clamping tool
202a, b Support frame
203a, b Pressing device
204a, b Abutment
205a, b Mounting plate
206a, b Support wall
207a, b Support wall
208a, b Support wall
209a, b Mounting plate
210a, b Support plate
211a, b Cantilever arm
212a, b Clamping jaw
213a, b Support element
214a, b Lifting device
215a, b Stop bevel
216a, b Support surface
217a, b Stop surface
218a, b Edge
219 Transport position
219' Transport position
220a, b Lifting device
221a, b Slider element
222a, b Guide member
223a, b Guide track
224a, b Actuator
225a, b Carriage
226a, b Transfer element
227a, b Stop element
228a, b Actuating device
229a, b Actuating device
230a, b Pressing element
231a, b Pressing element
232a, b Housing part
233a, b Side wall
234a, b Base
235a, b Cover
236a, b Guide surface
237a, b Horizontal slider
238a, b Horizontal slider
239a, b Guide surface
240a, b Guide surface
241a, b Vertical slider
242 Sliding arrangement
242' Sliding arrangement
243 Sliding element
243' Sliding element
244 Sliding track
244' Sliding track
245 Through-opening
245' Through-opening
246a, b Coupling element
247a, b Drive motor
248a, b Vertical slider
249a, b Coupling element
250a, b Mounting bracket
251a, b Drive motor
252a, b Clamping jaw
254a, b Support frame
255a, b Clamping tool
256a, b Mounting plate
257a, b Support wall
258a, b Support wall
259a, b Support plate
260a, b Clamping device
261a, b Support frame 262a, b Clamping tool
263 Fastening plate
264a, b Mounting plate
265a, b Support wall
266 Width
267 Length
268 Width
269a, b Stop surface
270 Preparation position
270' Preparation position
271 Clamping force
272 Clamped position
273 Clamping force
274 Clamped position
277a, b Stop surface
278 Clamping force
280a, b Clamping device
281a, b Drive unit
282a, b Clamping tool
283a, b Support frame
284a, b Electric motor
285a, b Linear drive
286 Set-up platform
287a, b Carriage
288a, b Vertical positioning device
289a, b Actuating device
290a, b Mounting plate
291a, b Side wall
292a, b Support wall
293a, b Lifting device
294 Transport position
294' Transport position
295a, b Support element
296a, b Stop bevel
297a, b Support surface
298 Clamping segment
299a, b Actuator
300a, b Stop surface
301 Pressing device
302 Preparation position
302' Preparation position
304a, b, c Pressing element
305 Width
306 Length
307 Clamping force
308 Clamped position
312 Clamped position
313 Clamped position
315 Lower limit
316 Upper limit
317 Lower limit
318 Upper limit
320 Clamping force path
321 Speed profile
322 Frictional force
323 Double arrow
330 Part
331 Part
332 Indentation
333 Indentation
334a, b Clamping tool
335a, b Clamping device
336 Clamping unit
337a, b Drive unit
338 Clamping force
339 Beam welding head
340 Part
341 Part
342 Part
343 Limb
344 Limb
345 Base
346 Base
347a, b Joint point
348 Front edge
349 Front edge
350 Assembly station
351 Clamping system
352 Positioning opening
353 Lifting device
354a, b Clamping tool
355a, b Clamping device
356a, b Clamping device
357 Clamping unit
358 Clamping unit
359a, b Stop surface
360 Clamping force
361a, b Stop surface
362 Clamped position
364 Clamping force
369a, b Clamping tool
370a, b Clamping device
371 Clamping unit
372a, b Clamping tool
373a, b Support frame
374a, b Carriage
375a, b Drive unit
376 Fastening plate
377 Carriage
378 Feed axis
379 Electric motor
381 Part
382 Part
383 Part
384 Clearance
385a, b Clamping tool
386a, b Clamping device
391 Part
392 Part
393 Part
394 Spacing size
395a, b Clamping device
396a, b Clamping device
400 Actuator
402 Base part
403 Drive device
404 Actuator
406 Beam guiding part
408 Nozzle
409 Monitoring member
410 Chamber
411 Connection coupling
412 Connection lead
413 Connection coupling
414 Collimating lens
420 Housing
421 Drive element
422 Drive element
423 Tractive means
424 Drive shaft
435 Flange
436 Chamber
437 Focusing device
438 Adapter 439 Extension
443 Beam input
444 Beam output
445 Mirror
446 Mirror
447 Optical axis
448 Optical axis
449 Portion
450 Portion
451 Articulation
452 Articulation axis
453 Air supply line
455 Pressure chamber
458 Protective glass
459 Cassette
461 Transmission and receiving beam
462 Mirror
463 Illumination source
464 Light beam
465 Mirror

The invention claimed is:

1. A production method for producing a sub-assembly consisting of a plurality of parts with a production system comprising a plurality of production installations arranged in series relative to one another, in a plurality of successive steps in which in the first production installation the parts received from a first parts delivery site in a first receiving region are conveyed along a first transport device to a first beam welding station with a first beam welding head, positioned relative to one another therein and clamped via a clamping system and welded together via beam welding, then conveyed to a first forwarding region from which a welded sub-assembly is transferred to the second production installation, in which at least one further part of the plurality of parts is received from a second parts delivery site and the previously welded sub-assembly is conveyed along a second transport device to a second beam welding station with a second beam welding head, positioned therein relative to one another and via a clamping system the further part of the plurality of parts and the previously welded sub-assembly are clamped and welded together via beam welding, after which another welded sub-assembly is conveyed to a further forwarding region, wherein welding radiation is supplied alternately from an energy source to the first and second beam welding heads of the first and second beam welding station and wherein within a first time interval, the parts of the plurality of parts are transported to the first beam welding station and the previously welded sub-assembly of the previous cycle is transported away from the beam welding station and during which in the second beam welding station the previously welded sub-assembly previously welded in the first production installation and a further part of the plurality of parts supplied from the second parts delivery site is clamped and welded to form the another welded sub-assembly and wherein within a second time interval in the first production installation parts of the plurality of parts are supplied from the first parts delivery site, clamped and welded to form the previously welded sub-assembly and during which in the second production installation the previously welded sub-assembly previously welded in the first production installation is transported to the second beam welding station of the second production installation and the another welded sub-assembly of the previous cycle welded in the second beam welding station of the second production installation is transported away to the second forwarding region.

2. The production method according to claim 1, wherein the parts are conveyed via one of a plurality of parts transport carriers of the first transport devices from the first receiving region to the first beam welding station and wherein a parts transport carrier with the parts is held in the first beam welding station in a holding position, whereupon the parts are moved in the first beam welding station via at least one vertical positioning device together out of a transport position on the parts transport carrier of the first transport device into a preparation position, in particular lifted, then positioned and clamped relative to one another and subsequently welded to form the previously welded sub-assembly, whereupon the previously welded sub-assembly is again deposited on one of a plurality of parts transport carriers and thereby transported away from the first beam welding station to the first forwarding region.

3. The production method according to claim 1, wherein the parts are conveyed separately from one another on one of the respective parts transport carrier of the first transport device from the first receiving region to the first beam welding station and wherein a first parts transport carrier with a first part of the plurality of parts is held in the first beam welding station in the holding position, whereupon the first part of the plurality of parts in the first beam welding station is moved via at least one vertical positioning device from the transport position on the first parts transport carrier of the first transport device into a preparation position, in particular lifted, whereupon the first parts transport carrier with a second part of the plurality of parts is held in the first beam welding station in the holding position, whereupon the second part of the plurality of parts in the first beam welding station is moved via at least one further vertical positioning device from another transport position on the first parts transport carrier of the first transport device into another preparation position, in particular lifted, and subsequently the parts are positioned and clamped relative to one another and then welded to form the previously welded sub-assembly, whereupon the previously welded sub-assembly is again deposited on one of a plurality of parts transport carriers, and transported thereby away from the first beam welding station to the first forwarding region.

4. The production method according to claim 1, wherein the previously welded sub-assembly and the further part of the plurality of parts supplied from the second parts delivery site, are deposited on one of the plurality of parts transport carriers of the second transport devices and conveyed from a second receiving region to the second beam welding station and wherein the parts transport carrier with the previously welded sub-assembly and the further part of the plurality of parts is stopped in the second beam welding station in a holding position, whereupon the previously welded sub-assembly and the further part of the plurality of parts in the second beam welding station are moved via the at least one vertical positioning device together from the transport position on the parts transport carrier of the second transport device into another preparation position, in particular lifted, then positioned and clamped relative to one another and then welded to form the another welded sub-assembly, whereupon the another welded sub-assembly is again deposited on one of the plurality of parts transport carriers and transported thereby away from the second beam welding station to the second forwarding region.

5. The production method according to claim 1, wherein the previously welded sub-assembly and the further part of the plurality of parts are conveyed separately from one another on one respective parts transport carrier of the second transport device from the second receiving region to the second beam welding station, and wherein a first parts transport carrier is stopped with the previously welded sub-assembly in the second beam welding station in the holding position, whereupon the previously welded sub-assembly in the second beam welding station is moved via at least one vertical positioning device from the transport position on the parts transport carrier of the transport device into another preparation position, in particular lifted, whereupon a second parts transport carrier with the further part of the plurality of parts is stopped in the second beam welding station in the holding position, whereupon the further part of the plurality of parts in the second welding station is moved via at least one further vertical positioning device from a transport position on the second parts transport carrier of the transport device into another preparation position, in particular lifted and subsequently the previously welded sub-assembly and the further part of the plurality of parts are positioned and clamped relative to one another and then welded to form the another welded sub-assembly, whereupon the another welded sub-assembly is deposited again on one of the plurality of parts transport carriers and transported thereby away from the second beam welding station to the second forwarding region.

6. The production method according to claim 2, wherein a first part of the plurality of parts in the first beam welding station is received in the preparation position between two clamping tools of a first clamping unit comprising the first vertical positioning device and then positioned in a pre-determined clamping position in the first beam welding station and fixed therein.

7. The production method according to claim 2, wherein a second part of the plurality of parts is received in the first beam welding station in the preparation position between two clamping tools of a second clamping unit comprising a further vertical positioning device and then positioned relative to a first part of the plurality of parts in a clamping position, pre-determined in the first beam welding station, and fixed therein.

8. The production method according to claim 6, wherein a second part of the plurality of parts is received in the first beam welding station in the preparation position between two clamping tools of a second clamping unit and then positioned relative to the first part of the plurality of parts in a clamping position, pre-determined in the first beam welding station, and fixed therein, and wherein each of the first part of the plurality of parts and second part of the plurality of parts is clamped via the clamping tools of each of the first and second clamping units, a first clamping tool of each of the clamping tools is displaceable between an initial position releasing the part of the plurality of parts and a clamping position fixing the part of the plurality of parts and a second clamping tool of each of the clamping tools is fixed in its position, and each of the parts of the plurality of parts is clamped via the first clamping tool against the second clamping tool.

9. The production method according to claim 8, wherein initially both clamping tools are moved from the initial position into an intermediate position and therefrom at least one of the two clamping tools is moved into the clamping position, the one clamping tool during the advancing movement of the other clamping tool remaining in the intermediate position, so that the part of the plurality of parts is clamped via the displaceable clamping tool against the clamping tool remaining in the intermediate position.

10. The production method according to claim 6, wherein a second part of the plurality of parts is received in the first beam welding station in the preparation position between two clamping tools of a second clamping unit and then positioned relative to the first part of the plurality of parts in a clamping position, pre-determined in the first beam welding station, and fixed therein, and wherein initially both clamping tools of the first and/or second clamping unit are displaced from the initial position releasing the part of the plurality of parts into an intermediate position and afterwards from the intermediate position in the same direction and synchronously to one another in such a way that the part of the plurality of parts is centrally clamped between the clamping tools and relative to the first beam welding station.

11. The production method according to claim 10, wherein the intermediate position is defined between the initial and clamping positions of the clamping tools and the part of the plurality of parts is gripped therein, and wherein the clamping tools of the first and/or second clamping unit are accelerated in rapid motion from the initial position until just in front of the intermediate position and decelerated as far as the intermediate position, then moved starting from the intermediate position at reduced displacement speed relative to rapid motion until a stop surface of the clamping tools bears against the part of the plurality of parts, whereupon the displacement speed of the clamping tools moving into the clamping position is controlled depending on the alteration of a clamping force.

12. The production method according to claim 9, wherein the intermediate position is defined between the initial and clamping positions of the clamping tool and the part of the plurality of parts is gripped therein, and wherein the clamping tool(s) of the first and/or second clamping unit are accelerated in rapid motion from the initial position until just in front of the intermediate position and decelerated as far as the intermediate position, then moved starting from the intermediate position at reduced displacement speed relative to rapid motion until a stop surface of the clamping tool(s) bears against the part of the plurality the clamping tool bears against the part of the plurality of parts, whereupon the displacement speed of the clamping tool moving into the clamping position is controlled depending on the alteration of a clamping force.

13. The production method according to claim 1, wherein the parts transport carriers of the transport device are moved away along a guide track arranged on the base frame of the transport device between the parts delivery site and the holding position in the beam welding station in a clocked manner.

14. The production method according to claim 1, wherein the parts transport carriers are guided along a guide track arranged on the base frame of the transport device and via at least one feed drive are moved away along the guide track between the parts delivery site and the holding position in the beam welding station, independently of one another.

15. The production method according to claim 1, wherein the parts of the plurality of parts joined to form the sub-assembly are again deposited on the parts transport carrier remaining in the holding position during the duration of the welding process, then transported to a further processing station, in particular a further beam welding station, or the forwarding region for the sub-assembly.

16. The production method according to claim 2, wherein the parts of the plurality of parts joined to form the sub-assembly are deposited on a subsequent parts transport carrier moving into the holding position during the duration of the welding process, then transported to a further processing station, in particular the further beam welding station, or the forwarding region for the sub-assembly.

17. The production method according to claim 1, wherein the time intervals are in succession and/or wherein within the first time interval, a welding radiation is supplied from the energy source to at least one beam welding head of the second beam welding station and within a second time interval to at least one beam welding head of the first beam welding station.

18. The production method according to claim 1, wherein a time duration for the positioning and clamping process of the parts of the plurality of parts is shorter than a time duration for the positioning of the beam welding head into a start position for welding or corresponds to the time duration for positioning the beam welding head into a start position for welding, and wherein during the positioning and clamping process of the parts of the plurality of parts the beam welding head is moved into the start position.

19. A production system for carrying out the production method according to claim 1, comprising a plurality of production installations arranged in series with one another and controllable by a control device, of which the first production installation comprises:

the first transport device extending between the first receiving region for the parts of the plurality of parts and the first forwarding region for the previously welded sub-assembly joined from the parts of the plurality of parts, the first transport device having parts transport carriers for transporting the parts and the previously welded sub-assembly, the first parts delivery site arranged in the receiving region for the parts of the plurality of parts as well as a first beam welding station arranged between the first receiving and forwarding regions in the vicinity of the first transport device, the first beam welding station having the clamping system for the parts of the plurality of parts and the first beam welding head supplied by the energy source for joining the parts of the plurality of parts to form the previously welded sub-assembly, and of which the second production installation comprises:

the second transport device extending between the second receiving region for at least one further part of the plurality of parts and the previously welded sub-assembly and the second forwarding region for the another welded sub-assembly welded from the further part of the plurality of parts and the previously welded sub-assembly, the second transport device having parts transport carriers for transporting the further parts of the plurality of parts, the previously welded and the another welded sub-assemblies, the second parts delivery site arranged in the receiving region for the further parts of the plurality of parts and the second beam welding station arranged between the second receiving and forwarding regions in the vicinity of the second transport device, the second beam welding station having the clamping system for the previously welded sub-assembly and the further part of the plurality of parts and the second beam welding head supplied by the energy source for joining the previously welded sub-assembly and the further part of the plurality of parts to form the previously welded sub-assembly, wherein the beam welding heads of the first and second beam welding stations may be connected alternately to the energy source and wherein the feed drives for the parts transport carriers of the first and second transport devices and drive units of the first and second clamping systems are controlled alternately.

20. The production system according to claim 19, wherein the beam welding station of the first and/or second production installation is arranged between the receiving region and forwarding region and comprises:

the clamping system for the parts of the plurality of parts and at least one vertical positioning device, both the clamping system and positioning device are arranged in the vicinity of a transport path of the transport device, the at least one vertical positioning device having a lifting device with the support element lifting or lowering the parts of the plurality of parts together between the transport position of the parts of the plurality of parts located on the parts transport carrier and the preparation position of the parts of the plurality of parts located above or below relative thereto.

21. The production system according to claim 19, wherein the beam welding station of the first and/or second production installation comprises two vertical positioning devices arranged in the vicinity of the transport path of the transport device and formed separately from one another and opposing one another, the vertical positioning devices respectively forming the lifting device and comprising support elements synchronous with one another and lifting or lowering the parts of the plurality of parts together between the transport position of the parts of the plurality of parts located on the parts transport carrier and the preparation position of the parts of the plurality of parts located preferably above or below.

22. The production system according to claim 20, wherein the lifting device of the vertical positioning device comprises an actuator, to which the support element is coupled, moving the plurality of parts vertically between the transport position and the preparation position.

23. The production system according to claim 20, wherein the support element forms a stop bevel extending at an angle downwards in the direction of the transport path of the transport device, a horizontal support surface for a part of the plurality of parts to be positioned thereon and possibly a projecting stop surface.

24. The production system according to claim 19, wherein the clamping system comprises the first clamping unit for the first part of the plurality of parts with at least two cooperating clamping devices.

25. The production system according to claim 24, wherein the clamping devices of the clamping unit are arranged on both sides of, or below and above, the transport path of the transport device.

26. The production system according to claim 20, wherein the clamping devices of the first clamping unit respectively comprise the lifting device, an electronically controlled linear drive, as well as the clamping tool, wherein the clamping tool is displaceable via the linear drive in the horizontal plane between an initial position releasing the part of the plurality of parts and the clamping position clamping the part of the plurality of parts.

27. The production system according to claim 20, wherein the support element of the lifting device is formed by the clamping tool of the clamping devices.

28. The production system according to claim 26, wherein the lifting device and the clamping tool of the clamping devices are mounted on a carriage of the linear drive which is displaceable via an electric motor exclusively in a horizontal plane.

29. The production system according to claim 20, wherein the clamping devices of the first clamping unit respectively comprise a pressing device for fixing the first part of the plurality of parts in the clamping position, wherein the pressing device is provided with at least one pressing element displaceable between a resting position and a pressing position, in the pressing position the first part of the plurality of parts being pressed via the pressing element against the support element.

30. The production system according to claim 19, wherein the clamping system comprises the second clamping unit for the further part of the plurality of parts and arranged in the vicinity of the transport path of the transport device, wherein the second clamping unit forms at least two cooperating clamping devices.

31. The production system according to claim 30, wherein the clamping devices of the second clamping unit are arranged on both sides of, or below and above, the transport paths of the transport device.

32. The production system according to claim 30, wherein the clamping devices of the second clamping unit respectively comprise an electronically controlled linear drive as well as a clamping tool, wherein the clamping tool is displaceable via the linear drive in a horizontal plane between the initial position releasing the part of the plurality of parts and the clamping position clamping the part of the plurality of parts.

33. The production system according to claim 32, wherein the clamping tool of the second clamping devices is mounted on an another carriage of the linear drive which is displaceable via an another electric motor exclusively in a horizontal plane.

34. The production system according to claim 19, wherein the beam welding station of the first and/or second production installation comprises a second vertical positioning device arranged in the vicinity of the transport path of the transport device and having a second lifting device with the support element lifting or lowering the further part of the plurality of parts between the transport position of the part of the plurality of parts located on the parts transport carrier and the preparation position of the part of the plurality of parts located above or below relative thereto.

35. The production system according to claim 19, wherein the beam welding station of the first and/or second production installation comprises two vertical positioning devices arranged in the vicinity of the transport path of the transport device and opposing one another in pairs and configured separately from one another, the vertical positioning devices respectively forming the second lifting device and comprising support elements synchronous with one another and lifting or lowering the further part of the plurality of parts between the transport position located on the parts transport carrier and the preparation position of the further part of the plurality of parts located preferably above or below.

36. The production system according to claim 34, wherein the lifting device of the second vertical positioning device comprises an actuator, to which the support element is coupled, moving the further part of the plurality of parts vertically between the transport position and the preparation position.

37. The production system according to claim 34, wherein the support element forms a stop bevel for a part of the plurality of parts to be positioned thereon extending at an angle downwards in the direction of the transport path of the transport device.

38. The production system according to claim 24, wherein the clamping devices of the first clamping unit respectively comprises the second lifting device, the support element of the second lifting device being formed by a vertically displaceable pressing element of the pressing device moving the further part of the plurality of parts into the preparation position and fixing the part of the plurality of parts in the clamping position.

39. The production system according to claim 19, wherein the clamping system comprises a third clamping unit for the parts of the plurality of parts with at least two cooperating clamping devices.

40. The production system according to claim 39, wherein the clamping devices of the third clamping unit are arranged in the direction of the transport path of the transport device in succession or on both sides of the transport path of the transport device.

41. The production system according to claim 39, wherein the clamping devices of the third clamping unit respectively comprise an electronically controlled linear drive and a clamping tool, wherein the clamping tool is displaceable via the linear drive in a horizontal plane between an initial position releasing the parts of the plurality of parts and a clamping position clamping the parts of the plurality of parts to one another.

42. The production system according to claim 41, wherein the clamping tool of the third clamping devices is mounted on the carriage of the linear drive which is displaceable via the electric motor exclusively in a horizontal plane.

43. The production system according to claim 30, wherein the clamping devices of the second clamping unit and the second vertical positioning devices are constructed on displaceable carriages of the first clamping unit.

44. A method for producing a joint between parts in a welding station of a manufacturing unit, in which a first part is moved into a position of readiness between cooperating first and second clamping tools of a first clamping unit, and then is clamped via at least the first clamping tool of the first clamping unit, which is adjustable from an initial position releasing the first part into a clamping position clamping the first part, and a second part is moved into the position of readiness between cooperating first and second clamping tools of a second clamping unit and then is clamped via at least the first clamping tool of the second clamping unit, which is adjustable from an initial position releasing the second part into a clamping position clamping the second part, and the parts are then joined together at least in sections along a joining point disposed between the parts, wherein a movement and clamping path between the initial and clamping position of the first clamping tool of each clamping unit, which is adjustable via an electronically controlled drive unit and/or a clamping force of the first clamping tool on a corresponding part of each clamping unit on the corresponding part of each clamping unit is recorded as an actual value and is sent to an electronic evaluation unit, the electronic evaluation unit then compares for each clamping unit the desired and actual values of the clamping force on the corresponding part and/or the movement and clamping path of the adjustable clamping tool, and wherein the parts are joined together, when in the clamping position of each part the actual value of the clamping force on the corresponding part by the first clamping tool of each clamping unit and/or the actual value of the movement and clamping path of the first clamping tool of each clamping unit corresponds to the desired value of the clamping force on the corresponding part and/or the movement and clamping path of each clamping unit.

45. The method according to claim 44, wherein one of the first and second parts is clamped via the first clamping tool of the corresponding first or second clamping unit and a fixedly arranged further clamping tool.

46. The method according to claim 44, wherein initially both clamping tools of each of the first and second clamping units are moved from the initial position into an intermediate position and at least the first clamping tool is moved therefrom into the clamping position, the second clamping tool remaining in the intermediate position during the advancing movement of the first clamping tool so that one of the first and second parts via the first clamping tool is clamped against the second clamping tool remaining in the intermediate position.

47. The method according to claim 44, wherein initially both clamping tools of each of the first and second clamping units are displaced from the initial position into an intermediate position and afterwards from the intermediate position in the same direction and synchronously to one another in such a way that one of the first and second parts is centrally clamped between the clamping tools and relative to an assembly station.

48. The method according to claim 46, wherein the intermediate position is defined between the initial and clamping positions of the first clamping tool and the one of the first and second parts is gripped therein and wherein the first clamping tool is accelerated in rapid motion from the initial position to just before the intermediate position and decelerated up to the intermediate position, then starting from the intermediate position, moved at reduced displacement speed relative to rapid motion, until a stop surface of the first clamping tool bears against the one of the first and second parts, whereupon the displacement speed of the first clamping tool moving into the clamping position, is controlled depending on the alteration of the clamping force.

49. The method according to claim 46, wherein the displacement speed of the clamping tool from the intermediate position to the clamping position is set depending on the alteration of the clamping force during the clamping process.

50. The method according to claim 48, wherein the clamping tool is briefly stooped in the intermediate position.

51. The method according to claim 47, wherein the intermediate position is defined between the initial and clamping positions of the clamping tools and the one of the first and second parts is gripped therein and wherein the clamping tools are accelerated in rapid motion from the initial position to just before the intermediate position and decelerated up to the intermediate position, then starting from the intermediate position, moved at reduced displacement speed relative to rapid motion, until a stop surface of the clamping tools bears against the one of the first and second parts, whereupon the displacement speed of the clamping tools moving into the clamping position, is controlled depending on the alteration of the clamping force.

52. The method according to claim 44, wherein the desired value for the clamping force of the first clamping tool on the one of the first and second parts is defined by a tolerance range with a lower limit and an upper limit and the desired value for the movement and clamping path to be covered by the first clamping tool is defined by a tolerance range with a lower limit and an upper limit for each clamping unit, and wherein the first clamping tool is stopped in its clamping movement and the part is evaluated to be a good part, if the actual value of the clamping force on the part and the actual value of the movement and clamping path lie within the predefined tolerance limits, and the first clamping tool is stopped in its clamping movement and the part is evaluated to be a bad part, if the actual value for the clamping force on the part and/or the actual value for the movement and clamping path lie outside the predefined tolerance limits.

53. The method according to claim 52, wherein the lower limit and/or upper limit of the clamping force and/or of the movement and/or clamping path is empirically determined and set before the startup of the assembly station.

54. The method according to claim 52, wherein the lower limit and/or upper limit of the clamping force and/or of the movement and clamping path, is altered and automatically set using data detected electronically in at least one preceding clamping and/or joining process, relating to the clamping force and/or the movement and/or clamping path and/or quality level of the joint connection.

55. The method according to claim 52, wherein the lower limit and/or upper limit of the clamping force and/or of the movement and/or clamping path are corrected using deviations of a quality feature, in particular the dimensional stability of joined sub-assemblies determined on at least one joined sub-assembly.

56. The method according to claim 44, wherein the parts are welded together, when in the clamping position of each part the actual value of the clamping force on the corresponding part from the first clamping tool of each clamping unit and the actual value of the movement and clamping path of the first clamping tool of each clamping unit lie within the predetermined tolerance limits for the desired value of the clamping force on the corresponding part and the movement and clamping path of each clamping unit.

57. The method according to claim 44, wherein from an exerted torque and/or a motor current of an electric motor of the linear drive, the actual value of the clamping force is determined and evaluated by the evaluation unit.

58. The method according to claim 44, wherein during the displacement and/or clamping movement of the clamping tool, from the exerted torque and/or the motor current of an electric motor of the linear drive, an occurring frictional force is determined and evaluated by the evaluation unit and using which the lower limit and upper limit of the clamping force is corrected.

59. The method according to claim 44, wherein two parts during the clamping processes thereof being positioned relative to one another via at least one of the clamping tools of the first and second clamping unit, respectively into a first spatial direction and via a vertical positioning device into a second spatial direction, and into a preparation position between two cooperating clamping tools of a third clamping unit, whereupon the parts located between the cooperating clamping tools of the third clamping unit are pressed against one another with a clamping force via at least one clamping tool of the third clamping unit, which is adjustable from the initial position releasing the parts, into the clamping position clamping the parts, by an electronically controlled drive unit, so that the parts during the clamping process of the clamping tool of the third clamping unit are positioned relative to one another in a third spatial direction and wherein after the positioning of the parts in the three spatial directions, the parts are held in position and joined together.

60. A production installation for producing a sub-assembly of parts by joining, the production installation having a transport device for the transport of the parts via at least one parts transport carrier to at least one assembly station, wherein the at least one assembly station comprises:
a first clamping unit with clamping devices arranged in the vicinity of a transport path of the transport device and having two cooperating clamping tools positioning a first part in a first spatial direction and
a second clamping unit with clamping devices arranged in the vicinity of the transport path of the transport device and having two cooperating clamping tools positioning a second part in a first spatial direction, wherein at least one of the cooperating clamping tools of the first and second clamping units being displaceable via one respective electronically controlled drive unit from an initial position releasing a corresponding part into a clamping position clamping the corresponding part, and
at least one first vertical positioning device positioning the first part in a second spatial direction, and
a second vertical positioning device positioning the second part in a second spatial direction, as well as
a third clamping unit positioning both parts in a third spatial direction, the third clamping unit having two cooperating clamping devices, at least one of the clamping devices of the third clamping unit comprising a clamping tool displaceable from the initial position releasing the parts into the clamping position clamping the parts via an electronically controlled drive unit and wherein the clamping units and the vertical positioning devices are configured separately from the parts transport carrier of the transport device.

61. The production installation according to claim 60, wherein the assembly station comprises two vertical positioning devices arranged in the vicinity of the transport path of the transport device and configured separately from one another and opposing one another, the vertical positioning devices forming respectively lifting devices and comprising support elements synchronous with one another, lifting or lowering the parts together between a transport position of the parts located on the parts transport carrier and a preparation position of the parts located preferably above or below the transport position.

62. A method for joining first and second parts in an assembly station of a production installation in which the parts are respectively moved into a preparation position between cooperating first and second clamping tools and then clamped via at least the first clamping tool, which is displaceable from an initial position releasing the parts into a clamping position clamping the parts by an electronically controlled drive unit, and a displacement and clamping path between the initial and clamping positions of the first clamping tool and/or a clamping force of the first clamping tool on the first or second part being detected as an actual value and transmitted to an electronic evaluation unit, the electronic evaluation unit then compares the desired and actual values of the clamping force on the first or second part being detected and/or of the displacement and clamping path of the first clamping tool, wherein initially an internal profile-like part is arranged between guide surfaces of at least one outer profile-like part, then deformed via the first clamping tool of the outer profile-like part against the action of an elastic restoring force of the internal profile-like part, until the actual value of the clamping force and/or of the clamping path corresponds to the desired value of the clamping force and/or the clamping path, and after the actual value has reached the desired value, and the internal profile-like part is pretensioned via the outer profile-like part, the outer part is held in position and in the region of its longitudinal edges the parts are joined together at least in partial sections.

63. The method according to claim 62, wherein the internal profile-like part during the advancing movement of the outer profile-like part towards the internal profile-like part is elastically and/or plastically deformed.

64. The method according to claim 62, wherein the desired value for the clamping force of the first clamping tool on a part is pre-determined in a defined manner by a tolerance field with a lower limit and an upper limit and the desired value for the first clamping path covered by the clamping tool is pre-determined in a defined manner by a tolerance field with a lower limit and an upper limit.

65. The method according to claim 62, wherein the parts simultaneously are welded together via a plurality of beam welding heads at a plurality of points which are offset relative to one another along a joint point.

66. The method according to claim 62, wherein the parts are welded.

67. The method according to claim 62, wherein the parts are bonded.

68. A method for joining parts in an assembly station of a production installation in which the parts are respectively moved into a preparation position between cooperating first and second clamping tools and then clamped via the first clamping tool, which is displaceable from an initial position releasing the parts into a clamping position, clamping the parts by an electronically controlled drive unit, and a displacement and clamping path between the initial and clamping position of the first clamping tool and/or a clamping force of the first clamping tool on a corresponding part being detected as an actual value, and transmitted to an electronic evaluation unit, the electronic evaluation unit then compares the desired and actual values of the clamping force on the corresponding part and/or of the displacement and clamping path of the first clamping tool, wherein initially an internal profile-like part is arranged between guide surfaces of outer profile-like parts, then via the first clamping tool at least one of the outer profile-like parts is moved counter to the action of an elastic restoring force of the internal profile-like part in the direction of the other outer profile-like part until the actual value of the clamping force and/or of the clamping path corresponds to the desired value of the clamping force and/or of the clamping path and after the actual value has reached the desired value and the internal profile-like part is pretensioned between the outer profile-like parts, the outer profile-like parts are held in position and joined together.

69. The method according to claim 68, wherein the internal profile-like part during the advancing movement of the outer profile-like part towards the internal profile-like part is elastically and/or plastically deformed.

70. The method according to claim 68, wherein the desired value for the clamping force of the first clamping tool on a part is pre-determined in a defined manner by a tolerance field with a lower limit and an upper limit and the desired value for the clamping path covered by the first clamping tool is pre-determined in a defined manner by a tolerance field with a lower limit and an upper limit.

71. The method according to claim 68, wherein the parts simultaneously are welded together via a plurality of beam welding heads at a plurality of points which are offset relative to one another along a joint point.

72. The method according to claim 68, wherein the parts are welded.

73. The method according to claim 68, wherein the parts are bonded.

74. A method for joining parts in an assembly station of a production installation in which the parts are respectively moved into a preparation position between cooperating clamping tools and then clamped via at least one displaceable clamping tool, which is displaceable from an initial position releasing the parts into a clamping position clamping the parts by an electronically controlled drive unit, and the and a movement and/or clamping path covered between the initial and clamping positions of the at least one displaceable clamping tool and/or a clamping force of the at least one displaceable clamping tool on a corresponding part being detected as an actual value and transmitted to an electronic evaluation unit, the electronic evaluation unit then compares the desired and actual values of the clamping force on the corresponding part and/or of the movement and clamping path of the at least one displaceable clamping tool, wherein the parts are positioned relative to one another and moved in such a manner towards one another for setting a spacing between the parts until the actual value of the clamping force and/or of the movement and/or clamping path corresponds to the desired value of the clamping force and/or of the movement and/or clamping path and after the actual value has reached the desired value, the parts are held in position and joined together.

75. The method according to claim 74, wherein the desired value for the clamping force of the at least one displaceable clamping tool on a part is pre-determined in a defined manner by a tolerance field with a lower limit and an upper limit and the desired value for the clamping path covered by the clamping tool is pre-determined in a defined manner by a tolerance field with a lower limit and an upper limit.

76. The method according to claim 74, wherein the parts simultaneously are welded together via a plurality of beam welding heads at a plurality of points which are offset relative to one another along a joint point.

77. The method according to claim 74, wherein the parts are welded.

78. The method according to claim 74, wherein the parts are bonded.

* * * * *

UNITED STATES PATENT AND TRADEMARK OFFICE
CERTIFICATE OF CORRECTION

PATENT NO.       : 8,497,447 B2
APPLICATION NO.  : 11/794528
DATED            : July 30, 2013
INVENTOR(S)      : Heiml et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1722 days.

Signed and Sealed this

Fifteenth Day of September, 2015

Michelle K. Lee
*Director of the United States Patent and Trademark Office*